(12) United States Patent
Takeda et al.

(10) Patent No.: US 7,702,280 B2
(45) Date of Patent: Apr. 20, 2010

(54) MOBILE COMMUNICATION SYSTEM, TRANSMISSION STATION, RECEPTION STATION, RELAY STATION, COMMUNICATION PATH DECIDING METHOD, AND COMMUNICATION PATH DECIDING PROGRAM

(75) Inventors: Shinji Takeda, Kanagawa (JP); Atsushi Fujiwara, Kanagawa (JP); Hitoshi Yoshino, Kanagawa (JP); Toru Otsu, Kanagawa (JP); Yasushi Yamao, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 124 days.

(21) Appl. No.: 10/483,998

(22) PCT Filed: May 21, 2003

(86) PCT No.: PCT/JP03/06360

§ 371 (c)(1),
(2), (4) Date: Jun. 8, 2004

(87) PCT Pub. No.: WO03/101132

PCT Pub. Date: Dec. 4, 2003

(65) Prior Publication Data

US 2004/0242154 A1  Dec. 2, 2004

(30) Foreign Application Priority Data

May 27, 2002 (JP) .............................. 2002-153048
Apr. 21, 2003 (JP) .............................. 2003-116095

(51) Int. Cl.
*H04B 3/36* (2006.01)
*H04B 7/14* (2006.01)

(52) U.S. Cl. ...................... 455/7; 455/63.1; 455/67.11; 455/445

(58) Field of Classification Search ..................... 455/7, 455/63.1, 67.11, 445, 91
See application file for complete search history.

(56) References Cited

U.S. PATENT DOCUMENTS

| 5,987,011 | A | 11/1999 | Toh |
| 6,965,568 | B1 * | 11/2005 | Larsen ........................ 370/238 |
| 7,028,097 | B2 * | 4/2006 | Bard ........................... 709/232 |
| 7,035,221 | B2 | 4/2006 | Furukawa et al. |

(Continued)

FOREIGN PATENT DOCUMENTS

EP  1 185 037 A2  3/2002

(Continued)

*Primary Examiner*—Nay A Maung
*Assistant Examiner*—Tuan H Nguyen
(74) *Attorney, Agent, or Firm*—Oblon, Spivak, McClelland, Maier & Neustadt, L.L.P.

(57) ABSTRACT

A mobile communication system capable of determining a communication path to implement fast communication by multihop connection. The mobile communication system includes a mobile station, at least one relay station, and a base station and implements packet transmission from the mobile station to the base station through a communication path with an intermediary of at least one relay station or through a communication path without an intermediary of a relay station. The mobile communication system is provided with a communication path determiner for determining a communication path with a largest communication speed or a communication path satisfying a required line quality, based on interference levels of respective signals received at a relay station constituting a communication path between the transmitting station and the receiving station, and at the base station.

16 Claims, 17 Drawing Sheets

U.S. PATENT DOCUMENTS

| | | | |
|---|---|---|---|
| 7,319,668 B2 * | 1/2008 | Kobayashi | 370/231 |
| 7,380,006 B2 * | 5/2008 | Srinivas et al. | 709/227 |
| 2003/0091001 A1 | 5/2003 | Watanabe | |

FOREIGN PATENT DOCUMENTS

| | | |
|---|---|---|
| JP | 6-53872 | 2/1994 |
| JP | 11-32072 | 2/1999 |
| JP | 2001-128231 | 5/2001 |
| JP | 2001-244983 | 9/2001 |
| JP | 2002-26923 | 1/2002 |
| JP | 2003-152786 | 5/2003 |
| KR | 1999-025766 | 4/1999 |
| WO | WO 01/65784 A2 | 3/2002 |

* cited by examiner

Fig.6

| REQUIRED CONDITIONS | 64kbps | 384kbps |
|---|---|---|
| MAXIMUM TRANSMISSION POWER (dBm) | 24.00 | 24.00 |
| MOBILE-STATION CABLE LOSS (dB) | 0.00 | 0.00 |
| MOBILE-STATION ANTENNA GAIN (dB) | 0.00 | 0.00 |
| BASE-STATION ANTENNA GAIN (dB) | 17.00 | 17.00 |
| BASE-STATION CABLE LOSS (dB) | 0.00 | 0.00 |
| NF(dB) | 5.00 | 5.00 |
| THERMAL NOISE DENSITY (dBm/Hz) | -174.00 | -174.00 |
| INTERFERENCE MARGIN (dB) | 6.00 | 6.00 |
| TRANSMISSION BIT RATE (dBHz) | 48.06 | 55.84 |
| REQUIRED Eb/(N0+I0) (dB) | 3.80 | 2.70 |
| DIVERSITY HANDOVER GAIN (dB) | 3.00 | 3.00 |
| FADING MARGIN (dB) | 5.30 | 5.30 |
| TRANSMISSION POWER CONTROL VARIATION MARGIN (dB) | 2.00 | 2.00 |
| LOSS DUE TO BUILDING SHIELDING (dB) | 6.00 | 6.00 |
| MAXIMUM TRANSMISSION LOSS (dB) | 140.84 | 134.16 |
| CELL RADIUS (km) | 1.66 | 1.06 |

SINGLE HOP APPLICATION

MULTIHOP APPLICATION

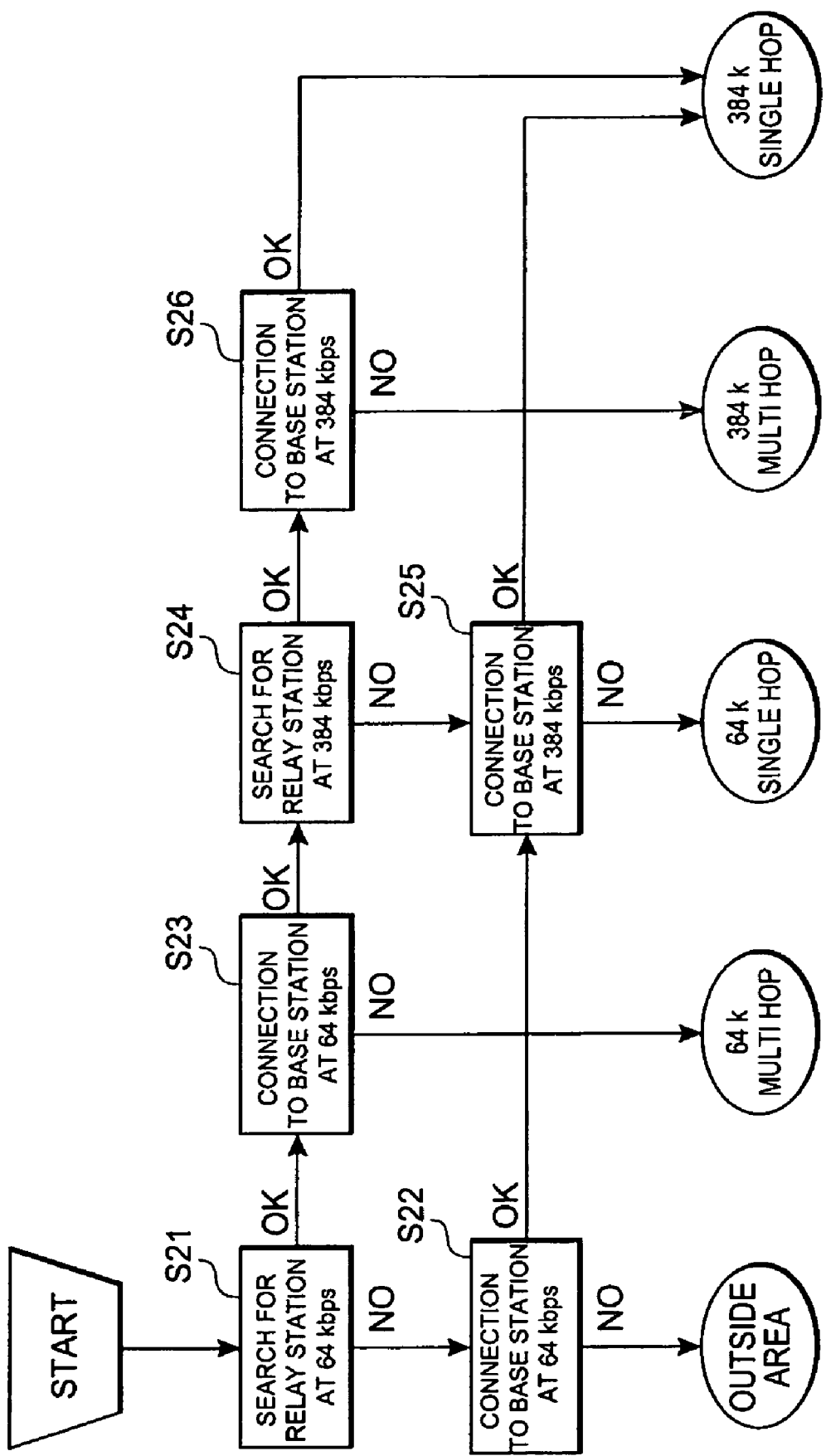

मोबाइल COMMUNICATION SYSTEM, TRANSMISSION STATION, RECEPTION STATION, RELAY STATION, COMMUNICATION PATH DECIDING METHOD, AND COMMUNICATION PATH DECIDING PROGRAM

TECHNICAL FIELD

The present invention relates to a mobile communication system capable of performing communication by multihop connection, a transmitting station, a receiving station, and a relay station constituting the mobile communication system, and a communication path determining method and a communication path determining program for determining a communication path by multihop connection and, more particularly, to those applied to communication based on CDMA or OFCDM to implement multiple access through coding of signals of respective channels.

BACKGROUND ART

A known method for the mobile communication systems to implement communication is one using the single hop connection system of performing transmission of signals while establishing a direct radio link between a mobile station, such as a cell phone or the like, and a base station thereof (e.g., cf. Japanese Patent Application Laid-Open No. 6-53872). In radio link design for such mobile communication systems, there exist three variable elements of communication speed, maximum transmission power, and cell radius in terms of securing required SIR (Signal to Interference Ratio: ratio of received signal power to interference signal power). Namely, the cell radius increases with increasing maximum transmission power as the communication speed is kept constant; whereas the cell radius decreases with increasing communication speed as the maximum transmission power is kept constant.

Incidentally, it is recently common to transmit or receive moving pictures with cell phones as well, and there are increasing needs for fast communication.

However, there is an upper limit on the transmission power of terminal equipment and in the communication systems by the above single hop connection method, therefore, the maximum communication speed was limited by distance between the base station and the mobile station, which made it difficult for the mobile station distant from the base station to perform fast communication.

It is, therefore, an object of the present invention to provide a solution to the above problem by applying the multihop connection method and thereby provide a mobile communication system capable of determining a communication path to implement fast communication by multihop connection, a transmitting station, a receiving station, and a relay station constituting the mobile communication system, and a communication path determining method and a communication path determining program for determining a communication path by multihop connection.

DISCLOSURE OF THE INVENTION

In order to achieve the above object, a mobile communication system according to the present invention is a mobile communication system comprising a transmitting station, at least one relay station, and a receiving station and configured to implement packet transmission from the transmitting station to the receiving station through a communication path with an intermediary of at least one relay station or through a communication path without an intermediary of a relay station, the mobile communication system comprising communication path determining means for determining a communication path with a largest communication speed or a communication path satisfying a required line quality, based on interference levels of respective signals received at a relay station constituting a communication path between the transmitting station and the receiving station, and at the receiving station.

A communication path determining method according to the present invention is a communication path determining method applied to a mobile communication system comprising a transmitting station, at least one relay station, and a receiving station and adapted to determine a communication path between the transmitting station and the receiving station, the communication path determining method comprising a communication path determining step of determining a communication path with a largest communication speed or a communication path satisfying a required line quality, based on interference levels of respective signals received at a relay station constituting a communication path between the transmitting station and the receiving station, and at the receiving station.

A communication path determining program according to the present invention is a communication path determining program applied to a mobile communication system comprising a transmitting station, at least one relay station, and a receiving station, for determining a communication path with an intermediary of at least one relay station or a communication path without an intermediary of a relay station, the communication path determining program letting a computer execute a communication path determining step of determining a communication path with a largest communication speed or a communication path satisfying a required line quality, based on interference levels of respective signals received at a relay station constituting a communication path between the transmitting station and the receiving station, and at the receiving station.

In radio communication, since the error rate increases with decrease in energy per bit, the required value of SIR becomes higher for fast communication. Namely, in the case where the propagation distance is short and the interference level is low, received SIR becomes high enough to implement fast communication. Based on such knowledge, the mobile communication system (communication path determining method) according to the present invention is so configured that, in determining a communication path by multihop connection or by single hop connection, it determines the communication path with the largest communication speed or the communication path satisfying the required line quality, based on the interference levels of the respective signals received at a relay station constituting a communication path and at the receiving station, whereby it can achieve implementation of fast communication. The "interference levels of respective signals received at a relay station constituting a communication path and at the receiving station" refer to totals of received signal levels except for signals necessary for the host station of interest, out of signals received at the receiving station or the relay station from other stations. The "transmitting station" and "receiving station" may be a mobile station and a base station in the ordinary mobile communication systems or may be relay stations for relaying packet transmission from the mobile station to the base station. For example, where packets are transmitted from the mobile station via relay station A and relay station B to the base station, the communication path determining method according to the present invention can be applied to determining the communication path from the relay station A to the base station, supposing the relay station A is the transmitting station.

The communication path determining program according to the present invention, when executed by a computer, is able to determine the communication path with the largest communication speed or the communication path satisfying the required line quality in much the same manner as the above communication path determining method does, and thereby achieve implementation of fast communication.

The above mobile communication system may be configured so that the communication path determining means further comprises: interstation communication speed determining means for determining an interstation communication speed between each pair of stations, based on interference levels at respective stations constituting a communication path; and communication speed determining means for determining a communication speed on each communication path from the transmitting station to the receiving station on the basis of the interstation communication speed between each pair of stations determined by the interstation communication speed determining means; and so that the communication path determining means determines a communication path on the basis of communication speeds of respective communication paths determined by the communication speed determining means.

The above communication path determining method may be configured so that the communication path determining step comprises: an interstation communication speed determining step of determining an interstation communication speed between each pair of stations, based on interference levels at respective stations constituting a communication path; and a communication speed determining step of determining a communication speed on each communication path from the transmitting station to the receiving station on the basis of the interstation communication speed between each pair of stations determined by the interstation communication speed determining means; and so that the communication path determining step is to determine a communication path on the basis of communication speeds of respective communication paths determined in the communication speed determining step.

The above communication path determining program may be configured so that the communication path determining step comprises: an interstation communication speed determining step of determining an interstation communication speed between each pair of stations, based on interference levels at respective stations constituting a communication path; and a communication speed determining step of determining a communication speed on each communication path from the transmitting station to the receiving station on the basis of the interstation communication speed between each pair of stations determined in the interstation communication speed determining step; and so that the communication path determining step is to determine a communication path on the basis of communication speeds of respective communication paths determined in the communication speed determining step.

In this manner, the mobile communication system (communication path determining method) is able to determine the interstation communication speed between adjacent stations on a communication path, based on the interference levels at the respective stations constituting the communication path, and determine the communication speed between the transmitting station and the receiving station on the basis of the interstation communication speeds thus determined. This permits the communication path determining means (the communication path determining step) to determine the communication path with the maximum communication speed or the communication path satisfying the required line quality, based on the communication speeds between the transmitting station and the receiving station on the respective communication paths.

The communication path determining program according to the present invention, when executed by the computer, is able to determine the communication speed between the transmitting station and the receiving station on each communication path, based on the interstation communication speeds determined from the interference levels, and determine the communication path on the basis thereof in much the same manner as the above communication path determining method does.

The above mobile communication system may be configured as follows: the transmitting station comprises request signal transmitting means for transmitting a request signal; the receiving station comprises request response signal transmitting means for transmitting a request response signal to a request signal; the relay station comprises request signal transmitting means for transmitting a request signal, and request response signal transmitting means for transmitting a request response signal to a request signal; information about the interstation communication speed determined by the interstation communication speed determining means is put into a request signal or a request response signal to be transmitted to the transmitting station, the receiving station, or the relay station having the communication path determining means.

The above communication path determining method may be configured to comprise a request signal transmitting step wherein the transmitting station or the relay station transmits a request signal; and a request response signal transmitting step wherein the receiving station or the relay station transmits a request response signal to a request signal; and configured so that information about the interstation communication speed determined in the interstation communication speed determining step is put into a request signal or a request response signal to be transmitted to the transmitting station, the receiving station, or the relay station to execute the communication path determining step.

In this manner the information about the interstation communication speed between each pair of stations is put into a request signal or a request response signal to be transmitted to the station having the communication path determining means (or the station to execute the communication path determining step), whereby the communication speed between the transmitting station and the receiving station can be determined at the station that receives the information about the interstation communication speed between each pair of stations constituting the communication path.

The above mobile communication system may be configured so that the receiving station and the relay station comprise request signal receiving means for receiving a request signal transmitted from the transmitting station through a communication path with an intermediary of at least one relay station or through a communication path without an intermediary of a relay station; interference level measuring means for measuring an interference level at the host station when the request signal receiving means receives the request signal; and communication propriety determining means for determining whether it is possible to perform communication requested by the request signal, based on the interference level measured by the interference level measuring means; and so that the communication path determining means determines the communication path on the basis of propriety of communication determined by the communication propriety determining means.

The above communication path determining method may be configured to further comprise a request signal transmitting step wherein the transmitting station transmits a request signal to request communication at a predetermined communication speed, to the receiving station or the relay station through a communication path with an intermediary of at least one relay station or through a communication path without an intermediary of a relay station; an interference level measuring step wherein the receiving station or the relay station measures an interference level at the receiving station when receiving the request signal; and a communication propriety determining step wherein the receiving station or the relay station determines whether it is possible to perform the communication requested by the request signal, based on the interference level measured in the interference level measuring step; and configured so that the communication path determining step is to determine the communication path on the basis of information about propriety of communication determined in the communication propriety determining step.

In this manner the receiving station or the relay station has the communication propriety determining means (the communication propriety determining step) for determining whether it is possible to perform the communication with the transmitting station on the basis of the request signal and the interference level, and the receiving station or the relay station receiving a request signal determines whether it is possible to perform the communication requested by the request signal. This permits the communication path determining means (the communication path determining step) to determine whether it is possible to perform the communication at the predetermined communication speed, based on the result of the determination by the communication propriety determining means (or in the communication propriety determining step), and to determine the communication path.

The above mobile communication system may be configured so that the transmitting station comprises the communication path determining means having request signal transmitting means for transmitting a request signal to request communication at a predetermined communication speed; and request response signal receiving means for receiving a request response signal to the request signal transmitted by the request signal transmitting means; so that when that it is impossible to perform the communication at the predetermined communication speed is determined based on the communication propriety information included in the request response signal received by the request response signal receiving means, the transmitting station transmits the request signal while stepwise lowering the request communication speed, before a determination of being communicable is made; and so that when it is determined that it is possible to perform the communication at the predetermined communication speed, the transmitting station starts the communication with the receiving station at the communication speed determined as communicable.

In this manner, based on the communication propriety information included in the request response signal, the communication is started at the communication speed if it is possible to perform the communication, whereas if it is impossible to perform the communication, the request signal is transmitted while stepwise decreasing the request communication speed, before a determination of being communicable is made. This enables the communication at the largest communication speed available for communication between the transmitting station and the receiving station.

The above mobile communication system may be configured so that the transmitting station comprises the communication path determining means having request signal transmitting means for transmitting a request signal to request communication at a predetermined communication speed; and request response signal receiving means for receiving a request response signal to the request signal transmitted by the request signal transmitting means; so that when that it is possible to perform the communication at the predetermined communication speed is determined based on the communication propriety information included in the request response signal received by the request response signal receiving means, the transmitting station transmits the request signal while stepwise increasing the request communication speed, before a determination of being uncommunicable is made; and so that when it is determined that it is impossible to perform the communication at the predetermined communication speed, the transmitting station starts the communication with the receiving station at a maximum communication speed out of communication speeds determined as communicable.

As described above, when it is possible to perform the communication, based on the communication propriety information included in the request response signal, the transmitting station transmits the request signal while stepwise increasing the request communication speed, before a determination of being uncommunicable is made, and, with a determination of being uncommunicable, it starts the communication at the maximum communication speed out of communication speeds determined as communicable. This enables the communication at the maximum communication speed available for communication between the transmitting station and the receiving station, and communication can be established at the communication speed first determined as communicable, which can decrease a period of time before the establishment of connection.

The above mobile communication system may be configured so that the receiving station and the relay station comprise request signal receiving means for receiving a request signal transmitted from the transmitting station through a communication path with an intermediary of at least one relay station or through a communication path without an intermediary of a relay station; interference level measuring means for measuring an interference level at the host station when the request signal receiving means receives a request signal; communication propriety determining means for determining whether it is possible to perform communication at a communication speed included in the request signal, based on the interference level measured by the interference level measuring means; and request response signal transmitting means for transmitting a request response signal containing information on propriety of communication determined by the communication propriety determining means, through the communication path to the transmitting station; so that the transmitting station comprises the communication path determining means having request signal transmitting means for transmitting a request signal to request communication at a predetermined communication speed; and request response signal receiving means for receiving a request response signal to the request signal transmitted by the request signal transmitting means; so that when that it is impossible to perform the communication at the predetermined communication speed is determined based on the communication propriety information included in the request response signal received by the request response signal receiving means, the transmitting station transmits the request signal while stepwise lowering the request communication speed, before a determination of being communicable is made; and so that when it is determined that it is possible to perform the communication at the predetermined communication speed, the transmitting station starts the communication with the receiving station at the communication speed determined as communicable.

The above communication path determining method may be configured to further comprise a request signal transmitting step wherein the transmitting station transmits a request signal to request communication at a predetermined communication speed, to the receiving station or the relay station through a communication path with an intermediary of at least one relay station or through a communication path without an intermediary of a relay station; an interference level measuring step wherein the receiving station or the relay station measures an interference level at the receiving station or the relay station when receiving a request signal; a communication propriety determining step wherein the receiving station or the relay station determines whether it is possible to perform communication at a communication speed included in the request signal, based on the interference level measured in the interference level measuring step; and a request response signal transmitting step wherein the receiving station or the relay station transmits a request response signal containing information on propriety of communication determined in the communication propriety determining step, to the transmitting station through a predetermined communication path; so that the communication path determining step is configured as follows: when that it is impossible to perform the communication at the predetermined communication speed is determined based on the communication propriety information included in the request response signal transmitted in the request response signal transmitting step, the request signal is transmitted while stepwise decreasing the request communication speed, before a determination of being communicable is made; when it is determined that it is possible to perform the communication at the predetermined communication speed, the communication is started with the receiving station or the relay station at the communication speed determined as communicable.

In this manner the receiving station and the relay station have the communication propriety determining means (communication propriety determining step) for determining whether it is possible to perform the communication with the transmitting station, on the basis of the request signal and the interference level, put the information about propriety of communication thus determined, into the request response signal, and transmit the request response signal; the communication path determining means (communication path determining step) is thus able to determine whether it is possible to perform the communication at the predetermined communication speed. When the result of the determination is that it is possible to perform the communication, the communication is initiated at the communication speed; when it is impossible to perform the communication, the request signal is transmitted while stepwise decreasing the request communication speed, before a determination of being communicable is made. This enables the communication at the maximum communication speed available for communication between the transmitting station and the receiving station.

The above mobile communication system may be configured so that the receiving station and the relay station comprise request signal receiving means for receiving a request signal transmitted from the transmitting station through a communication path with an intermediary of at least one relay station or through a communication path without an intermediary of a relay station; interference level measuring means for measuring an interference level at the host station when the request signal receiving means receives a request signal; communication propriety determining means for determining whether it is possible to perform communication at a communication speed included in the request signal, based on the interference level measured by the interference level measuring means; and request response signal transmitting means for transmitting a request response signal containing information on propriety of communication determined by the communication propriety determining means, through the communication path to the transmitting station; so that the transmitting station comprises the communication path determining means having request signal transmitting means for transmitting a request signal to request communication at a predetermined communication speed; and request response signal receiving means for receiving a request response signal to the request signal transmitted by the request signal transmitting means; so that when that it is possible to perform the communication at the predetermined communication speed is determined based on the communication propriety information included in the request response signal received by the request response signal receiving means, the transmitting station transmits the request signal while stepwise increasing the request communication speed, before a determination of being uncommunicable is made; and so that when it is determined that it is impossible to perform the communication at the predetermined communication speed, the transmitting station starts the communication with the receiving station at a maximum communication speed out of communication speeds determined as communicable.

The above communication path determining method may be configured to further comprise a request signal transmitting step wherein the transmitting station transmits a request signal to request communication at a predetermined communication speed, to the receiving station or the relay station through a communication path with an intermediary of at least one relay station or through a communication path without an intermediary of a relay station; an interference level measuring step wherein the receiving station or the relay station measures an interference level at the receiving station or the relay station when receiving a request signal; a communication propriety determining step wherein the receiving station or the relay station determines whether it is possible to perform communication at a communication speed included in the request signal, based on the interference level measured in the interference level measuring step; and a request response signal transmitting step wherein the receiving station or the relay station transmits a request response signal containing information on propriety of communication determined in the communication propriety determining step, to the transmitting station through a predetermined communication path; so that the communication path determining step is configured as follows: when that it is possible to perform the communication at the predetermined communication speed is determined based on the communication propriety information included in the request response signal transmitted in the request response signal transmitting step, the request signal is transmitted while stepwise increasing the request communication speed, before a determination of being uncommunicable is made; when it is determined that it is impossible to perform the communication at the predetermined communication speed, the communication is started with the receiving station or the relay station at a maximum communication speed out of communication speeds determined as communicable.

In this manner the receiving station or the relay station has the communication propriety determining means (communication propriety determining step) for determining whether it is possible to perform the communication with the transmitting station, on the basis of the request signal and the interference level, puts the information about the propriety of communication thus determined, into the request response signal, and transmits the request response signal, whereby the communication path determining means (communication path determining step) is able to determine whether it is possible to perform the communication at the predetermined communication speed. When the result of the determination is that it is possible to perform the communication, the request signal is transmitted while stepwise increasing the request communication speed, before a determination of being uncommunicable is made; with a determination of being uncommunicable, the communication is started at the maximum communication speed out of communication speeds determined as communicable. This enables the communication at the maximum communication speed available for communication between the transmitting station and the receiving station, and communication can be established at the first communicable communication speed, which can decrease the period of time before the establishment of connection.

The mobile communication system may be configured so that the relay station further comprises request signal transmitting means for transmitting a request signal to the receiving station or another relay station only when the communication propriety determining means determines that it is possible to perform communication; and request response signal receiving means for receiving a request response signal to the request signal transmitted by the request signal transmitting means.

The above communication path determining method may be configured to further comprise a second request signal transmitting step wherein the relay station transmits a request signal to the receiving station or another relay station only when the communication propriety determining step results in determining that it is possible for the relay station to perform communication; and a second request response signal transmitting step wherein the receiving station or other relay station as a destination of the request signal in the second request signal transmitting step transmits a request response signal to the request signal.

Since in an uncommunicable state between certain stations constituting a communication path it is impossible to perform communication through the communication path, the relay station is configured so that only when the communication propriety determining means (communication propriety determining step) determines that it is possible for the relay station to perform communication, the request signal is further transmitted to search for a communication path to the receiving station and so that when it determines that it is impossible to perform the communication, transmission of the request signal is stopped at that point and the request response signal containing information about the incapability of communication is transmitted; whereby the system is prevented from transmitting ineffectual request signals, which can achieve increase of efficiency of the mobile communication system.

The above mobile communication system may be configured as follows: the receiving station comprises request signal receiving means for receiving a request signal transmitted from the transmitting station or the relay station; interference level measuring means for measuring an interference level at the receiving station when the request signal receiving means receives a request signal; and request response signal transmitting means for transmitting a request response signal containing the interference level measured by the interference level measuring means, to the transmitting station or the relay station as a source of the request signal; the relay station comprises request signal receiving means for receiving a request signal transmitted from the transmitting station or another relay station; interference level measuring means for measuring an interference level at the host relay station when the request signal receiving means receives a request signal; request signal transmitting means for transmitting a request signal; request response signal receiving means for receiving a request response signal transmitted from the receiving station or a second other relay station, in response to the request signal transmitted by the request signal transmitting means; interstation communication speed determining means for determining an interstation communication speed between the relay station and the receiving station or the second other relay station as a source of the request response signal, based on an interference level included in the request response signal received by the request response signal receiving means; and request response signal transmitting means for transmitting a request response signal containing the interference level measured by the interference level measuring means, and the interstation communication speed information determined by the interstation communication speed determining means, and, where the request response signal received by the request response signal receiving means is one containing interstation communication speed information, also containing the interstation communication speed information, to the transmitting station or the other relay station as a source of the request signal; the transmitting station comprises the communication path determining means having request signal transmitting means for transmitting a request signal; request response signal receiving means for receiving a request response signal to the request signal transmitted by the request signal transmitting means; interstation communication speed determining means for determining an interstation communication speed between the transmitting station and the receiving station or relay station as a source of the request response signal, based on an interference level included in the request response signal; communication speed determining means for determining a communication speed on a communication path from the transmitting station to the receiving station on the basis of the interstation communication speed determined by the interstation communication speed determining means, and, where the request response signal contains an interstation communication speed, on the basis of the interstation communication speed information as well; and communication path selecting means for selecting a communication path on the basis of communication speeds on respective communication paths determined by the communication speed determining means.

The above communication path determining method may be configured to further comprise a request signal transmitting step wherein the transmitting station transmits a request signal to the receiving station or the relay station; a second request signal transmitting step wherein when the relay station receives a request signal, the relay station transmits a request signal to the receiving station or another relay station; an interference level measuring step wherein the receiving station or the relay station receiving the request signal transmitted in the request signal transmitting step or in the second request signal transmitting step measures an interference level at the receiving station or the relay station; a request response signal transmitting step wherein the receiving station or the relay station transmits a request response signal containing the interference level measured in the interference level measuring step, to the transmitting station or the relay station as a source of the request signal; and an interstation communication speed determining step wherein the transmitting station or the relay station determines an interstation communication speed between the station and the receiving station or the relay station as a source of the request response signal, based on the interference level included in the request response signal transmitted in the request response signal transmitting step; and configured as follows: the interstation communication speed information determined at the relay station in the interstation communication speed determining step is put into a request response signal transmitted in the request response signal transmitting step to be transmitted via at least one relay station or directly to the transmitting station; the communication path determining step comprises a communication speed determining step wherein the transmitting station determines a communication speed on each communication path between the transmitting station and the receiving station, based on an interstation communication speed between each pair of stations on a communication path between the transmitting station and the receiving station; and a communication path selecting step wherein a communication path is selected based on communication speeds on respective communication paths determined in the communication speed determining step.

In the mobile communication system (communication path determining method) according to the present invention, the receiving station measures the interference level at the receiving station when receiving a request signal having been transmitted from the transmitting station or the relay station, and transmits a request response signal containing the measured interference level, to the transmitting station or the relay station as a source thereof, and the transmitting station or the relay station receiving the request response signal determines the interstation communication speed between the station and the receiving station as a source of the request response signal on the basis of the interference level included in the request response signal. The relay station measures the interference level at itself when receiving a request signal having been transmitted from the transmitting station or another relay station, and transmits a request response signal containing the measured interference level to the transmitting station or the relay station as a source thereof, and the transmitting station or the relay station receiving the request response signal determines the interstation communication speed between the station and the receiving station or the relay station as a source of the request response signal on the basis of the interference level included in the request response signal. Then each relay station also puts the interstation communication speed information about the determined interstation communication speed into the request response signal and transmits the request response signal to the transmitting station. The transmitting station determines the interstation communication speed between the station and the receiving station or the relay station as a source of the request response signal, based on the interference level included in the request response signal transmitted from the receiving station or the relay station. This permits the transmitting station to determine the total communication speed between the transmitting station and the receiving station on the basis of the interstation communication speed between each pair of stations constituting a communication path between the transmitting station and the receiving station and determine the communication path with the highest communication speed or the communication path satisfying the required line quality on the basis of the communication speed.

The above mobile communication system may be configured as follows: the receiving station comprises request signal receiving means for receiving a request signal transmitted from the transmitting station or the relay station; interference level measuring means for measuring an interference level at the receiving station when the request signal receiving means receives a request signal; interstation communication speed determining means for determining an interstation communication speed between the receiving station and the transmitting station or the relay station as a source of the request signal, based on the interference level measured by the interference level measuring means; and request response signal transmitting means for transmitting a request response signal containing the interstation communication speed information determined by the interstation communication speed determining means, to the transmitting station or the relay station as a source of the request signal; the relay station comprises request signal receiving means for receiving a request signal transmitted from the transmitting station or another relay station; interference level measuring means for measuring an interference level at the host relay station when the request signal receiving means receives a request signal; interstation communication speed determining means for determining an interstation communication speed from the transmitting station or the other relay station as a source of the request signal, based on the interference level measured by the interference level measuring means; request signal transmitting means for transmitting a request signal; request response signal receiving means for receiving a request response signal transmitted from the receiving station or a second other relay station, in response to the request signal transmitted by the request signal transmitting means; and request response signal transmitting means for transmitting a request response signal containing the interstation communication speed information determined by the interstation communication speed determining means and the interstation communication speed information included in the request response signal received by the request response signal receiving means, to the transmitting station or the other relay station as a source of the request signal; the transmitting station comprises the communication path determining means having request signal transmitting means for transmitting a request signal; request response signal receiving means for receiving a request response signal to the request signal transmitted by the request signal transmitting means; communication speed determining means for determining a communication speed on each communication path from the transmitting station to the receiving station, based on the interstation communication speed information included in the request response signal received by the request response signal receiving means; and communication path selecting means for selecting a communication path, based on communication speeds on respective communication paths determined by the communication speed determining means.

The above communication path determining method may be configured to further comprise a request signal transmitting step wherein the transmitting station transmits a request signal to the receiving station or the relay station; a second request signal transmitting step wherein when the relay station receives a request signal, the relay station transmits a request signal to the receiving station or another relay station; an interference level measuring step wherein the receiving station or the relay station receiving the request signal transmitted in the request signal transmitting step or in the second request signal transmitting step measures an interference level at the receiving station or the relay station; an interstation communication speed determining step wherein the receiving station or the relay station determines an interstation communication speed between the station and the transmitting station or the relay station as a source of the request signal, based on the interference level measured in the interference level measuring step; and a request response signal transmitting step wherein the receiving station or the relay station transmits a request response signal containing the interstation communication speed information determined in the interstation communication speed determining step, to the transmitting station or the relay station as a source of the request signal; and configured as follows: the interstation communication speed information determined at the receiving station or the relay station in the interstation communication speed determining step is put into a request response signal transmitted in the request response signal transmitting step and the request response signal is transmitted via at least one relay station or directly to the transmitting station; the communication path determining step comprises a communication speed determining step wherein the transmitting station determines a communication speed on each communication path between the transmitting station and the receiving station, based on the interstation communication speed between each pair of stations on a communication path between the transmitting station and the receiving station; and a communication path selecting step wherein a communication path is selected based on communication speeds on respective communication paths determined in the communication speed determining step.

In the mobile communication system (communication path determining method) according to the present invention, the relay station measures the interference level at the relay station itself when receiving the request signal having been transmitted from the transmitting station or another relay station, and determines the interstation communication speed between the relay station and the transmitting station or the other relay station as a source of the request signal on the basis of the interference level thus measured. The receiving station measures the interference level at itself when receiving the request signal having been transmitted from the transmitting station or another relay station, and determines the interstation communication speed between the receiving station and the transmitting station or the relay station as a source of the request signal on the basis of the measured interference level. Then the receiving station and each relay station put the interstation communication speed information about the determined interstation communication speed into a request response signal and transmit the request response signal to the transmitting station. This permits the transmitting station to determine the total communication speed on each communication path between the transmitting station and the receiving station on the basis of the interstation communication speed between each pair of stations constituting a communication path between the transmitting station and the receiving station and to determine the communication path with the highest communication speed or the communication path satisfying the required line quality on the basis of the communication speed.

The above mobile communication system may be configured as follows: the relay station comprises request signal receiving means for receiving a request signal transmitted from the transmitting station or another relay station; interference level measuring means for measuring an interference level at the host relay station when the request signal receiving means receives a request signal; interstation communication speed determining means for determining an interstation communication speed between the relay station and the transmitting station or the other relay station as a source of the request signal, based on the interference level measured by the interference level measuring means; and request signal transmitting means for transmitting a request signal containing the interstation communication speed information determined by the interstation communication speed determining means and, where the request signal is one containing interstation communication speed information, also containing the interstation communication speed information; the receiving station comprises the communication path determining means having: request signal receiving means for receiving a request signal transmitted from the transmitting station or the relay station; interference level measuring means for measuring an interference level at the receiving station when the request signal receiving means receives a request signal; interstation communication speed determining means for determining an interstation communication speed between the receiving station and the transmitting station or the relay station as a source of the request signal, based on the interference level measured by the interference level measuring means; communication speed determining means for determining a communication speed on each communication path between the transmitting station and the receiving station, based on the interstation communication speed determined by the interstation communication speed determining means and, where the request signal is one containing interstation communication speed information, also based on the interstation communication speed information; and communication path selecting means for selecting a communication path, based on communication speeds on respective communication paths determined by the communication speed determining means.

The above communication path determining method may be configured to further comprise a request signal transmitting step wherein the transmitting station transmits a request signal to the receiving station or the relay station; a second request signal transmitting step wherein when the relay station receives a request signal, the relay station transmits a request signal to the receiving station or another relay station; an interference level measuring step wherein the receiving station or the relay station receiving the request signal transmitted in the request signal transmitting step or in the second request signal transmitting step measures an interference level at the receiving station or the relay station; and an interstation communication speed determining step wherein the receiving station or the relay station determines an interstation communication speed between the station and the transmitting station or the relay station as a source of the request signal, based on the interference level measured in the interference level measuring step; and configured as follows: the interstation communication speed information determined at the relay station in the second request signal transmitting step is put into a request signal transmitted in the second request signal transmitting step and the request signal is transmitted via at least one relay station or directly to the receiving station; the communication path determining step comprises a communication speed determining step wherein the receiving station determines a communication speed on each communication path between the transmitting station and the receiving station, based on the interstation communication speed between each pair of stations constituting a communication path between the transmitting station and the receiving station; and a communication path selecting step wherein a communication path is selected based on communication speeds on respective communication paths determined in the communication speed determining step.

In the mobile communication system (communication path determining method) according to the present invention, the relay station measures the interference level at the relay station itself when receiving a request signal having been transmitted from the transmitting station or another relay station, and determines the interstation communication speed between the relay station and the transmitting station or the other relay station as a source of the request signal on the basis of the measured interference level. Then each relay station puts the interstation communication speed information about the determined interstation communication speed into a request signal and transmits the request signal to the receiving station. The receiving station measures the interference level at the receiving station itself when receiving the request signal having been transmitted from the transmitting station or the relay station, and determines the interstation communication speed between the receiving station and the transmitting station or the relay station as a source of the request signal on the basis of the measured interference level. This permits the receiving station to determine the total communication speed between the transmitting station and the receiving station on the basis of the interstation communication speed between each pair of stations constituting a communication path between the transmitting station and the receiving station and to determine the communication path with the highest communication speed or the communication path satisfying the required line quality on the basis of the communication speed. Then the receiving station transmits the information about the determined communication path to the transmitting station, whereby the transmitting station can transmit packets to the receiving station in accordance with the determined communication path.

The above mobile communication system may be configured as follows: the receiving station comprises request signal receiving means for receiving a request signal transmitted from the transmitting station or the relay station; interference level measuring means for measuring an interference level at the receiving station when the request signal receiving means receives a request signal; and request response signal transmitting means for transmitting a request response signal containing the interference level measured by the interference level measuring means, to the transmitting station or the relay station as a source of the request signal; the relay station comprises request signal receiving means for receiving a request signal transmitted from the transmitting station or another relay station; interference level measuring means for measuring an interference level at the host relay station when the request signal receiving means receives a request signal; request signal transmitting means for transmitting a request signal; request response signal receiving means for receiving a request response signal transmitted from the receiving station or a second other relay station, in response to the request signal transmitted by the request signal transmitting means; and request response signal transmitting means for transmitting a request response signal containing the interference level measured by the interference level measuring means, and the interference level included in the request response signal received by the request response signal receiving means, to the transmitting station or the other relay station as a source of the request signal; the transmitting station comprises the communication path determining means having: request signal transmitting means for transmitting a request signal; request response signal receiving means for receiving a request response signal to the request signal transmitted by the request signal transmitting means; interstation communication speed determining means for determining an interstation communication speed between each pair of stations constituting a communication path, based on the interference level included in the request response signal; communication speed determining means for determining a communication speed on a communication path from the transmitting station to the receiving station on the basis of the interstation communication speed determined by the interstation communication speed determining means; and communication path selecting means for selecting a communication path on the basis of communication speeds on respective communication paths determined by the communication speed determining means.

The above communication path determining method may be configured to further comprise a request signal transmitting step wherein the transmitting station transmits a request signal to the receiving station or the relay station; a second request signal transmitting step wherein when the relay station receives a request signal, the relay station transmits a request signal to the receiving station or another relay station; an interference level measuring step wherein the receiving station or the relay station receiving the request signal transmitted in the request signal transmitting step or in the second request signal transmitting step measures an interference level at the receiving station or the relay station; and a request response signal transmitting step wherein the receiving station or the relay station transmits a request response signal containing the interference level measured in the interference level measuring step to the transmitting station or the relay station as a source of the request signal; and configured as follows: the communication path determining step comprises an interstation communication speed determining step wherein the transmitting station determines an interstation communication speed between each pair of stations constituting a communication path, based on the interference level included in the request response signal transmitted via at least one relay station or directly to the transmitting station in the request response signal transmitting step; a communication speed determining step wherein the transmitting station determines a communication speed on each communication path between the transmitting station and the receiving station, based on the interstation communication speed between each pair of stations determined in the interstation communication speed determining step; and a communication path selecting step wherein the transmitting station selects a communication path on the basis of communication speeds on respective communication paths determined in the communication speed determining step.

When the request response signal containing the interference level at each station constituting a communication path is transmitted to the transmitting station in this way, the transmitting station is able to determine the interstation communication speed between each pair of stations constituting a communication path on the basis of the interference level at each station and to determine the communication speed between the transmitting station and the receiving station on the basis of the determined interstation communication speeds. The transmitting station is able to determine the communication path, based on the communication speeds on the respective communication paths determined in this way.

The above mobile communication system may be configured as follows: the relay station comprises request signal receiving means for receiving a request signal transmitted from the transmitting station or another relay station; interference level measuring means for measuring an interference level at the host relay station when the request signal receiving means receives a request signal; and request signal transmitting means for transmitting a request signal containing the interference level measured by the interference level measuring means and, where the request signal is one transmitted from another relay station, also containing an interference level included in the request signal; the receiving station comprises the communication path determining means having: request signal receiving means for receiving a request signal transmitted from the transmitting station or the relay station; interference level measuring means for measuring an interference level at the receiving station when the request signal receiving means receives a request signal; interstation communication speed determining means for determining an interstation communication speed between each pair of stations constituting a communication path, based on the interference level measured by the interference level measuring means and, where the request signal is one transmitted from the relay station, also based on the interference level included in the request signal; communication speed determining means for determining a communication speed on each communication path between the transmitting station and the receiving station on the basis of the interstation communication speed determined by the interstation communication speed determining means; and communication path selecting means for selecting a communication path, based on communication speeds on respective communication paths determined by the communication speed determining means.

The above communication path determining method may be configured to further comprise a request signal transmitting step wherein the transmitting station transmits a request signal to the receiving station or the relay station; a second request signal transmitting step wherein when the relay station receives a request signal, the relay station transmits a request signal to the receiving station or another relay station; and an interference level measuring step wherein the receiving station or the relay station receiving the request signal transmitted in the request signal transmitting step or in the second request signal transmitting step measures an interference level at the receiving station or the relay station; and configured as follows: the interference level measured in the interference level measuring step is put into a request signal and the request signal is transmitted via at least one relay station or directly to the receiving station; the communication path determining step comprises an interstation communication speed determining step wherein the receiving station determines an interstation communication speed between each pair of stations constituting a communication path, based on an interference level included in a request signal; a communication speed determining step wherein the receiving station determines a communication speed on each communication path between the transmitting station and the receiving station on the basis of the interstation communication speed determined in the interstation communication speed determining step; and a communication path selecting step wherein the receiving station selects a communication path, based on communication speeds on respective communication paths determined in the communication speed determining step.

When the interference level at each station forming a communication path is put into a request signal to be transmitted to the receiving station, the receiving station is able to determine the interstation communication speed between each pair of stations forming the communication path on the basis of the interference level at each station and to determine the communication speed between the transmitting station and the receiving station on the basis of the determined interstation communication speed. The receiving station is able to determine the communication path, based on the communication speeds on the respective communication paths determined in this way.

The above mobile communication system (the communication path determining method) may be configured so that the communication path from the transmitting station to the receiving station determined by the communication path determining means (or in the communication path determining step) is also applied to cases of transmitting packets from the receiving station to the transmitting station.

In cases of carrying out bidirectional communication between the transmitting station and the receiving station, communication is also carried out through the communication path determined by the above mobile communication system (the communication path determining method) on the occasion of transmitting packets from the receiving station to the transmitting station, which is preferable in that it is feasible to omit the step of again determining the communication path from the receiving station to the transmitting station. On this occasion, the communication speed may be varied according to transmission powers of the transmitting station and the receiving station.

The above mobile communication system (communication path determining method) may be configured so that, where there exist a plurality of communication paths satisfying the required line quality, the communication path determining means (the communication path determining step) determines a path with a smallest hop count between the transmitting station and the receiving station, as a communication path.

Increase of the hop count can bring about a delay at each relay station and, where there are a plurality of communication paths satisfying the required line quality, it is preferable to select the communication path with the smallest hop count. When a predetermined delay time is given as the required line quality, a hop count permitted for clearing the given delay time can be defined as a threshold. The required line quality can be satisfied by determining a communication path with a hop count smaller than the threshold.

The above mobile communication system (communication path determining method) may be configured so that, where there exist a plurality of communication paths satisfying the required line quality, the communication path determining means (the communication path determining step) determines a path with a small total of transmission powers at the transmitting station and at the relay station forming the communication path, as a communication path.

Decrease in the total of transmission powers can suppress increase in interference noise due to relaying of packet transmission at the relay station, and, where there are a plurality of communication paths satisfying the required line quality, it is preferable to select the communication path with the small total of transmission powers.

The above mobile communication system (communication path determining method) may be configured so that, where there exist a plurality of communication paths satisfying the required line quality, the communication path determining means (the communication path determining step) determines a path with a small transmission power at the transmitting station, as a communication path.

In the case where power is supplied to the relay station and the receiving station, it is preferable to minimize the transmission power at the transmitting station which is normally comprised of a cell phone or the like.

The above mobile communication system (communication path determining method) may be configured so that the communication path determining means (the communication path determining step) determines a communication path out of communication paths having a hop count between the transmitting station and the receiving station of not more than a predetermined threshold.

Increase of the hop count can bring about a delay at each relay station and it is preferable to preliminarily define a hop count of an upper limit in determining a communication path. When a predetermined delay time is given as the required line quality, a hop count permitted for clearing the given delay time can be defined as a threshold. The required line quality can be satisfied by determining a communication path with a hop count smaller than the threshold.

In the above mobile communication system (communication path determining method), it is preferable to vary the communication speed by changing a modulation system or a spreading system.

A transmitting station according to the present invention is a transmitting station applied to a mobile communication system and configured to transmit a packet to a receiving station through a communication path with an intermediary of at least one relay station or through a communication path without an intermediary of a relay station, the transmitting station comprising communication path determining means for determining a communication path with a largest communication speed or a communication path satisfying a required line quality, based on interference levels of respective signals received at a relay station constituting a communication path to the receiving station and at the receiving station.

A program for the transmitting station according to the present invention is a program applied to a mobile communication system and, for transmitting a packet from the transmitting station to a receiving station through a communication path with an intermediary of at least one relay station or through a communication path without an intermediary of a relay station, letting a computer execute a communication path determining step of determining a communication path with a largest communication speed or a communication path satisfying a required line quality, based on interference levels of respective signals received at a relay station constituting a communication path between the transmitting station and the receiving station and at the receiving station.

For determining a communication path by multihop connection or by single hop connection, the transmitting station according to the present invention determines the communication path with the largest communication speed or the communication path satisfying the predetermined line quality, based on the interference levels of the respective signals received at the relay station forming the communication path and at the receiving station, whereby it can achieve implementation of fast communication.

The transmitting station program according to the present invention can substantialize the aforementioned transmitting station when executed by the computer, and determines the communication path with the largest communication speed or the communication path satisfying the required line quality, based on the interference levels of the respective signals at the relay station forming the communication path and at the receiving station, whereby it can achieve implementation of fast communication.

The above transmitting station may be configured to comprise the communication path determining means having request signal transmitting means for transmitting a request signal to request communication at a predetermined communication speed; and request response signal receiving means for receiving a request response signal containing communication propriety information about propriety of communication, transmitted in response to the request signal transmitted by the request signal transmitting means; and configured so that when that it is impossible to perform the communication at the predetermined communication speed is determined based on the communication propriety information included in the request response signal received by the request response signal receiving means, the transmitting station transmits the request signal while stepwise decreasing the request communication speed, before a determination of being communicable is made and so that when it is determined that it is possible to perform the communication at the predetermined communication speed, the transmitting station starts the communication with the receiving station or the relay station at the communication speed determined as communicable.

The above transmitting station program may be configured so that the communication path determining step comprises a request signal transmitting step of transmitting a request signal to request communication at a predetermined communication speed; and a request response signal receiving step of receiving a request response signal containing communication propriety information about propriety of communication, transmitted in response to the request signal transmitted in the request signal transmitting step; and configured so that when that it is impossible to perform the communication at the predetermined communication speed is determined based on the communication propriety information included in the request response signal received in the request response signal receiving step, the request signal is transmitted while stepwise decreasing the request communication speed, before a determination of being communicable is made and so that when it is determined that it is possible to perform the communication at the predetermined communication speed, the communication is started with the receiving station or with the relay station at the communication speed determined as communicable.

In the transmitting station according to the present invention (or through execution of the transmitting station program), the request signal transmitting means (the request signal transmitting step) transmits the request signal to request the communication at the predetermined communication speed and it is determined whether it is possible to perform the communication at the predetermined communication speed, based on the communication propriety information included in the request response signal transmitted in response to the request signal. When the result of the determination is that it is possible to perform the communication at the predetermined communication speed, the communication is started at the communication speed; when it is impossible to perform the communication at the predetermined communication speed, the request signal is transmitted while stepwise decreasing the request communication speed, before a determination of being communicable is made. This enables the communication at the maximum communication speed available for communication between the transmitting station and the receiving station.

The above transmitting station may be configured to comprise the communication path determining means: having request signal transmitting means for transmitting a request signal to request communication at a predetermined communication speed; and request response signal receiving means for receiving a request response signal containing communication propriety information about propriety of communication, transmitted in response to the request signal transmitted by the request signal transmitting means; and configured so that when that it is possible to perform the communication at the predetermined communication speed is determined based on the communication propriety information included in the request response signal received by the request response signal receiving means, the request signal is transmitted while stepwise increasing the request communication speed, before a determination of being uncommunicable is made; and so that when it is determined that it is impossible to perform the communication at the predetermined communication speed, the communication is started with the receiving station or with the relay station at a maximum communication speed out of communication speeds determined as communicable.

The above transmitting station program may be configured so that the communication path determining step comprises a request signal transmitting step of transmitting a request signal to request communication at a predetermined communication speed; and a request response signal receiving step of receiving a request response signal containing communication propriety information on propriety of communication, transmitted in response to the request signal transmitted in the request signal transmitting step; and configured so that when that it is possible to perform the communication at the predetermined communication speed is determined based on the communication propriety information included in the request response signal received in the request response signal receiving step, the request signal is transmitted while stepwise increasing the request communication speed, before a determination of being uncommunicable is made; and so that when it is determined that it is impossible to perform the communication at the predetermined communication speed, the communication is started with the receiving station or with the relay station at a maximum communication speed out of communication speeds determined as communicable.

In the transmitting station according to the present invention (or through execution of the transmitting station program), the request signal transmitting means (the request signal transmitting step) transmits the request signal at the predetermined communication speed, and whether it is possible to perform the communication at the predetermined communication speed is determined based on the information on propriety of communication included in the request response signal transmitted in response to the request signal. When the result of the determination is that it is possible to perform the communication at the predetermined communication speed, the request signal is transmitted wile stepwise increasing the request communication speed, before a determination of being uncommunicable is made; with a determination of being uncommunicable, the communication is started at a maximum communication speed out of communication speeds determined as communicable. This enables the communication at the maximum communication speed available for communication between the transmitting station and the receiving station. It is also feasible to establish the communication at the first communicable communication speed, which can decrease the period of time before the establishment of connection.

The above transmitting station may be configured to comprise the communication path determining means having: request signal transmitting means for transmitting a request signal; request response signal receiving means for receiving a request response signal to the request signal transmitted by the request signal transmitting means; interstation communication speed determining means for determining an interstation communication speed between the transmitting station and the receiving station or the relay station as a source of the request response signal, based on an interference level at the receiving station or the relay station as a source of the request response signal, included in the request response signal; communication speed determining means for determining a communication speed on a communication path from the transmitting station to the receiving station, based on the interstation communication speed determined by the interstation communication speed determining means and, where the request response signal is one transmitted from the relay station, also based on interstation communication speed information between each pair of stations constituting a communication path from the relay station to the receiving station, included in the request response signal; and communication path selecting means for selecting a communication path on the basis of communication speeds on respective communication paths determined by the communication speed determining means.

The above transmitting station program may be configured so that the communication path determining step comprises a request signal transmitting step of transmitting a request signal; a request response signal receiving step of receiving a request response signal to the request signal transmitted in the request signal transmitting step; an interstation communication speed determining step of determining an interstation communication speed between the transmitting station and the receiving station or the relay station as a source of the request response signal, based on an interference level at the receiving station or the relay station as a source of the request response signal, included in the request response signal; a communication speed determining step of determining a communication speed on a communication path from the transmitting station to the receiving station, based on the interstation communication speed determined in the interstation communication speed determining step and, where the request response signal is one transmitted from the relay station, also based on interstation communication speed information between each pair of stations constituting a communication path from the relay station to the receiving station, included in the request response signal; and a communication path selecting step of selecting a communication path on the basis of communication speeds on respective communication paths determined in the communication speed determining step.

In the transmitting station according to the present invention (or through execution of the transmitting station program), the interstation communication speed determining means (the interstation communication speed communicating step) determines the interstation communication speed between the transmitting station and the receiving station or the relay station as a source of the request response signal, based on the interference level included in the request response signal transmitted from the receiving station or the relay station. The request response signal receiving means (the request response signal receiving step) receives the interstation communication speed information about the interstation communication speed between each pair of stations constituting the communication path between the transmitting station and the receiving station. This permits the transmitting station to determine the total communication speed between the transmitting station and the receiving station on the basis of the interstation communication speed between each pair of stations constituting the communication path between the transmitting station and the receiving station and to determine the communication path with the largest communication speed or the communication path satisfying the required line quality on the basis of the communication speed.

The above transmitting station may be configured to comprise the communication path determining means having: request signal transmitting means for transmitting a request signal; request response signal receiving means for receiving a request response signal to the request signal transmitted by the request signal transmitting means; communication speed determining means for determining a communication speed from the transmitting station to the receiving station, based on interstation communication speed information between each pair of stations constituting a communication path from the transmitting station to the receiving station, included in the request response signal received by the request response signal receiving means; and communication path selecting means for selecting a communication path on the basis of communication speeds on respective communication paths determined by the communication speed determining means.

The above transmitting station program may be configured so that the communication path determining step comprises a request signal transmitting step of transmitting a request signal; a request response signal receiving step of receiving a request response signal to the request signal transmitted in the request signal transmitting step; a communication speed determining step of determining a communication speed from the transmitting station to the receiving station, based on interstation communication speed information between each pair of stations constituting a communication path from the transmitting station to the receiving station, included in the request response signal received in the request response signal receiving step; and a communication path selecting step of selecting a communication path on the basis of communication speeds on respective communication paths determined in the communication speed determining step.

In the transmitting station according to the present invention (or through execution of the transmitting station program), the request response receiving means (the request response signal receiving step) receives the request response signal containing the interstation communication speed information about the interstation communication speed between each pair of stations constituting the communication path between the transmitting station and the receiving station. This permits the transmitting station to determine the total communication speed between the transmitting station and the receiving station on the basis of the interstation communication speed between each pair of stations constituting the communication path between the transmitting station and the receiving station and to determine the communication path with the largest communication speed or the communication path satisfying the required line quality on the basis of the communication speed.

The above transmitting station may be configured to comprise the communication path determining means: having request signal transmitting means for transmitting a request signal; request response signal receiving means for receiving a request response signal to the request signal transmitted by the request signal transmitting means; interstation communication speed determining means for determining an interstation communication speed between each pair of stations constituting a communication path, based on an interference level at each station included in the request response signal; communication speed determining means for determining a communication speed on the communication path from the transmitting station to the receiving station on the basis of the interstation communication speed determined by the interstation communication speed determining means; and communication path selecting means for selecting a communication path on the basis of communication speeds on respective communication paths determined by the communication speed determining means.

The above transmitting station program may be configured so that the communication path determining step comprises a request signal transmitting step of transmitting a request signal; a request response signal receiving step of receiving a request response signal to the request signal transmitted in the request signal transmitting step; an interstation communication speed determining step of determining an interstation communication speed between each pair of stations constituting a communication path, based on an interference level included in the request response signal; a communication speed determining step of determining a communication speed on the communication path from the transmitting station to the receiving station on the basis of the interstation communication speed determined in the interstation communication speed determining step; and a communication path selecting step of selecting a communication path on the basis of communication speeds on respective communication paths determined in the communication speed determining step.

In the transmitting station according to the present invention (or through execution of the transmitting station program), the interstation communication speed determining means (the interstation communication speed determining step) is able to determine the interstation communication speed between each pair of stations constituting the communication path, based on the interference level at each station included in the request response signal, and the communication speed determining means (the communication speed determining step) is able to determine the communication speed between the transmitting station and the receiving station, based on the interstation communication speed between each pair of stations thus determined. The transmitting station is able to determine the communication path, based on the communication speeds on the respective communication paths determined in this way.

The above transmitting station (transmitting station program) may be configured so that, where there exist a plurality of communication paths satisfying the required line quality, the communication path determining means (communication path determining step) determines a path with a smallest hop count between the transmitting station and the receiving station, as a communication path.

Increase of the hop count can bring about a delay at each relay station and, where there are a plurality of communication paths satisfying the required line quality, it is preferable to select the communication path with the smallest hop count. When a predetermined delay time is given as the required line quality, a hop count permitted for clearing the given delay time can be defined as a threshold. The required line quality can be satisfied by determining a communication path with a hop count smaller than the threshold.

The above transmitting station (transmitting station program) may be configured so that, where there exist a plurality of communication paths satisfying the required line quality, the communication path determining means (the communication path determining step) determines a path with a small total of transmission powers at the transmitting station and at the relay station forming the communication path, as a communication path.

Decrease in the total of transmission powers can suppress increase in interference noise due to relaying of packet transmission at the relay station, and, where there are a plurality of communication paths satisfying the required line quality, it is preferable to select the communication path with the small total of transmission powers.

The above transmitting station (transmitting station program) may be configured so that, where there exist a plurality of communication paths satisfying the required line quality, the communication path determining means (the communication path determining step) determines a path with a small transmission power at the transmitting station, as a communication path.

In the case where power is supplied to the relay station and to the receiving station, it is preferable to minimize the transmission power at the transmitting station which is normally comprised of a cell phone or the like.

The above transmitting station (transmitting station program) may be configured so that the communication path determining means (the communication path determining step) determines a communication path out of communication paths having a hop count between the transmitting station and the receiving station of not more than a predetermined threshold.

Increase of the hop count can bring about a delay at each relay station and it is thus preferable to preliminarily define a hop count of an upper limit in determining a communication path. When a predetermined delay time is given as the required line quality, a hop count permitted for clearing the given delay time can be defined as a threshold. The required line quality can be satisfied by determining a communication path with a hop count smaller than the threshold.

In the above transmitting station (transmitting station program), it is preferable to vary the communication speed, by changing a modulation system or a spreading system.

A receiving station according to the present invention is a receiving station applied to a mobile communication system and configured to receive a packet from a transmitting station through a communication path with an intermediary of at least one relay station or through a communication path without an intermediary of a relay station, the receiving station comprising communication path determining means for determining a communication path with a largest communication speed or a communication path satisfying a required line quality, based on interference levels of respective signals received at a relay station constituting a communication path between the transmitting station and the receiving station, and at the receiving station.

A program for the receiving station according to the present invention is a program applied to a mobile communication system and, for receiving a packet from a transmitting station through a communication path with an intermediary of at least one relay station or through a communication path without an intermediary of a relay station, letting a computer execute a communication path determining step of determining a communication path with a largest communication speed or a communication path satisfying a required line quality, based on interference levels of respective signals received at a relay station constituting a communication path between the transmitting station and the receiving station, and at the receiving station.

For determining a communication path by multihop connection or by single hop connection, the receiving station according to the present invention determines the communication path with the largest communication speed or the communication path satisfying the required line quality, based on the interference levels of the respective signals received at the relay station forming the communication path and at the receiving station, whereby it can achieve implementation of fast communication.

The receiving station program according to the present invention can substantialize the aforementioned transmitting station when executed by the computer, and determines the communication path with the largest communication speed or the communication path satisfying the required line quality, based on the interference levels of the respective signals received at the relay station forming the communication path and at the receiving station, whereby it can achieve implementation of fast communication.

The above receiving station may be configured to comprise the communication path determining means having: request signal receiving means for receiving a request signal transmitted from the transmitting station or the relay station; interference level measuring means for measuring an interference level at the receiving station when the request signal receiving means receives a request signal; interstation communication speed determining means for determining an interstation communication speed between the receiving station and the transmitting station or the relay station as a source of the request signal, based on the interference level measured by the interference level measuring means; communication speed determining means for determining a communication speed between the transmitting station and the receiving station, based on the interstation communication speed determined by the interstation communication speed determining means and, where the request signal is one received from the relay station, also based on interstation communication speed information between each pair of stations constituting a communication path from the transmitting station to the relay station, included in the request signal; and communication path selecting means for selecting a communication path, based on communication speeds on respective communication paths determined by the communication speed determining means.

The above receiving station program may be configured so that the communication path determining step comprises a request signal receiving step of receiving a request signal transmitted from the transmitting station or the relay station; an interference level measuring step of measuring an interference level at the receiving station when a request signal is received in the request signal receiving step; an interstation communication speed determining step of determining an interstation communication speed between the receiving station and the transmitting station or the relay station as a source of the request signal, based on the interference level measured in the interference level measuring step; a communication speed determining step of determining a communication speed between the transmitting station and the receiving station, based on the interstation communication speed determined in the interstation communication speed determining step and, where the request signal is one received from the relay station, also based on interstation communication speed information between each pair of stations constituting a communication path from the transmitting station to the relay station, included in the request signal; and a communication path selecting step of selecting a communication path, based on communication speeds on respective communication paths determined in the communication speed determining step.

In the case of the receiving station according to the present invention (or through execution of the receiving station program), the receiving station measures the interference level at the receiving station itself when receiving a request signal having been transmitted from the transmitting station or the relay station, and determines the interstation communication speed between the receiving station and the transmitting station or the relay station as a source of the request signal on the basis of the measured interference level. In the receiving station, the request signal receiving means (the request signal receiving step) receives the request signal containing the interstation communication speed information about the interstation communication speed between each pair of stations forming the communication path between the transmitting station and the receiving station. This permits the receiving station to determine the total communication speed between the transmitting station and the receiving station on the basis of the interstation communication speed between each pair of stations constituting the communication path between the transmitting station and the receiving station and to determine the communication path with the largest communication speed or the communication path satisfying the required line quality on the basis of the communication speed. The receiving station then transmits the information about the determined communication path to the transmitting station, whereby the transmitting station can transmit a packet to the receiving station in accordance with the determined communication path.

The above receiving station may be configured to comprise the communication path determining means having: request signal receiving means for receiving a request signal transmitted from the transmitting station or the relay station; interference level measuring means for measuring an interference level at the receiving station when the request signal receiving means receives a request signal; interstation communication speed determining means for determining an interstation communication speed between each pair of stations constituting a communication path, based on the interference level measured by the interference level measuring means and, where the request signal is one transmitted from the relay station, also based on an interference level included in the request signal; communication speed determining means for determining a communication speed between the transmitting station and the receiving station on the basis of the interstation communication speed determined by the interstation communication speed determining means; and communication path selecting means for selecting a communication path, based on communication speeds on respective communication paths determined by the communication speed determining means.

The above receiving station program may be configured so that the communication path determining step comprises a request signal receiving step of receiving a request signal transmitted from the transmitting station or the relay station; an interference level measuring step of measuring an interference level at the receiving station when a request signal is received in the request signal receiving step; an interstation communication speed determining step of determining an interstation communication speed between each pair of stations constituting a communication path, based on the interference level measured in the interference level measuring step and based on an interference level included in the request signal; a communication speed determining step of determining a communication speed between the transmitting station and the receiving station on the basis of the interstation communication speed determined in the interstation communication speed determining step; and a communication path selecting step of selecting a communication path, based on communication speeds on respective communication paths determined in the communication speed determining step.

In the receiving station according to the present invention (or through execution of the receiving station program), the interstation communication speed determining means (the interstation communication speed determining step) is able to determine the interstation communication speed between each pair of stations constituting a communication path, based on the interference level at each station included in the request signal, and the communication speed determining means (the communication speed determining step) is able to determine the communication speed between the transmitting station and the receiving station, based on the interstation communication speed between each pair of stations thus determined. The receiving station is able to determine the communication path, based on the communication speeds on the respective communication paths determined in this way.

The above receiving station (receiving station program) may be configured so that, where there exist a plurality of communication paths satisfying the required line quality, the communication path determining means (the communication path determining step) determines a path with a smallest hop count between the transmitting station and the receiving station, as a communication path.

Increase of the hop count can bring about a delay at each relay station and, where there are a plurality of communication paths satisfying the required line quality, it is preferable to select the communication path with the smallest hop count. When a predetermined delay time is given as the required line quality, a hop count permitted for clearing the given delay time can be defined as a threshold. The required line quality can be satisfied by determining a communication path with a hop count smaller than the threshold.

The above receiving station (receiving station program) may be configured so that, where there exist a plurality of communication paths satisfying the required line quality, the communication path determining means (the communication path determining step) determines a path with a small total of transmission powers at the transmitting station and at the relay station constituting the communication path, as a communication path.

Decrease in the total of transmission powers can suppress increase in interference noise due to relaying of packet transmission at the relay station, and, where there are a plurality of communication paths satisfying the required line quality, it is preferable to select the communication path with the small total of transmission powers.

The above receiving station (receiving station program) may be configured so that, where there exist a plurality of communication paths satisfying the required line quality, the communication path determining means (the communication path determining step) determines a path with a small transmission power at the transmitting station, as a communication path.

In the case where power is supplied to the relay station and to the receiving station, it is preferable to minimize the transmission power at the transmitting station which is normally comprised of a cell phone or the like.

The above receiving station (receiving station program) may be configured so that the communication path determining means (the communication path determining step) determines a communication path out of communication paths having a hop count of not more than a predetermined threshold.

Increase of the hop count can bring about a delay at each relay station and it is thus preferable to preliminarily define a hop count of an upper limit in determining a communication path. When a predetermined delay time is given as the required line quality, a hop count permitted for clearing the given delay time can be defined as a threshold. The required line quality can be satisfied by determining a communication path with a hop count smaller than the threshold.

In the above receiving station (receiving station program, it is preferable to vary the communication speed, by changing a modulation system or a spreading system.

A receiving station according to the present invention is a receiving station comprising: request signal receiving means for receiving a request signal transmitted from a transmitting station through a communication path with an intermediary of at least one relay station or through a communication path without an intermediary of a relay station; interference level measuring means for measuring an interference level at the receiving station when the request signal receiving means receives a request signal; communication propriety determining means for determining whether it is possible to perform communication at a communication speed included in the request signal, based on the interference level measured by the interference level measuring means; and request response signal transmitting means for transmitting a request response signal containing information on propriety of communication determined by the communication propriety determining means, through the communication path to the transmitting station.

A program for the receiving station according to the present invention is a program applied to a mobile communication system and, for receiving a packet from a transmitting station through a communication path with an intermediary of at least one relay station or through a communication path without an intermediary of a relay station, letting a computer execute: a request signal receiving step of receiving a request signal transmitted from the transmitting station through a communication path with an intermediary of at least one relay station or through a communication path without an intermediary of a relay station; an interference level measuring step of measuring an interference level at the receiving station when a request signal is received in the request signal receiving step; a communication propriety determining step of determining whether it is possible to perform communication at a communication speed included in the request signal, based on the interference level measured in the interference level measuring step; and a request response signal transmitting step of transmitting a request response signal containing information on propriety of communication determined in the communication propriety determining step, through the communication path to the transmitting station.

The receiving station according to the present invention (the receiving station program as executed) measures the interference level at the receiving station when receiving a request signal, and determines whether it is possible to perform the communication requested by the request signal, on the basis of the measured interference level. Then the receiving station puts the information about propriety of communication based on the result of this determination into a request response signal and transmits the request response signal to the transmitting station, whereby the transmitting station can acquire the information about propriety of communication at the receiving station and use it on the occasion of determining the communication path.

Another receiving station according to the present invention is a receiving station comprising: request signal receiving means for receiving a request signal transmitted from the transmitting station or from the relay station; interference level measuring means for measuring an interference level at the receiving station when the request signal receiving means receives a request signal; interstation communication speed determining means for determining an interstation communication speed between the receiving station and the transmitting station or the relay station as a source of the request signal, based on the interference level measured by the interference level measuring means; and request response signal transmitting means for transmitting a request response signal containing the interstation communication speed information determined by the interstation communication speed determining means, to the transmitting station or the relay station as a source of the request signal.

A program for the receiving station according to the present invention is a program applied to a mobile communication system and, for receiving a packet from a transmitting station through a communication path with an intermediary of at least one relay station or through a communication path without an intermediary of a relay station, letting a computer execute: a request signal receiving step of receiving a request signal transmitted from the transmitting station or from a relay station; an interference level measuring step of measuring an interference level at the receiving station when a request signal is received in the request signal receiving step; an interstation communication speed determining step of determining an interstation communication speed between the receiving station and the transmitting station or the relay station as a source of the request signal, based on the interference level measured in the interference level measuring step; and a request response signal transmitting step of transmitting a request response signal containing the interstation communication speed information determined in the interstation communication speed determining step, to the transmitting station or the relay station as a source of the request signal.

The receiving station according to the present invention (the receiving station program as executed) measures the interference level at the receiving station when receiving a request signal, and determines the interstation communication speed between the receiving station and the transmitting station or the relay station as a source of the request signal on the basis of the measured interference level. Then the receiving station puts the information about the interstation communication speed into a request response signal and transmits it to the transmitting station, whereby the transmitting station can acquire the interstation communication speed information at the receiving station and use it on the occasion of determining the communication path.

A relay station according to the present invention is a relay station comprising: request signal receiving means for receiving a request signal transmitted from a transmitting station through a communication path with an intermediary of at least one relay station or through a communication path without an intermediary of a relay station; interference level measuring means for measuring an interference level at the host relay station when the request signal receiving means receives a request signal; communication propriety determining means for determining whether it is possible to perform communication at a communication speed included in the request signal, based on the interference level measured by the interference level measuring means; and request response signal transmitting means for transmitting a request response signal containing information on propriety of communication determined by the communication propriety determining means, through the communication path to the transmitting station.

A program for the relay station according to the present invention is a program applied to a multihop mobile communication system and, for relaying transmission of a packet from a transmitting station to a receiving station, letting a computer execute: a request signal receiving step of receiving a request signal transmitted from the transmitting station through a communication path with an intermediary of at least one relay station or through a communication path without an intermediary of a relay station; an interference level measuring step of measuring an interference level at the host relay station when a request signal is received in the request signal receiving step; a communication propriety determining step of determining whether it is possible to perform communication at a communication speed included in the request signal, based on the interference level measured in the interference level measuring step; and a request response signal transmitting step of transmitting a request response signal containing information on propriety of communication determined in the communication propriety determining step, through the communication path to the transmitting station.

The relay station according to the present invention (the relay station program as executed) measures the interference level at the relay station itself when receiving a request signal, and determines whether it is possible to perform the communication requested by the request signal, on the basis of the interference level. Then the relay station puts the information about propriety of communication based on the result of this determination into a request response signal and transmits it to the transmitting station, whereby the transmitting station can acquire the communication propriety information at the relay station and use the communication propriety information on the occasion of determining the communication path.

The above relay station may be configured to further comprise request signal transmitting means for transmitting a request signal to the receiving station or another relay station only when the communication propriety determining means determines that it is possible to perform the communication; and request response signal receiving means for receiving a request response signal to the request signal transmitted by the request signal transmitting means.

The above relay station program may be configured to let the computer further execute: a request signal transmitting step of transmitting a request signal to the receiving station or another relay station only when the communication propriety determining step results in determining that it is possible to perform the communication; and a request response signal receiving step of receiving a request response signal to the request signal transmitted in the request signal transmitting step.

When a path between certain stations forming a communication path is uncommunicable, it is impossible to perform the communication using the communication path; therefore, only when the communication propriety determining means (the communication propriety determining step) determines that it is possible to perform the communication through the relay station, a further request signal is transmitted to search for a communication path toward the receiving station; when it is determined that it is impossible to perform the communication, the transmission of the request signal is terminated at that point and the request response signal containing the information indicating the uncommunicable state is transmitted, whereby it is feasible to prevent transmission of ineffectual request signals and thus achieve increase of efficiency of the mobile communication system including the relay station.

Another relay station according to the present invention may be a relay station comprising: request signal receiving means for receiving a request signal transmitted from a transmitting station or from another relay station; interference level measuring means for measuring an interference level at the host relay station when the request signal receiving means receives a request signal; request signal transmitting means for transmitting a request signal; request response signal receiving means for receiving a request response signal transmitted from a receiving station or from a second other relay station, in response to the request signal transmitted by the request signal transmitting means; interstation communication speed determining means for determining an interstation communication speed between the host relay station and the receiving station or the second other relay station as a source of the request response signal, based on an interference level included in the request response signal received by the request response signal receiving means; and request response signal transmitting means for transmitting a request response signal containing the interference level measured by the interference level measuring means, and the interstation communication speed information determined by the interstation communication speed determining means, and, where the request response signal is one received from the second other relay station, also containing interstation communication speed information included in the request response signal, to the transmitting station or the other relay station as a source of the request signal.

A program for the relay station according to the present invention may be a program applied to a multihop mobile communication system and, for relaying transmission of a packet from a transmitting station to a receiving station, letting a computer execute: a request signal receiving step of receiving a request signal transmitted from the transmitting station or from another relay station; an interference level measuring step of measuring an interference level at the host relay station when a request signal is received in the request signal receiving step; a request signal transmitting step of transmitting a request signal; a request response signal receiving step of receiving a request response signal transmitted from the receiving station or from a second other relay station, in response to the request signal transmitted in the request signal transmitting step; an interstation communication speed determining step of determining an interstation communication speed between the host relay station and the receiving station or the second other relay station as a source of the request response signal, based on an interference level included in the request response signal received in the request response signal receiving step; and a request response signal transmitting step of transmitting a request response signal containing the interference level measured in the interference level measuring step, and the interstation communication speed information determined in the interstation communication speed determining step, and, where the request response signal is one received from the second other relay station, also containing interstation communication speed information included in the request response signal, to the transmitting station or the other relay station as a source of the request signal.

In the case of the relay station according to the present invention (or through execution of the relay station program), the relay station measures the interference level at the relay station itself when receiving a request signal having been transmitted from the transmitting station or from another relay station, and transmits a request response signal containing the measured interference level to the transmitting station or the relay station as a source of the request signal. The relay station transmits the request signal and determines the interstation communication speed between the relay station and the receiving station or second other relay station as a source of the request response signal, based on the interference level included in the request response signal to the request signal. Then the relay station puts the interstation communication speed information about the interstation communication speed thus determined, into a request response signal and transmits the request response signal to the transmitting station or the relay station as a source of the request signal. This permits the relay station to transmit the information about the interstation communication speed between each pair of stations constituting a communication path between the transmitting station and the receiving station, to the transmitting station, whereby the transmitting station is able to determine the total communication speed between the transmitting station and the receiving station on the basis of the interstation communication speed between each pair of stations and to determine the communication path with the largest communication speed or the communication path satisfying the required line quality on the basis of the communication speed.

Another relay station according to the present invention is a relay station comprising: request signal receiving means for receiving a request signal transmitted from a transmitting station or from another relay station; interference level measuring means for measuring an interference level at the host relay station when the request signal receiving means receives a request signal; interstation communication speed determining means for determining an interstation communication speed between the host relay station and the transmitting station or the other relay station as a source of the request signal, based on the interference level measured by the interference level measuring means; request signal transmitting means for transmitting a request signal; request response signal receiving means for receiving a request response signal transmitted from a receiving station or from a second other relay station, in response to the request signal transmitted by the request signal transmitting means; and request response signal transmitting means for transmitting a request response signal containing the interstation communication speed information determined by the interstation communication speed determining means, and interstation communication speed information included in the request response signal received by the request response signal receiving means, to the transmitting station or the other relay station as a source of the request signal.

A program for the relay station according to the present invention is a program applied to a multihop mobile communication system and, for relaying transmission of a packet from a transmitting station to a receiving station, letting a computer execute: a request signal receiving step of receiving a request signal transmitted from the transmitting station or from another relay station; an interference level measuring step of measuring an interference level at the host relay station when a request signal is received in the request signal receiving step; an interstation communication speed determining step of determining an interstation communication speed between the host relay station and the transmitting station or the other relay station as a source of the request signal, based on the interference level measured in the interference level measuring step; a request signal transmitting step of transmitting a request signal; a request response signal receiving step of receiving a request response signal transmitted from the receiving station or from a second other relay station, in response to the request signal transmitted in the request signal transmitting step; and a request response signal transmitting step of transmitting a request response signal containing the interstation communication speed information determined in the interstation communication speed determining step, and interstation communication speed information included in the request response signal received in the request response signal receiving step, to the transmitting station or the other relay station as a source of the request signal.

The relay station according to the present invention (the relay station program as executed) measures the interference level at the relay station itself when receiving a request signal having been transmitted from the transmitting station or from another relay station, and determines the interstation communication speed between the relay station and the transmitting station or the relay station as a source of the request signal on the basis of the measured interference level. Then the relay station puts the interstation communication speed information about the interstation communication speed thus determined, into a request response signal and transmits it to the transmitting station. This permits the relay station to transmit the information about the interstation communication speed between each pair of stations constituting a communication path between the transmitting station and the receiving station, to the transmitting station, whereby the transmitting station is able to determine the total communication speed between the transmitting station and the receiving station on the basis of the interstation communication speed between each pair of stations and to determine the communication path with the largest communication speed or the communication path satisfying the required line quality on the basis of the communication speed.

Another relay station according to the present invention is a relay station comprising: request signal receiving means for receiving a request signal transmitted from a transmitting station or from another relay station; interference level measuring means for measuring an interference level at the host relay station when the request signal receiving means receives a request signal; interstation communication speed determining means for determining an interstation communication speed between the host relay station and the transmitting station or the other relay station as a source of the request signal, based on the interference level measured by the interference level measuring means; and request signal transmitting means for transmitting a request signal containing the interstation communication speed information determined by the interstation communication speed determining means, and, where the request signal is one received from the other relay station, also containing interstation communication speed information included in the request signal.

A program for the relay station according to the present invention is a program applied to a multihop mobile communication system and, for relaying transmission of a packet from a transmitting station to a receiving station, letting a computer execute: a request signal receiving step of receiving a request signal transmitted from the transmitting station or from another relay station; an interference level measuring step of measuring an interference level at the host relay station when a request signal is received in the request signal receiving step; an interstation communication speed determining step of determining an interstation communication speed between the host relay station and the transmitting station or the other relay station as a source of the request signal, based on the interference level measured in the interference level measuring step; and a request signal transmitting step of transmitting a request signal containing the interstation communication speed information determined in the interstation communication speed determining step and, where the request signal is one received from the other relay station, also containing interstation communication speed information included in the request signal.

The relay station according to the present invention (the relay station program as executed) measures the interference level at the relay station itself when receiving a request signal having been transmitted from the transmitting station or from another relay station, and determines the interstation communication speed between the relay station and the transmitting station or the other relay station as a source of the request signal on the basis of the measured interference level. Then the relay station puts the interstation communication speed information about the interstation communication speed thus determined, into a request signal and transmits the request signal to the receiving station. This permits the relay station to transmit the information about the interstation communication speed between each pair of stations constituting a communication path between the transmitting station and the receiving station, to the receiving station, whereby the receiving station is able to determine the total communication speed between the transmitting station and the receiving station on the basis of the interstation communication speed between each pair of stations and to determine the communication path with the largest communication speed or the communication path satisfying the required line quality on the basis of the communication speed. Then the receiving station transmits the information about the determined communication path to the transmitting station, whereby the transmitting station can transmit a packet to the receiving station in accordance with the determined communication path.

In addition to the above mobile communication systems, the present invention further provides the mobile communication system wherein the receiving station and relay station comprise: request signal receiving means for receiving a request signal transmitted from the transmitting station through a communication path with an intermediary of at least one relay station or through a communication path without an intermediary of a relay station; interference level measuring means for measuring an interference level at the host station when the request signal receiving means receives a request signal; and communication propriety determining means for memorizing either of a receiving-station target value and a relay-station target value for control of transmission power independently set at the receiving station and at the relay station; wherein the communication propriety determining means of the receiving station determines whether it is possible to perform communication requested by a request signal, based on the interference level measured by the interference level measuring means and based on the receiving-station target value, and the communication propriety determining means of the relay station determines whether it is possible to perform communication requested by a request signal, based on the interference level and the relay-station target value; and wherein the communication path determining means determines a communication path on the basis of proprieties of the communications determined by the respective communication propriety determining means.

The invention also provides the mobile communication system wherein the interstation communication speed determining means memorizes a receiving-station target value and a relay-station target value for control of transmission power independently set at the receiving station and at the relay station and determines the interstation communication speed, based on the interference levels at the respective stations constituting the communication path, the receiving-station target value, and the relay-station target value.

In these mobile communication systems, the base-station target value is set to the minimum necessary value and the relay-station target value to one different therefrom, whereby it is feasible to suppress the decrease of system capacity while lowering the error rate of the entire system.

In addition to the aforementioned transmitting stations, the present invention further provides the transmitting station wherein the communication path determining means memorizes a receiving-station target value and a relay-station target value for control of transmission power independently set at the receiving station and at the relay station, and determines the communication path with the largest communication speed or the communication path satisfying the required line quality, based on the interference levels of the respective signals received at the relay station constituting the communication path and at the receiving station, the receiving-station target value, and the relay-station target value.

Furthermore, the invention provides the transmitting station wherein the interstation communication speed determining means memorizes a receiving-station target value and a relay-station target value for control of transmission power independently set at the receiving station and at the relay station, and determines the interstation communication speed, based on the interference level at the receiving station or the relay station as a source of the request response signal, the receiving-station target value, and the relay-station target value.

According to these transmitting stations, it is feasible to suppress the decrease of system capacity while lowering the error rate of the entire system.

In addition to the aforementioned receiving stations, the present invention further provides the receiving station wherein the communication propriety determining means memorizes a receiving-station target value for control of transmission power set independently of the relay station, and determines whether it is possible to perform the communication at the communication speed included in the request signal, based on the interference level and the receiving-station target value.

Furthermore, in addition to the aforementioned relay stations, the present invention provides the relay station wherein the communication propriety determining means memorizes a relay-station target value for control of transmission power set independently of the receiving station for performing packet transmission, and determines whether it is possible to perform the communication at the communication speed included in the request signal, based on the interference level and the relay-station target value.

The present invention also provides the relay station wherein the interstation communication speed determining means memorizes a relay-station target value for control of transmission power set independently of the receiving station for performing packet transmission, and determines the interstation communication speed, based on the interference level and the relay-station target value.

According to each of these stations, it is feasible to suppress the decrease of system capacity while lowering the error rate of the entire system.

In addition to the aforementioned communication path determining methods, the present invention further provides the communication path determining method wherein the communication path determining step is to determine the communication path with the largest communication speed or the communication path satisfying the required line quality, based on the interference levels of the respective signals received at the relay station and at the receiving station, and based on a receiving-station target value and a relay-station target value for control of transmission power independently set at the receiving station and at the relay station.

According to this communication path determining method, it is feasible to suppress the decrease of system capacity while lowering the error rate of the entire system.

In addition to the aforementioned communication path determining programs, the present invention further provides the communication path determining program wherein the communication path determining step is to determine the communication path with the largest communication speed or the communication path satisfying the required line quality, based on the interference levels of the respective signals received at the relay station and at the receiving station, and based on a receiving-station target value and a relay-station target value for control of transmission power independently set at the receiving station and at the relay station.

The invention also provides a communication path control program applied to a multihop mobile communication system and, for relaying transmission of a packet from a transmitting station to a receiving station, letting a computer execute: a request signal receiving step of receiving a request signal transmitted from the transmitting station through a communication path with an intermediary of at least one relay station or through a communication path without an intermediary of a relay station; an interference level measuring step of measuring an interference level at a host station when a request signal is received in the request signal receiving step; a communication propriety determining step of determining whether it is possible to perform communication at a communication speed included in the request signal, based on the interference level measured in the interference level measuring step and based on a relay-station target value for control of transmission power set independently of the receiving station; and a request response signal transmitting step of transmitting a request response signal containing information on propriety of communication determined in the communication propriety determining step, through the communication path to the transmitting station.

The invention also provides the communication path control program wherein an interstation communication speed determining step is to determine an interstation communication speed, based on the interference level and the relay-station target value for control of transmission power set independently of the receiving station.

When these programs are executed by the computer, as in the case of the communication path determining methods, it is feasible to suppress the decrease of system capacity while lowering the error rate of the entire system.

The above object and other features and advantages of the present invention will become apparent to those skilled in the art by reading the following detailed description with reference to the accompanying drawings.

BRIEF DESCRIPTION OF THE DRAWINGS

FIG. 6 is an illustration showing an example of radio link design in a mobile communication system according to an embodiment.

FIG. 9 is a flowchart showing the operation of a communication path determining method according to an embodiment.

FIG. 18A is an illustration showing a configuration of another computer program for the transmitting station according to an embodiment. FIG. 18B is an illustration showing a configuration of another computer program for the relay station according to an embodiment. FIG. 18C is an illustration showing a configuration of another computer program for the receiving station according to an embodiment.

BEST MODE FOR CARRYING OUT THE INVENTION

The preferred embodiments of the mobile communication system according to the present invention will be described below in detail with reference to the drawings. It is noted that the same reference symbols will denote the same elements throughout the description of the drawings, without redundant description thereof.

First Embodiment

Outline of Entire Mobile Communication System

Figure 1:
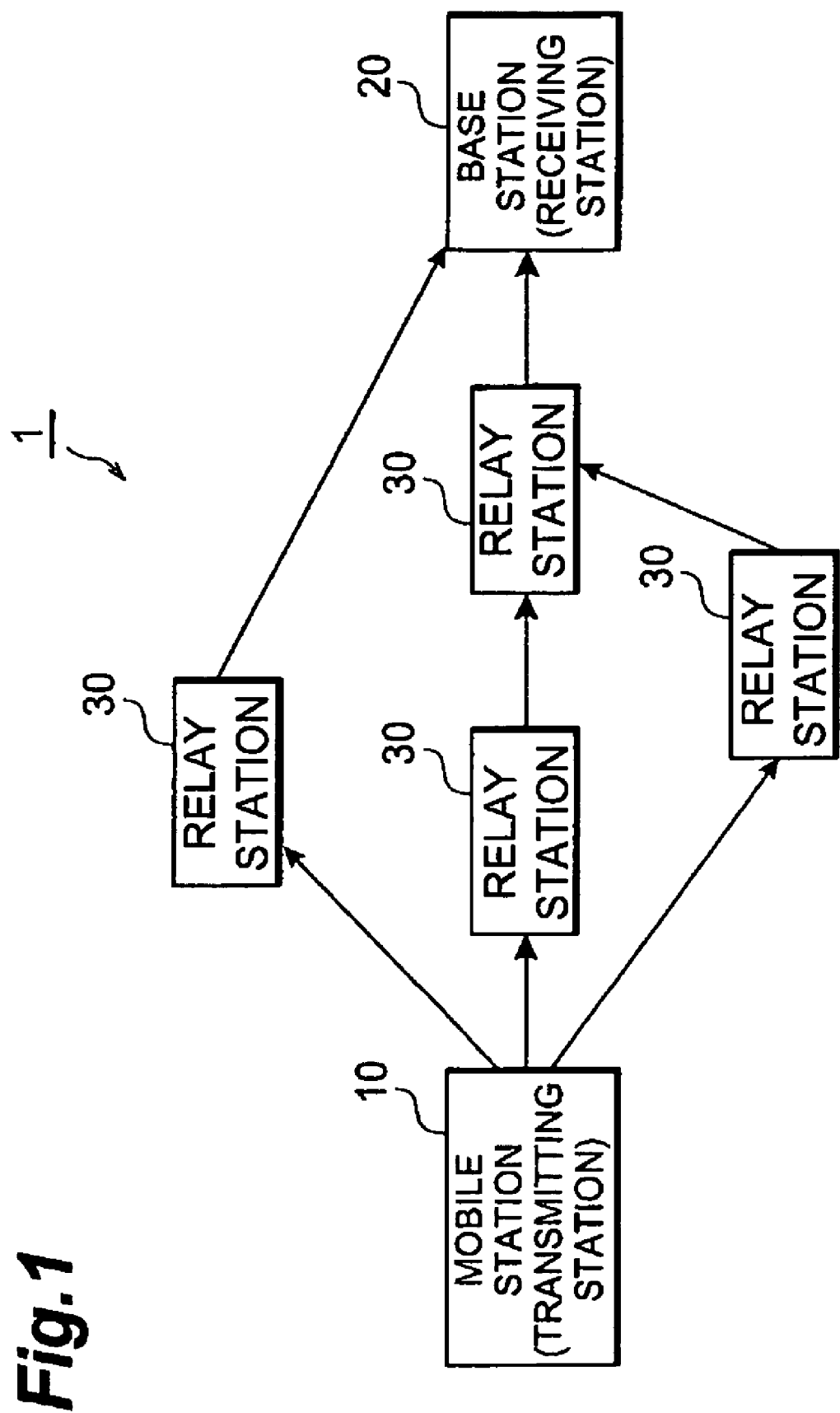
FIG. 1 is an illustration showing a configuration of a mobile communication system according to an embodiment.

FIG. 1 is an illustration showing the configuration of mobile communication system 1 according to the present embodiment. As shown in FIG. 1, mobile communication system 1 of the first embodiment is comprised of mobile station 10, at least one relay station 30, and base station 20. The description herein will be given on the assumption that the "transmitting station" is mobile station 10 such as is a cell phone owned by a user and the "receiving station" is base station 20 that can be connected to another base station 20 through a core network, but it is noted that the transmitting station can be base station 20 and the receiving station mobile station 10 or that the transmitting station can be one of relay stations 30. Relay station 30 is a terminal (relay terminal) having a function of relaying a packet from mobile station 10 to base station 20 or relaying a packet from base station 20 to mobile station 10. Since this relay station 30 consumes power for packet relaying, it is considered to be a terminal capable of receiving supply of power from a solar cell or a power generator, or through a wire, in addition to terminal equipment powered by the conventional battery. Conceivable examples of relay station 30 include those installed by a telecommunications carrier for the purpose of reduction of cost in place of base stations 20 to cover areas, those receiving supply of electricity with movement like automobiles and trains, those fixed and receiving supply of power like vending machines, and so on. Namely, relay station 30 corresponds to equipment having the function of mobile station 10 and the relaying function, and to relaying apparatus installed on such vehicles as automobiles, trains, and the like and on vending machines.

Incidentally, in the present system base station 20 need secure a connection with mobile station 10 directly or via at least one relay station 30. For this reason, each base station 20 updates and retains at every predetermined interval of time, not only affiliation information of mobile station 10 capable of direct communication, but also affiliation information of relay station 30 capable of direct communication and affiliation information of mobile station 10 incapable of direct communication but capable of communication via relay station 30. This enables base station 20 to retain the affiliation information of all mobile stations 10 capable of direct and indirect communication, whereby connection is secured between base station 20 and all the mobile stations 10 capable of indirect and direct communication.

Each of mobile station 10 and relay station 30 spreads and transmits a request signal with information of its own ID at every predetermined interval of time, in order to secure a connection path to base station 20. Every station receiving a request signal transmits a request response signal to the request signal. The request response signal contains relay information (e.g., containing information such as an ID of the source station, an ID of mobile station 10 having transmitted the original request signal, an interference level at the source station, a hop count and a communication speed to base station 20, and so on). Mobile station 10, receiving a request response signal, determines a connection path from the information in the signal, transmits an ACK signal to a station to be connected, and establishes the connection path.

Figure 2:
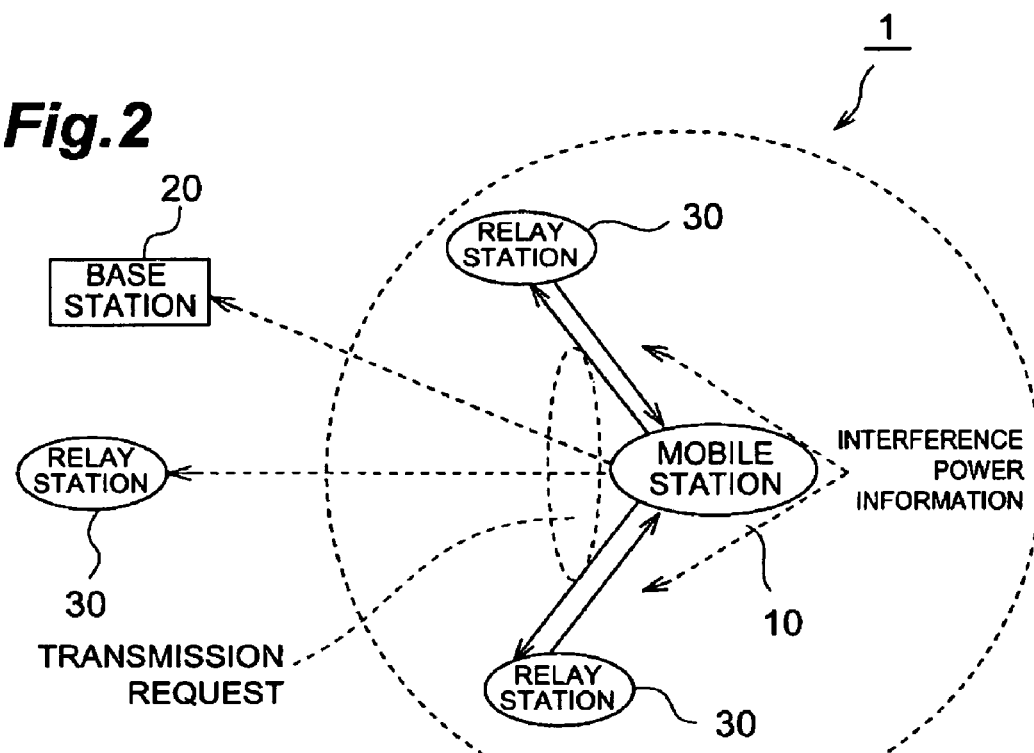
FIG. 2 is an illustration showing a configuration of a mobile communication system according to an embodiment.

For example, mobile station 10 shown in FIG. 2, spreads and transmits the request signal in order to secure a connection path to base station 20. A dotted circle represents a range of arrival of the request signal from mobile station 10, and each relay station 30 existing in the range of arrival, when receiving the request signal, transmits a request response signal accompanied by the relay information. Then mobile station 10, receiving this request response signal, determines a connection path from the relay information of the request response signal, transmits an ACK signal to a station to be connected (e.g., relay station 30), and establishes the connection path (mobile station 10—relay station 30—base station 20).

The configurations of mobile station 10, base station 20, and relay station 30 constituting the present system will be described below with focus on portions associated with the present invention.

[About Mobile Station]

Figure 3:
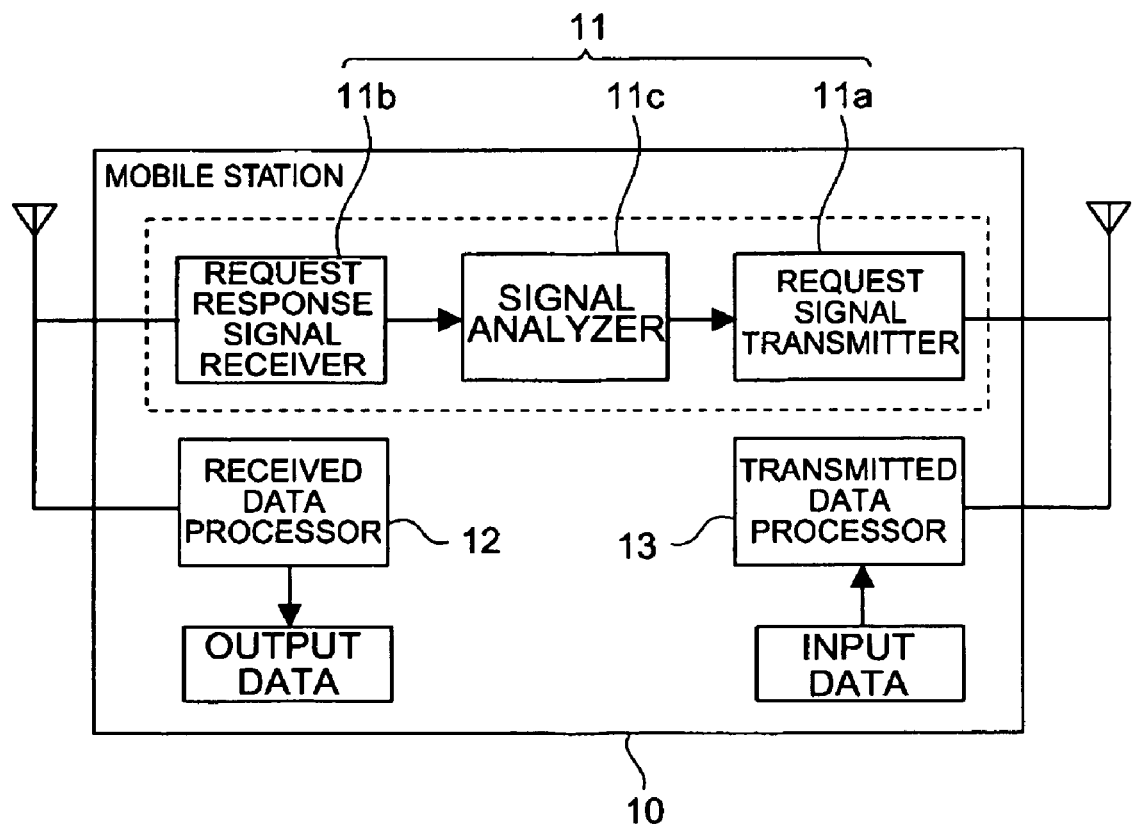
FIG. 3 is an illustration showing a configuration of a mobile station according to an embodiment.

The configuration of mobile station 10 will be described below referring to FIG. 3. As shown in FIG. 3, mobile station 10 is comprised of transmitted data processor 13 for processing input data and transmitting the processed data; received data processor 12 for processing a received signal and converting the processed data into output data; request signal transmitter 11a for transmitting a request signal; request response signal receiver 11b for receiving a request response signal to a request signal; and signal analyzer 11c. Here the request signal transmitter 11a, request response signal receiver 11b, and signal analyzer 11c constitute communication path determiner 11 for determining a communication path.

Request signal transmitter 11a has a function of transmitting a request signal containing an ID for identifying the host station and information about a request communication speed. Request signal transmitter 11a transmits the request signal on a regular basis or at timing of communication.

Request response signal receiver 11b has a function of receiving a request response signal transmitted in response to a request signal. A request response signal received is fed into signal analyzer 11c.

Signal analyzer 11c has a function of analyzing an input request response signal and determining whether it is possible to perform communication with base station 20 through a predetermined communication path on the basis of communication propriety information included in the request response signal. It further has a function of giving an instruction about whether request signal transmitter 11a should transmit a request signal, based on the result of the determination.

Mobile station 10 may also include a channel group selector for selecting a channel group, a hop count information buffer for memorizing information of a hop count, and so on.

[About Relay Station]

In the present embodiment, relay station 30 is not a terminal functioning as a repeater for relaying a spread signal received as it is, but a terminal having capability of despreading signals received from a plurality of mobile stations 10 or base stations 20 and decoding them into information sequences. Relay station 30 calculates transmission powers according to desired reception levels notified of by stations to receive packets (packet receivers), again spreads the information sequences, assigns the calculated transmission powers to the respective spread sequences independently of each other, and places and transmits the spread information sequence signals on predetermined channels (e.g., channels according to channel groups selected based on hop counts to base station 20).

Since the relay station has the function of calculating a transmission power according to a desired reception level of a packet receiver, it can implement stable and reliable transmission using the transmission power. Since relay station 30 despreads a received signal once and decodes it into an information sequence (to be spread), it is feasible to effect a correction for gain of the signal.

Figure 4:
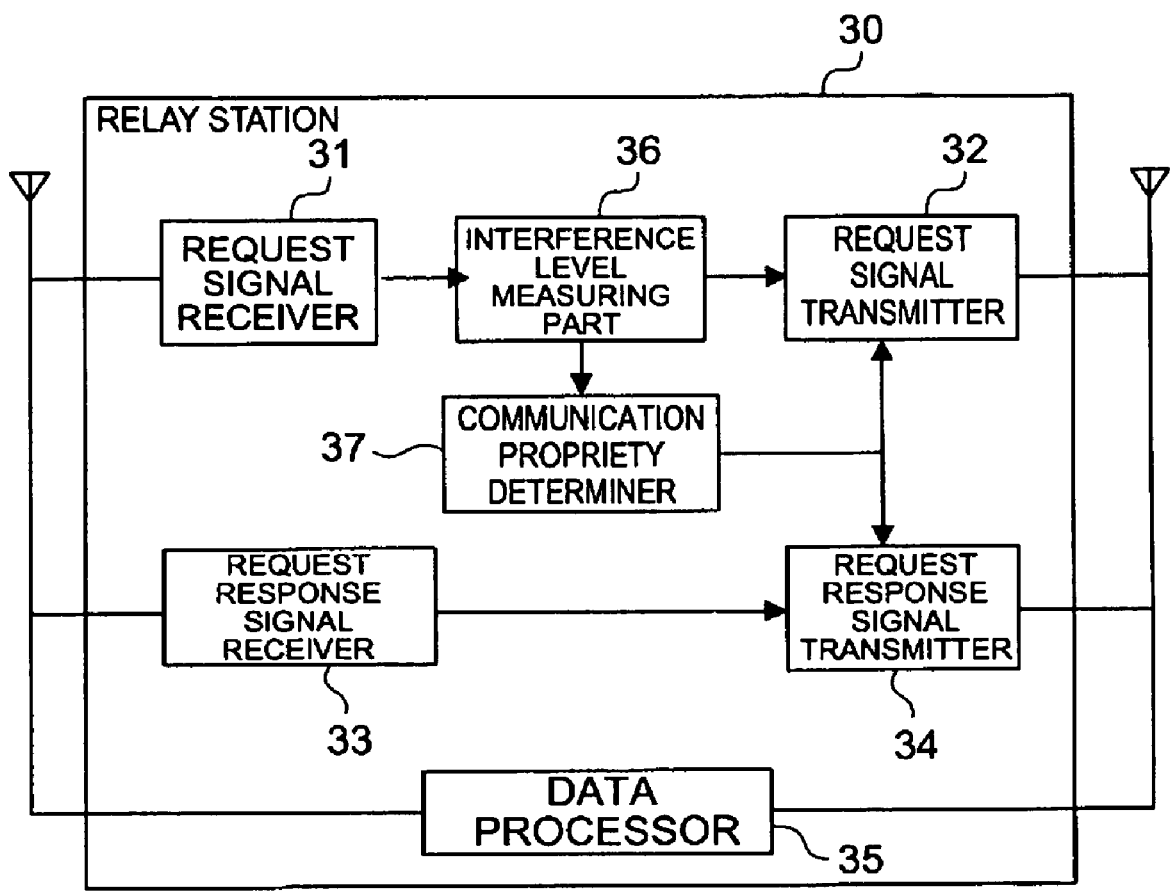
FIG. 4 is an illustration showing a configuration of a relay station according to an embodiment.

The configuration of relay station 30 will be described below referring to FIG. 4. As shown in FIG. 4, relay station 30 is comprised of request signal receiver 31 for receiving a request signal; request signal transmitter 32 for transmitting a request signal; request response signal receiver 33 for receiving a request response signal transmitted in response to a request signal; request response signal transmitter 34 for transmitting a request response signal to a request signal received by request signal receiver 31; data processor 35 for processing packet data; interference level measuring part 36 for measuring an interference level at the host station; and communication propriety determiner 37 for determining whether it is possible to perform communication requested by a request signal.

Data processor 35 extracts a desired signal from a received signal and despreads it to reproduce information. The reproduced information sequence is again subjected to coding, spreading, and D/A conversion and the resultant data is transmitted as placed on a carrier wave amplified according to a transmission power level calculated from information (e.g., information about an interference level and a propagation loss at a packet receiver, or the like) acquired from a transmission power controller (not shown).

Request signal receiver 31 has a function of receiving a request signal transmitted from mobile station 10 or from another relay station 30. A notification of reception of a request signal at request signal receiver 31 is fed into interference level measuring part 36.

Interference level measuring part 36 has a function of measuring an interference level at the host station at the time of receiving a request signal.

Communication propriety determiner 37 has a function of determining whether it is possible to perform communication at a communication speed requested by a request signal received by request signal receiver 31, based on an interference level measured by interference level measuring part 36. Whether it is possible to perform communication at a communication speed requested is determined, for example, by finding a maximum communication speed available for communication on the basis of the interference level measured by interference level measuring part 36 and comparing it with the communication speed requested by the request signal. The result of the determination by communication propriety determiner 37 is fed into request response signal transmitter 34. When the determination is that it is possible to perform the communication, request signal transmitter 32 is notified of the determination result.

Request signal transmitter 32 has a function of transmitting a request signal when receiving a notification of the determination of being communicable from communication propriety determiner 37.

Request response signal receiver 33 has a function of receiving a request response signal transmitted in response to a request signal transmitted by request signal transmitter 32.

Request response signal transmitter 34 has a function of putting the determination propriety information based on the result of the determination by communication propriety determiner 37, into a request response signal and transmitting the request response signal. It also has a function of, when request response signal receiver 33 receives a request response signal, putting the communication propriety information included in the received request response signal, into a request response signal and transmitting the request response signal. The destination of the request response signal is relay station 30 or mobile station 10 being a source of a request signal, and the destination is specified by an ID included in the request signal.

[About Base Station]

Figure 5:
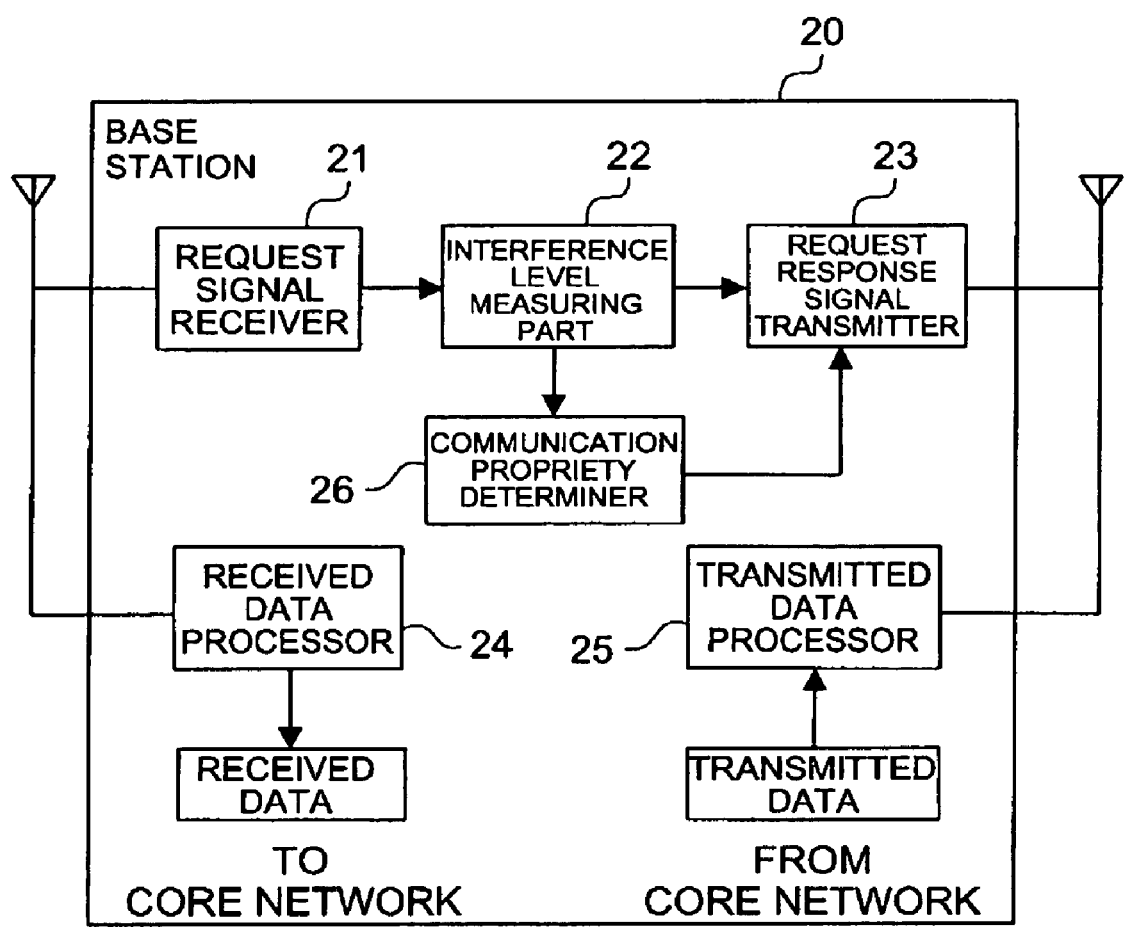
FIG. 5 is an illustration showing a configuration of a base station according to an embodiment.

The configuration of base station 20 will be described below referring to FIG. 5. As shown in FIG. 5, base station 20 is comprised of transmitted data processor 25 for processing transmitted data from the core network and transmitting the processed data; received data processor 24 for processing received data and generating received data to be transmitted to the core network; request signal receiver 21 for receiving a request signal; interference level measuring part 22 for measuring an interference level at receiving station 20; communication propriety determiner 26 for determining whether it is possible to perform communication with mobile station 10 on the basis of the interference level measured by interference level measuring part 22; and request response signal transmitter 23 for transmitting a request response signal containing communication propriety information determined by communication propriety determiner 26.

Request signal receiver 21 has a function of receiving a request signal transmitted from relay station 30 or from mobile station 10 and supplying a notification of reception of the request signal to interference level measuring part 22.

Interference level measuring part 22 has a function of measuring an interference level at receiving station 20 when receiving a notification of reception of a request signal from request signal receiver 21.

Communication propriety determiner 26 has a function of determining whether it is possible to perform communication at a request communication speed included in a request signal received by request signal receiver 21. Whether it is possible to perform communication at a request communication speed is determined, for example, by finding a maximum communication speed available for communication on the basis of the interference level measured by interference level measuring part 22 and comparing it with the request communication speed requested by the request signal.

Request response signal transmitter 23 has a function of transmitting a request response signal containing communication propriety information on propriety of communication based on the determination by communication propriety determiner 26, to relay station 30 or mobile station 10 as a source of a request signal. Request response transmitter 23 can identify relay station 30 or transmitting station 10 as a source of the request signal, based on a source ID included in the request signal.

[Method of Determining Communication Path]

Methods of determining a communication path in mobile communication system 1 of the present embodiment will be described below, while also detailing the communication path determining method according to an embodiment of the present invention. The methods of determining the communication path include methods of determining a communication path with a largest communication speed and methods of determining a communication path satisfying a required line quality. These methods will be described below using examples in which mobile station 10 serves as a transmitting station.

Figure 7A:
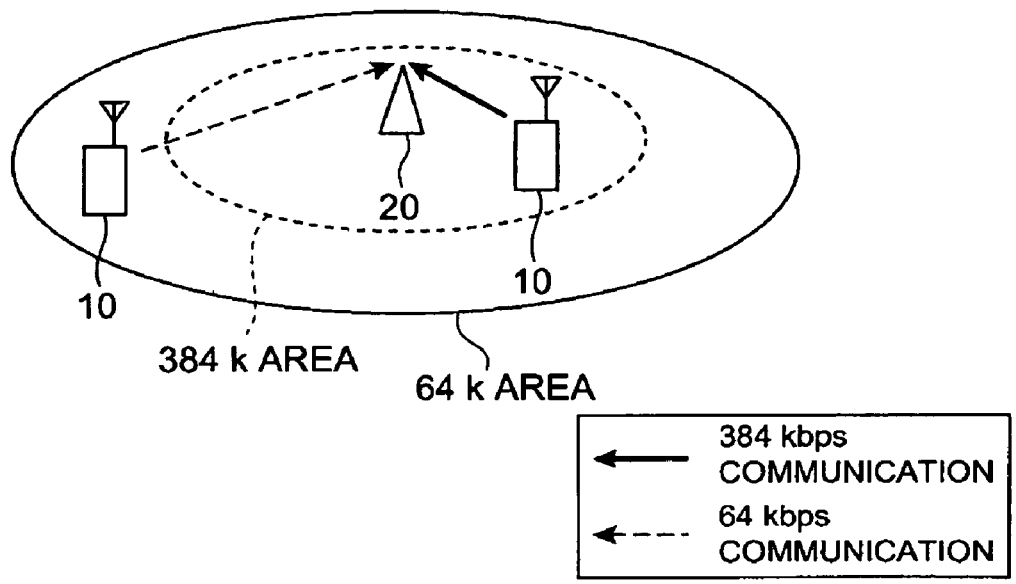
FIG. 7A is an illustration to illustrate communication speeds in single hop connection.
Figure 7B:
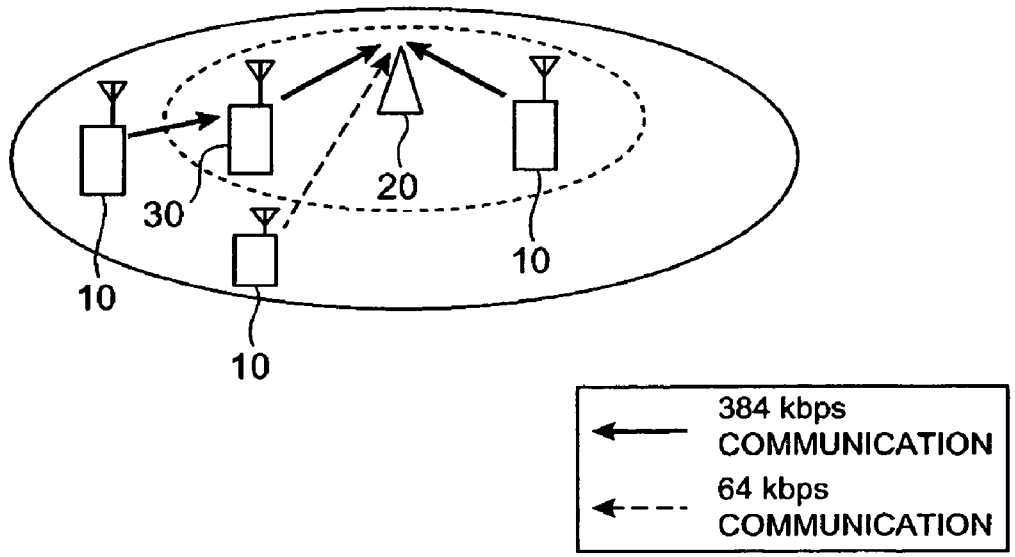
FIG. 7B is an illustration to illustrate communication speeds in multihop connection.

Prior to the description of the communication path determining methods, an example of radio link design in the present system is presented in FIG. 6. Referring to FIG. 6, the cell radius in this system is 1.66 km and communication at 64 kbps is secured in single hop connection. In this system communication at 384 kbps is available in part inside the cell where the distance is 1.06 km from base station 20. When multihop connection with a single relay is applied in this system, the present system permits four communication modes of single hop 384 kbps, multihop 384 kbps, single hop 64 kbps, and multihop 64 kbps. Supposing a relay at a relay station requires a double communication time, an effective communication speed in multihop connection becomes half that in single hop connection. Namely, the effective communication speed is 192 kbps in 384 kbps multihop connection, and 32 kbps in 64 kbps multihop connection. This point will be detailed below. FIG. 7A shows an example in which mobile stations 10 are connected to a base station 20 by single hop connection; a mobile station 10 within 1.06 km from the base station 20 can be connected at 384 kbps, while another mobile station 10 apart more than 1.06 km from the base station within the cell is connected at 64 kbps. FIG. 7B is an illustration showing an example in which a mobile station 10 located more than 1.06 km apart from the base station 20 is connected by multihop connection. Since a relay station 30 for relaying between the mobile station 10 and the base station 20 is located within 1.06 km from the base station 20, a connection at 384 kbps is possible between the relay station 30 and the base station 20. If the mobile station 10 and relay station 30 are located within 1.06 km, a connection at 384 kbps is also possible between the mobile station 10 and the relay station 30. Supposing the relay requires double the communication time, the multihop connection shown in FIG. 7B permits communication at 192 kbps between the mobile station 10 and the base station 20.

Figure 8:
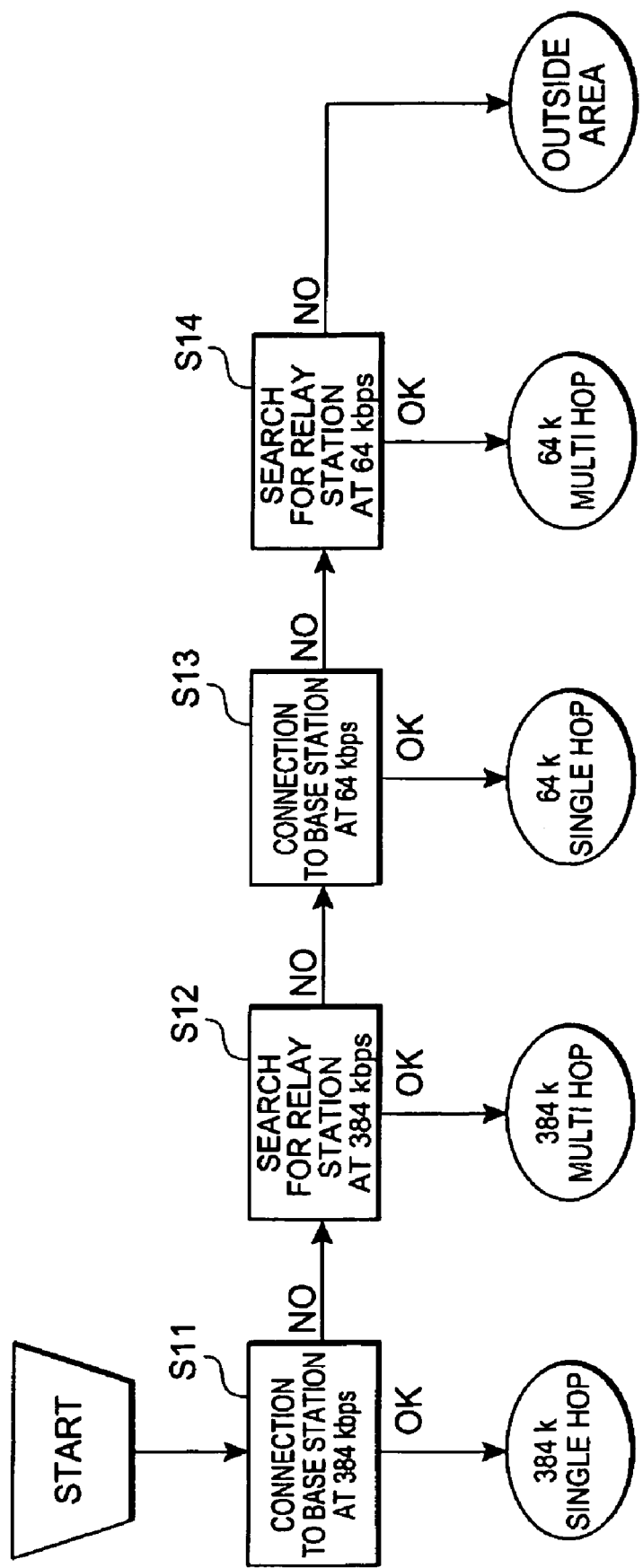
FIG. 8 is a flowchart showing the operation of a communication path determining method according to an embodiment.

Methods of determining the communication path with the largest communication speed will be described below with reference to FIG. 8. The methods of searching for the communication path with the largest communication speed include methods of sequentially searching for it, starting from the communication path with the maximum available communication speed and methods of sequentially searching for it, starting from the communication path with the minimum available communication speed, among which a method of sequentially searching for the communication path, starting from the communication path with the maximum available communication speed will be first described. FIG. 8 is a flowchart showing the operation of communication path determiner 11 in determining the communication path with the largest communication speed.

Mobile station 10 determines the communication mode and communication path at predetermined intervals of time or at timing when a need for communication arises. As shown in FIG. 8, the mobile station first attempts to connect by 384 kbps single hop connection (S11). Specifically, mobile station 10 makes request signal transmitter 11*a* transmit a request signal containing a communication connection request at 384 kbps and, when base station 20 receives the request signal transmitted from mobile station 10, interference level measuring part 22 measures the interference level at base station 20. Subsequently, base station 20 makes communication propriety determiner 26 determine whether it is possible to perform the communication at 384 kbps with mobile station 10, based on the measured interference level. Then base station 20 puts communication propriety information on propriety of communication thus determined, into a request response signal and transmits the request response signal to mobile station 10. Thereafter, mobile station 10, receiving the request response signal, makes signal analyzer 11*c* analyze the communication propriety information included in the request response signal. As a consequence, if the single hop communication at 384 kbps is possible, a communication path by 384 kbps single hop connection is determined and the communication is started.

If it is impossible to perform the communication by 384 kbps single hop connection, a search is made for a relay station 30 available for 384 kbps multihop communication (S12). Specifically, mobile station 10 transmits a request signal containing a communication connection request at 384 kbps and, when a relay station 30 receives the request signal transmitted from mobile station 10, the relay station 30 measures the interference level at the relay station itself. Then the relay station 30 makes communication propriety determiner 37 determine whether it is possible to perform the communication at the communication speed (384 kbps herein) requested by the request signal, based on the measured interference level. When the result of the determination is that it is impossible to perform the communication, the relay station 30 puts the communication propriety information indicating the incapability of the communication, into a request response signal and transmits it to mobile station 10. In this case, request signal transmitter 32 transmits no request signal. Namely, since it is impossible for this relay station 30 to perform the communication at the request communication speed, it is useless to perform a search for a communication path from this relay station 30 to base station 20. For this reason, transmission of the request signal is terminated at the point of the determination of incapability of communication, thereby achieving increase of efficiency of the entire mobile communication system. When communication propriety determiner 37 determines that it is possible to perform the communication, the relay station 30 transmits a request signal containing a communication connection request at 384 kbps. When base station 20 receives the request signal transmitted from the relay station 30, interference level measuring part 22 measures the interference level at the base station and communication propriety determiner 26 determines whether it is possible to perform the communication at the request communication speed with the mobile station, based on the measured interference level. Subsequently, base station 20 makes request response signal transmitter 23 transmit a request response signal containing the communication propriety information on propriety of communication to the relay station 30 as a source of the request signal. The relay station 30, receiving the request response signal thus transmitted, transmits a request response signal containing the communication propriety information included in the received request response signal and the communication propriety information at the relay station itself ("communicable" herein), to mobile station 10.

Then mobile station 10, receiving the request response signal, makes signal analyzer 11*c* analyze the communication propriety information included in the request response signal. As a consequence, if the communication by 384 kbps multihop connection is possible, that is, when the relay station 30 and base station 20 both are communicable, the mobile station determines the communication path by 384 kbps multihop connection and starts the communication.

If the communication by 384 kbps multihop connection is impossible, the mobile station attempts to connect by 64 kbps single hop connection (S13). A specific method is the same as the aforementioned attempt on the 384 kbps single hop connection. When it is possible to perform the communication by 64 kbps single hop connection, the mobile station determines the communication path by 64 kbps single hop connection and starts the communication. When it is impossible to perform the communication by 64 kbps single hop connection, the mobile station attempts to connect by 64 kbps multihop connection (S14). A specific method is the same as the aforementioned attempt on the 384 kbps multihop connection. When it is possible to perform the communication by 64 kbps multihop connection, the mobile station determines the communication path by 64 kbps multihop connection and starts the communication. When it is impossible to perform the communication by 64 kbps multihop connection, the mobile station is incapable of any communication and the mobile station like a cell phone or the like is determined to be located outside the communication area.

As described above, mobile station 10 sequentially attempts to connect from the fastest communication speed and establishes a connection to base station 20 at the communication speed determined as communicable, whereby it is feasible to determine the communication path with the largest communication speed and establish the connection between mobile station 10 and base station 20.

A method of sequentially performing the search from the communication path with the minimum communication speed will be described below. FIG. 9 is a flowchart showing the operation of communication path determiner 11 in determining a communication path with a largest communication speed. It is assumed that the conditions for radio link design are the same as those in FIG. 6 and mobile communication system 1 permits the communication speeds of 384 kbps and 64 kbps in each of the single mode and the multimode. As shown in FIG. 9, mobile station 10 first attempts to connect by 64 kbps multihop connection in which it is easy to secure communication (S21). A specific method is the same as the aforementioned attempt on the 64 kbps multihop connection. When it is possible to perform the communication by 64 kbps multihop connection, the mobile station attempts to connect by 64 kbps single hop connection, while securing the 64 kbps multihop connection (S23). When the first attempt results in finding incapability of the communication by 64 kbps multihop connection, the mobile station also attempts to connect by 64 kbps single hop connection (S22), because there is a possibility that the failure in connection occurred because of the absence of an appropriate relay station 30. When this attempt results in finding incapability of the communication by 64 kbps single hop connection, the mobile station becomes incapable of any communication.

When it is possible to perform the communication by 64 kbps single hop connection, the mobile station attempts to connect by 384 kbps multihop connection, while securing the communication by 64 kbps single hop connection (S24). When it is possible to perform the communication by 384 kbps multihop connection, the mobile station attempts to connect by 384 kbps single hop connection, while securing the communication by 384 kbps multihop connection (S26). When it is impossible to perform the communication by 384 kbps single hop connection, the mobile station starts communication at the maximum of communication speeds succeeded in establishment of communication heretofore, i.e., the communication by 384 kbps multihop connection (effective communication speed of 192 kbps). When it is possible to perform the communication by 384 kbps single hop connection, the mobile station starts the communication by 384 kbps single hop connection.

When at step S24 it is impossible to perform the communication by 384 kbps multihop connection, there is also a possibility that the failure in connection occurred because of the absence of an appropriate relay station 30, and thus the mobile station also attempts to connect by 384 kbps single hop connection (S25). In this case, where it is impossible to perform the communication by 384 kbps single hop connection, the mobile station starts the communication at the maximum of communication speeds succeeded in establishment of communication heretofore, namely, the communication by 64 kbps single hop connection. When step S25 results in succeeding in the 384 kbps single hop connection, the mobile station determines the communication path by 384 kbps single hop connection and starts the communication.

Since the search is started from the communication path with the minimum communication speed easy for securement of communication as described above, the time to the start of communication can be kept as short as possible, by first securing the communication path, and the communication path with the largest communication speed can be determined by performing the search for the communication path while stepwise increasing the communication speed.

A method of determining the communication path satisfying the required line quality will be described next. Prior to the description of the communication path determining method, let us describe the line quality and others exemplified in the description.

Figure 10A:
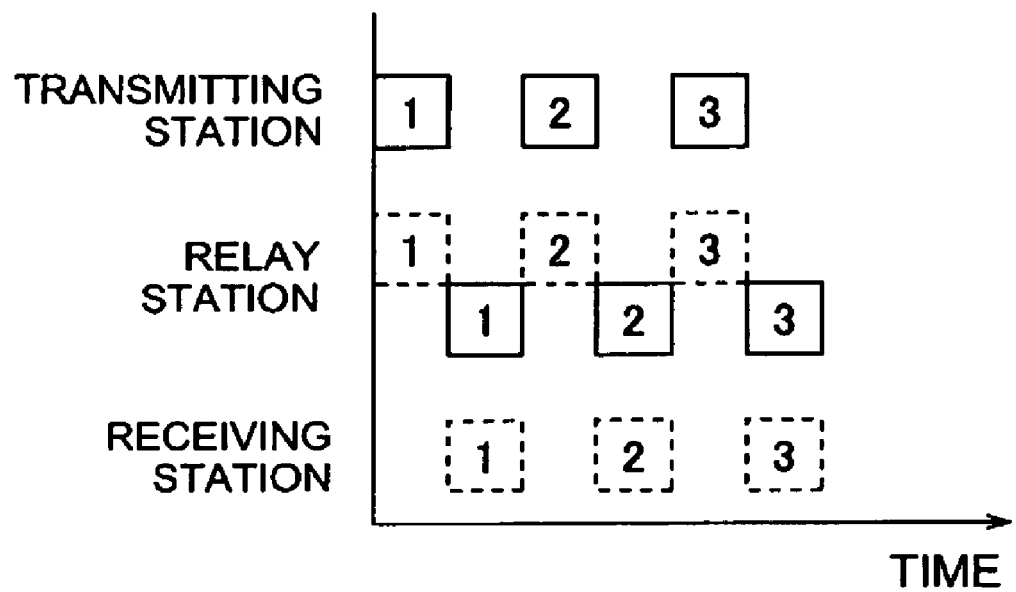
FIG. 10A is an illustration to illustrate a relaying system by multihop connection.
Figure 10B:
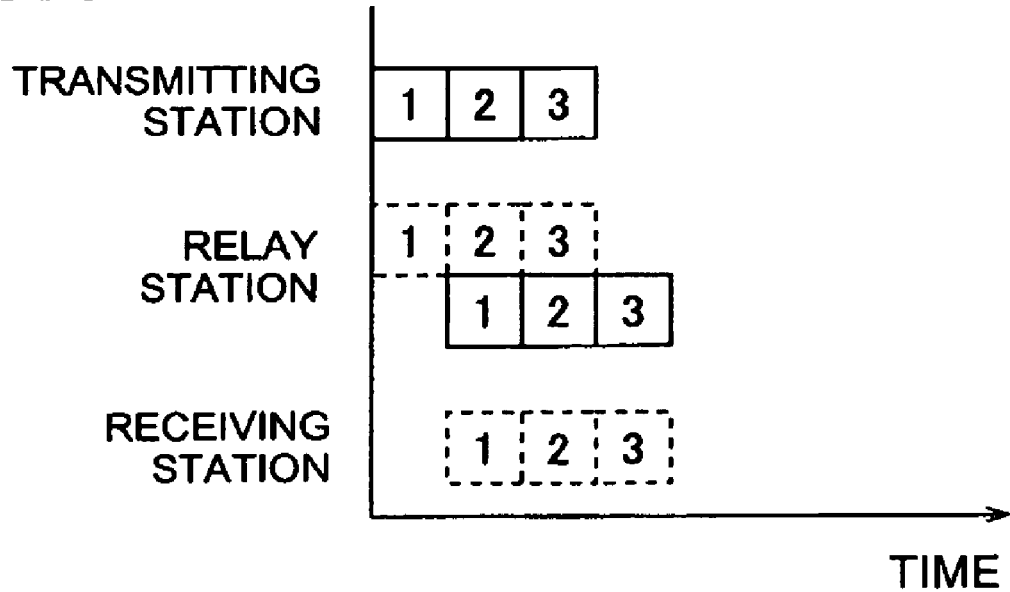
FIG. 10B is an illustration to illustrate another relaying system by multihop connection.

The required line quality herein is defined by communication speeds, values of which are four values of 1 Mbps, 2 Mbps, 4 Mbps, and 8 Mbps, and communication modes corresponding thereto are 1, 2, 4, and 8 Mbps multihop and single hop communication modes. In the above-described multihop connection a relay required double the communication time, but here is also described a case where the relay rarely causes the delay of the communication time. Since these two cases occur depending upon systems of multihop relay station 30 as described below, which flow should be adopted is determined according to the system of relay station 30. The multihop relay systems will be described below. The first multihop system, as shown in FIG. 10A, is a system in which the relay station performs no relay transmission during reception of packet. In this case, therefore, supposing a time necessary for transmission of N packets in single hop communication is Tn, a time necessary for packet transmission in multihop communication is 2×Tn. Namely, the communication speed during multihop communication is half the communication speed during single hop communication. The second multihop system, as shown in FIG. 10B, is a system in which the relay station also performs relay transmission during reception of packet. In this case relay station 30 transmits the (n−1)th packet during reception of the nth packet, so that the time for transmission of N packets is equal to the time necessary for transmission of (N+1) packets. In the former system, where the line quality request is one for k Mbps, the communication speed satisfying the request is k Mbps in single hop connection and 2 k Mbps in multihop connection. In the latter system, where the line quality request is one for k Mbps, the communication speed satisfying the request is k Mbps both in single hop connection and in multihop connection.

Figure 11:
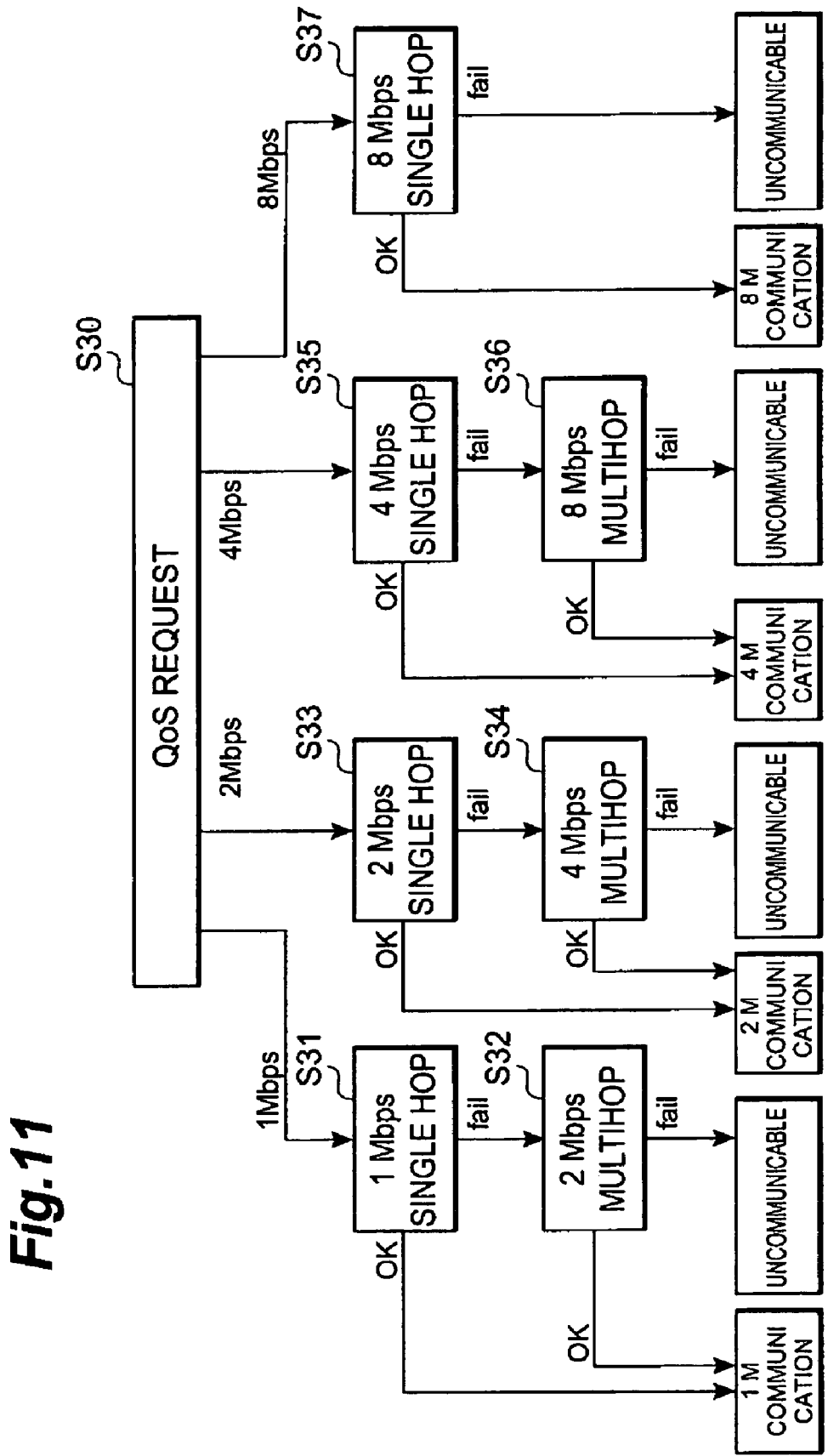
FIG. 11 is a flowchart showing the operation of a communication path determining method according to an embodiment.

The operation of a communication path determining method in the former multihop system will be described with reference to FIG. 11. When the required line quality is given as a communication speed (S30), mobile station 10 first attempts to make a single hop connection at the given communication speed (S31, S33, S35, or S37). For example, where the required line quality is 2 Mbps, the mobile station attempts to connect by 2 Mbps single hop connection (S33). Specifically, mobile station 10 transmits a request signal containing a communication connection request at the given communication speed and, when base station 20 receives the request signal transmitted from mobile station 10, interference level measuring part 22 measures the interference level at base station 20. Subsequently, based on the measured interference level, communication propriety determiner 26 determines whether it is possible to perform the communication with mobile station 10 at the communication speed requested by the request signal. Then base station 20 puts the communication propriety information based on the determination, into a request response signal and transmits it to mobile station 10. Mobile station 10, receiving the request response signal, then determines whether it is possible to perform the single hop communication at the given communication speed, based on the communication propriety information included in the request response signal. When it is possible to perform the single hop communication at the given communication speed, the mobile station determines the communication path and starts the communication. When it is impossible to perform the single hop communication at the given communication speed, the mobile station attempts to make a multihop connection at a communication speed equal to double the given communication speed (S32, S34, or S36). For example, where 2 Mbps is given as the requested line quality, the mobile station attempts to connect by 4 Mbps multihop connection (S34). Specifically, mobile station 10 transmits a request signal containing a communication connection request at the communication speed of twice the given communication speed and, when a multihop relay station 30 receives the request signal transmitted from the mobile station 10, the relay station 30 measures the interference level at the station itself. Then the relay station 30 makes communication propriety determiner 37 determine whether it is possible to perform the communication at the communication speed (4 Mbps herein) requested by the request signal, based on the measured interference level. When the result of the determination is that it is impossible to perform the communication, the relay station 30 puts the communication propriety information indicating the incapability of the communication, into a request response signal and transmits the request response signal to the mobile station 10. In this case, request signal transmitter 32 transmits no request signal in order to increase the efficiency of the mobile communication system. When communication propriety determiner 37 determines that it is possible to perform the communication, the relay station 30 transmits a request signal containing a communication connection request at 4 Mbps.

Thereafter, when base station 20 receives the request signal transmitted from the relay station 30, interference level measuring part 22 measures the interference level at the base station and, based on the measured interference level, communication propriety determiner 26 determines whether it is possible to perform the communication with the mobile station at the requested communication speed. Subsequently, base station 20 makes request response signal transmitter 23 transmit a request response signal containing the communication propriety information on propriety of communication to the relay station 30 as a source of the request signal. The relay station 30 receives the request response signal and transmits a request response signal containing the communication propriety information included in the received request response signal and the communication propriety information at the relay station ("communicable" herein), to mobile station 10. Then mobile station 10, receiving the request response signal, determines whether it is possible to perform the multihop communication at the given communication speed, based on the communication propriety information included in the request response signal. When it is possible to perform the multihop communication at the given communication speed, that is, when the relay station 30 and base station 20 both are communicable, the mobile station determines the communication path by multihop connection at the communication speed and starts the communication. When it is impossible to perform the communication at the given communication speed, the mobile station is incapable of any communication.

A communication path determining method in the latter system without delay of communication speed will be described below with reference to FIG. 12. First, when the requested line quality is given as a communication speed, mobile station 10 attempts to connect by single hop connection at the communication speed (S41, 343, S45, or S47). For example, where 2 Mbps is given as the requested line quality, the mobile station attempts to connect by 2 Mbps single hop connection (S43). A specific method of the attempt on connection is the same as the above and redundant description is omitted herein.

When it is possible to perform the communication at the given communication speed, the mobile station determines the communication path in single hop connection at the communication speed and starts the communication. When it is impossible to perform the single hop communication at the given communication speed, the mobile station attempts to make a multihop connection at the communication speed (S42, S44, S46, or S48). For example, where 2 Mbps is given as the requested line quality, the mobile station attempts to connect by 2 Mbps multihop connection (S44). A specific method of the attempt on connection is the same as the above and redundant description thereof is omitted herein. When it is possible to perform the multihop communication at the communication speed requested by the request signal, the mobile station determines the communication path in multihop connection at the communication speed and starts the communication. When it is impossible to perform the communication at the given communication speed, the mobile station is incapable of any communication.

When a requested line quality is given, the mobile station is able to determine the communication path satisfying the line quality and make a connection, as described above, and it is thus feasible to provide a high-quality communication environment.

When there exist a plurality of communication paths satisfying the requested line quality, a communication path may be determined by narrowing down communication paths, based on hop counts from mobile station 10 to base station 20, based on totals of transmission powers at mobile station 10 and at relay station 30, or the like. For example, where the communication speed of 2 Mbps is requested as a line quality and if the 2 Mbps single hop connection and 4 Mbps multihop connection both are available, the 2 Mbps single hop path with the smaller hop count may be determined as a communication path. Since the present embodiment adopts the methods of first attempting the single hop connection, the communication path with the smaller hop count is preferentially selected.

Second Embodiment

Figure 13:
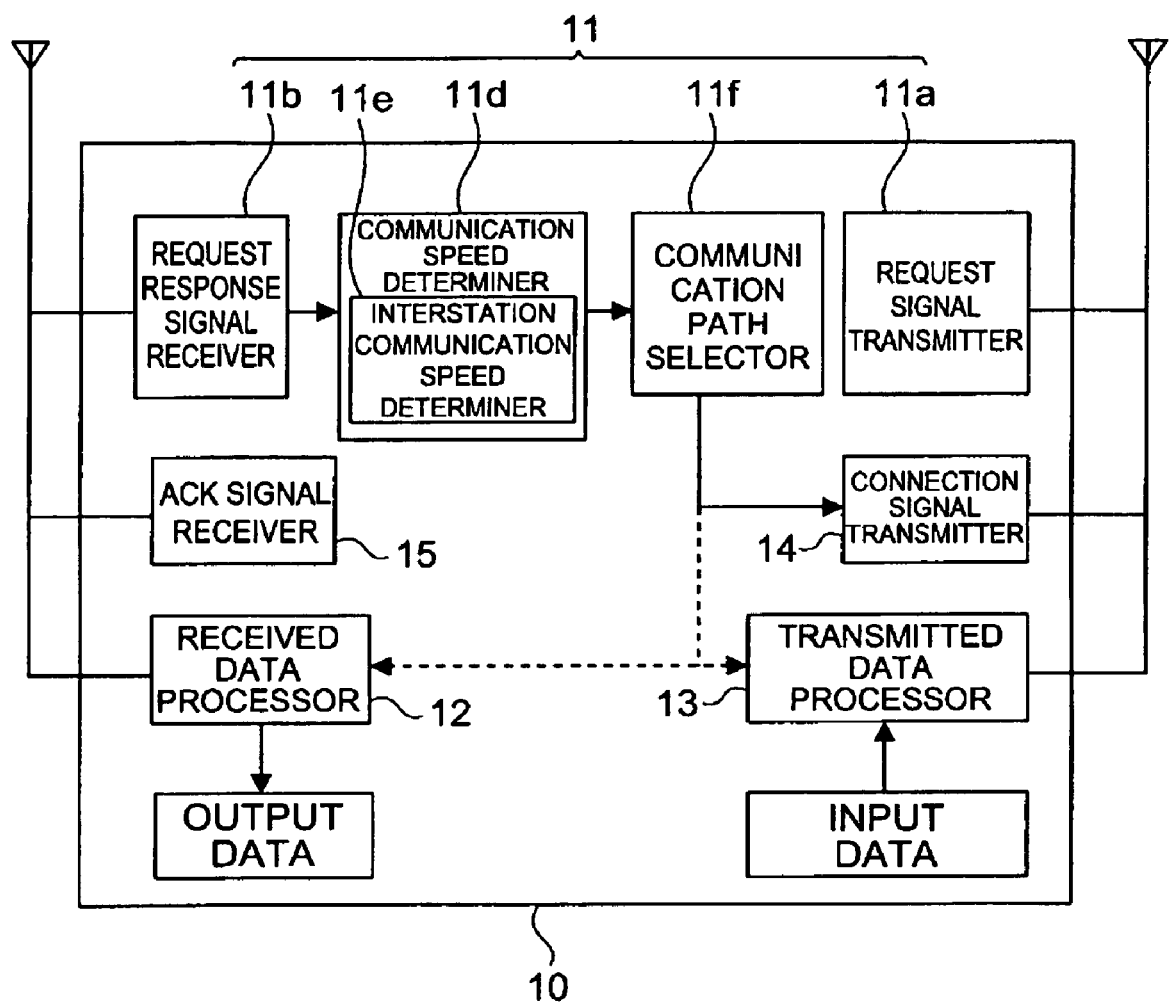
FIG. 13 is an illustration showing a configuration of a mobile station according to an embodiment.
Figure 14:
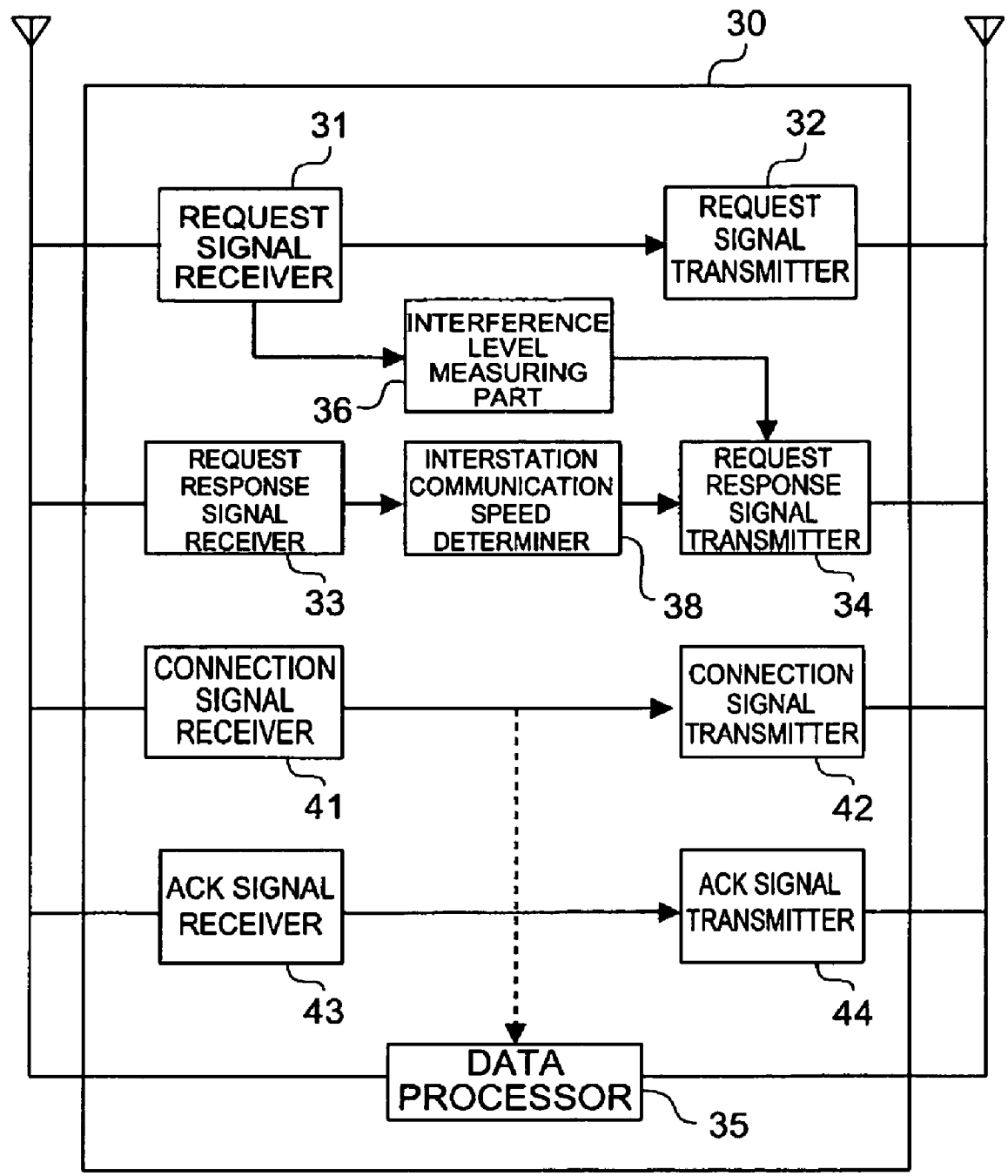
FIG. 14 is an illustration showing a configuration of a relay station according to an embodiment.
Figure 15:
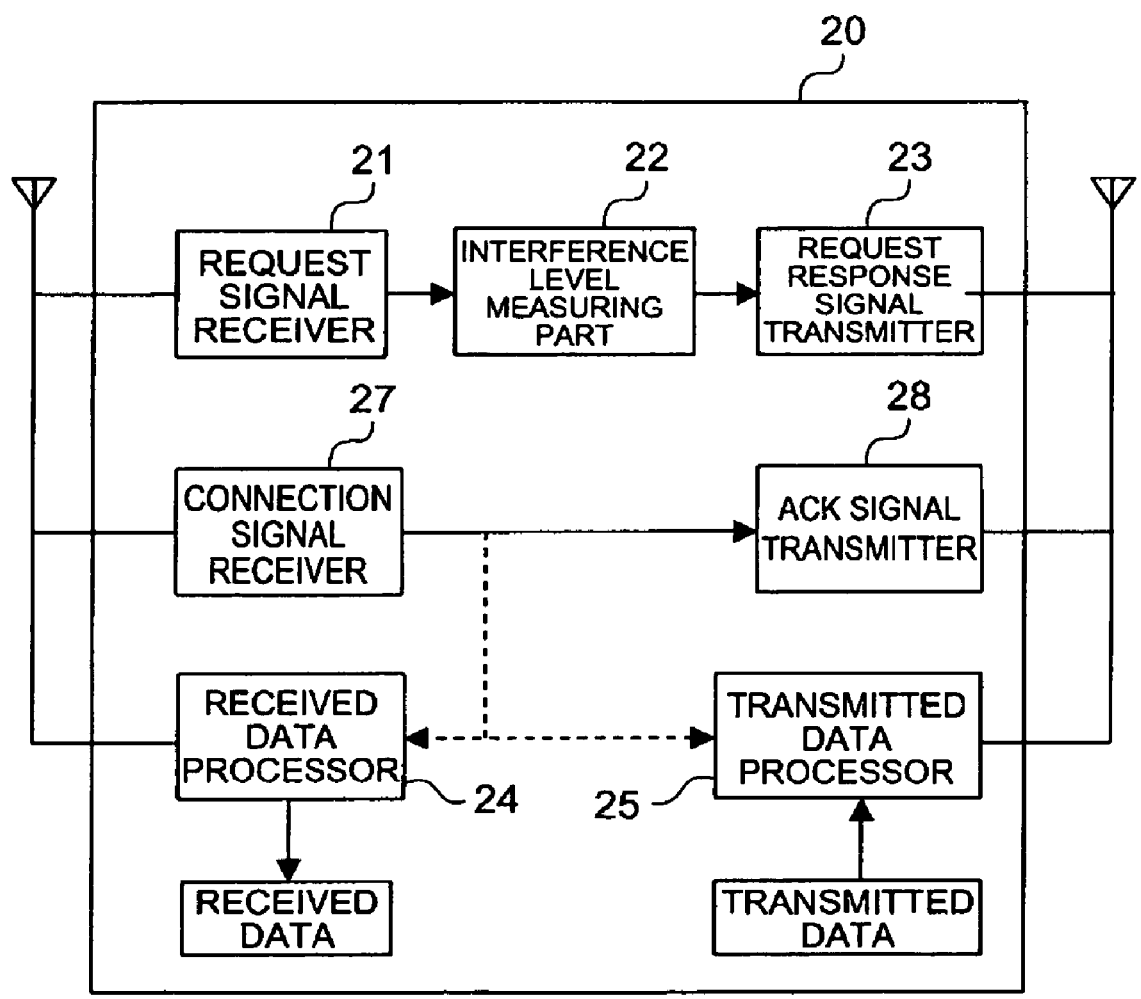
FIG. 15 is an illustration showing a configuration of a base station according to an embodiment.

The mobile communication system and communication path determining method of the second embodiment for permitting communication path determiner 11 to determine an optimal communication speed will be described, using an example of the mobile communication system with multiple relay stations 30. FIG. 13 to FIG. 15 show the configurations of mobile station 10, relay station 30, and base station 20, respectively, which constitute the mobile communication system according to the second embodiment.

[About Mobile Station]

The configuration of mobile station 10 will be first described with reference to FIG. 13. Mobile station 10 is comprised of request signal transmitter 11a for transmitting a request signal; request response signal receiver 11b for receiving a request response signal transmitted in response to a request signal; communication speed determiner 11d for determining a communication speed on the basis of a request response signal; and communication path selector 11f for selecting a communication path on the basis of a communication speed determined by communication speed determiner 11d. These components constitute communication path determiner 11. Mobile station 10 is also provided with connection signal transmitter 14 for transmitting a connection signal, and ACK signal receiver 15 for receiving an ACK signal transmitted in response to a connection signal and is further provided with transmitted data processor 13 and received data processor 12 similar to those in mobile station 10 in the first embodiment.

Request signal transmitter 11a has a function of transmitting a request signal containing an ID for distinguishing the host station. Request signal transmitter 11a transmits the request signal on a regular basis or at timing of communication. After a start of communication, request signal transmitter 11a regularly transmits the request signal.

Request response signal receiver 11b has a function of receiving a request response signal transmitted in response to a request signal. A request signal received is fed into communication speed determiner 11d.

Communication speed determiner 11d has a function of determining a communication speed from mobile station 10 to base station 20, based on a request response signal received by request response signal receiver 11b. Communication speed determiner 11d has interstation communication speed determiner 11e for determining an interstation communication speed between the mobile station and relay station 30 or base station 20 as a source of a request response signal on the basis of an interference level at the source of the request response signal included in the request response signal. Communication speed determiner 11d determines the communication speed from mobile station 10 to base station 20, based on the interstation communication speed determined by interstation communication speed determiner 11e and based on an interstation communication speed between each pair of stations constituting the communication path from relay station 30 as a source of the request response signal to base station 20, included in the received request response signal. Where the source of the request response signal is base station 20, the request response signal contains no information of interstation communication speed, and thus the interstation communication speed determined by interstation communication speed determiner 11e is nothing but the communication speed between the transmitting station and the receiving station. Now, let us describe a method of determining the communication speed on the basis of the interference level. The communication speed is normally one of discrete values determined depending upon chip rates and thus, for example, the communication speed R can be determined as a maximum satisfying the following expression for SIR value S determined by the interference level.

$R < S \times k$ (constant)

Communication path selector 11f has a function of determining a communication path, based on the information of the communication speed determined by communication speed determiner 11d. More specifically, it selects each of a communication path in a single hop connection and a communication path with a largest communication speed.

[About Relay Station]

Relay station 30 will be described next. In the present embodiment, relay station 30 is similar to relay station 30 in the first embodiment as described above, in that it does not function simply as a repeater for relaying spread signals received, as they are.

The configuration of relay station 30 will be described referring to FIG. 14. As shown in FIG. 14, relay station 30 is comprised of request signal receiver 31 for receiving a request signal; interference level measuring part 36 for measuring an interference level at the host relay station 30; request signal transmitter 32 for transmitting a request signal; request response signal receiver 33 for receiving a request response signal transmitted in response to a request signal; interstation communication speed determiner 38 for determining an interstation communication speed between the host relay station 30 and another relay station 30 or base station 20 as a source of a request response signal on the basis of an interference level included in the request response signal received by request response signal receiver 33; request response signal transmitter 34 for transmitting a request response signal containing information of the communication speed determined by interstation communication speed determiner 38 and information of the interference level measured by interference level measuring part 36; and data processor 35 for processing packet data. Relay station 30 is also provided with connection signal receiver 41 for receiving a connection signal; connection signal transmitter 42 for transmitting a connection signal; ACK signal receiver 43 for receiving an ACK signal transmitted in response to a connection signal; and ACK signal transmitter 44 for transmitting an ACK signal.

Data processor 35 extracts a desired signal from a received signal and despreads it to reproduce information. An information sequence reproduced is again subjected to coding, spreading, and D/A conversion and the resultant data is transmitted on a carrier wave amplified according to a transmission power level calculated from information (e.g. information about an interference level and a propagation loss at a packet receiver, or the like) acquired from a transmission power controller (not shown).

Request signal receiver 31 has a function of receiving a request signal transmitted from mobile station 10 or from another relay station 30. A notification indicating reception of a request signal at request signal receiver 31 is fed into interference level measuring part 36 and into request signal transmitter 32.

Interference level measuring part 36 has a function of measuring an interference level of a request signal at the host relay station 30.

Request signal transmitter 32 has a function of transmitting a request signal to another relay station 30 or to base station 20.

Request response signal receiver 33 has a function of receiving a request response signal transmitted from another relay station 30 or from base station 20, in response to a request signal transmitted by request signal transmitter 32. A request response signal received is fed into interstation communication speed determiner 38.

Interstation communication speed determiner 38 has a function of determining an interstation communication speed between the host relay station and another relay station 30 or base station 20 as a source of a request response signal, based on the received request response signal. A method of determining the communication speed on the basis of the interference level is similar to that in the case of mobile station 10.

Request response signal transmitter 34 has a function of transmitting a request response signal containing information of the interference level measured by the interference level measuring part 36 and the interstation communication speed determined by interstation communication speed determiner 38. The destination of the request response signal is the relay station 30 or mobile station 10 as a source of the request signal and the source is specified by an ID included in the request signal.

[About Base Station]

The configuration of base station 20 will be described below referring to FIG. 15. As shown in FIG. 15, base station 20 is comprised of transmitted data processor 25 for processing transmitted data from the core network and transmitting the processed data; received data processor 24 for processing received data and generating received data to be transmitted to the core network; request signal receiver 21 for receiving a request signal; interference level measuring part 22 for measuring an interference level at receiving station 20; and request response signal transmitter 23 for transmitting a request response signal containing the interference level measured by interference level measuring part 22. Base station 20 is also provided with connection signal receiver 27 for receiving a connection signal; and ACK signal transmitter 28 for transmitting an ACK signal to a connection signal.

Request signal receiver 21 has a function of receiving a request signal transmitted from relay station 30 or from mobile station 10 and supplying a notification of reception of a request signal to interference level measuring part 22.

Interference level measuring part 22 has a function of, when receiving a notification of reception of a request signal from request signal receiver 21, measuring an interference level at receiving station 20.

Request response signal transmitter 23 has a function of transmitting the interference level measured by interference level measuring part 22 to relay station 30 or mobile station 10 as a source of the request signal. Request response signal transmitter 23 is able to specify the relay station 30 or transmitting station 10 as a source, based on the source ID included in the request signal.

A communication path determining method in mobile communication system 1 according to the present embodiment will be described below, while also describing the communication path determining method according to an embodiment with reference to FIG. 16.

Figure 16:
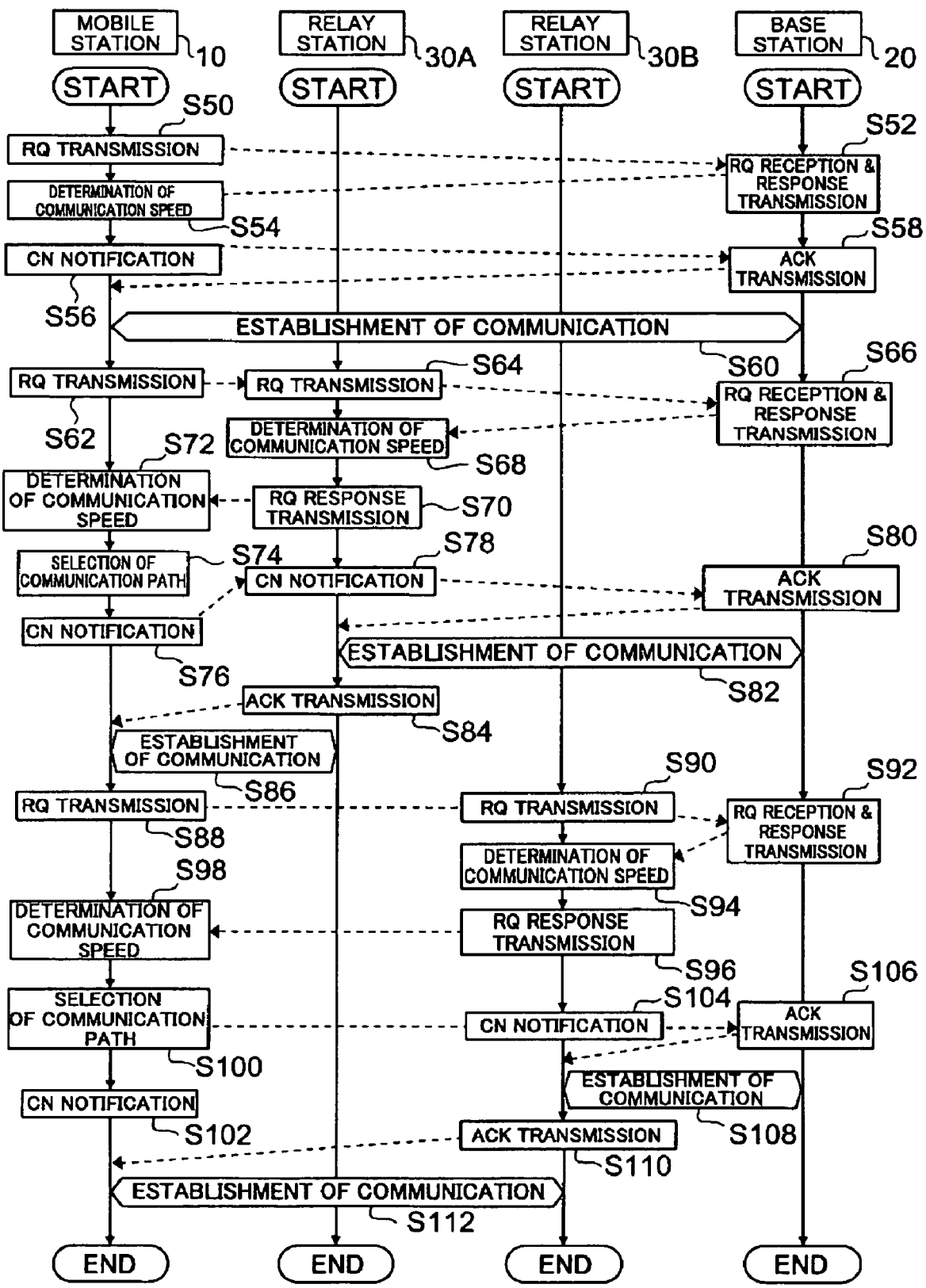
FIG. 16 is a flowchart showing the operation of a communication path determining method according to an embodiment.

FIG. 16 is a flowchart showing the operation of the communication path determining method according to the present embodiment. First, mobile station 10 transmits a request signal (denoted by "RQ signal" in FIG. 16) (S50); base station 20 receives the request signal transmitted from mobile station 10, then measures the interference level at the station itself, and transmits a request response signal containing the measured interference level to mobile station 10 (S52). Mobile station 10, receiving the request response signal transmitted from base station 20, determines the communication speed on the basis of the received request response signal (S54) and transmits a connection notification (denoted by "CN notification" in FIG. 16) containing the information of the determined communication speed to base station 20 (S56). Base station 20, receiving the connection notification transmitted from mobile station 10, sends an ACK to mobile station 10 (S58) and a single hop communication is established between mobile station 10 and base station 20 (S60). This single hop communication is always maintained before an end of the communication between mobile station 10 and base station 20.

Then mobile station 10 again transmits a request signal (S62). The request signal transmitted on this occasion is a request signal transmitted in order to search for a relay station 30A available for multihop communication. In this case, since the communication speed is determined later based on the request response signal, the request signal does not have to contain the information of the request communication speed. In order to search for a relay station 30A in the neighborhood of mobile station 10, mobile station 10 transmits the request signal by a transmission power necessary for transmission within a predetermined range. A relay station 30A, receiving the request signal transmitted from mobile station 10, transmits a request signal (S64). Base station 20, receiving the request signal transmitted from the relay station 30A, measures the interference level at the station itself and transmits a request response signal containing the measured interference level to the relay station 30A (S66). The relay station 30A, receiving the request response signal transmitted from base station 20, determines an interstation communication speed between the relay station and base station 20, based on the received request response signal (S68). The relay station 30A measures the interference level at the station itself of the signal from mobile station 10 and transmits a request response signal containing information of the measured interference level and the interstation communication speed determined at step S68 to mobile station 10 (S70). Mobile station 10 determines the communication speed on the communication path of mobile station 10—relay station 30A—base station 20, based on the request response signal transmitted from the relay station 30A (S72). Specifically, the mobile station first determines the interstation communication speed between mobile station 10 and relay station 30A on the basis of the interference level included in the request response signal and then determines the communication speed on the communication path of mobile station 10—relay station 30A—base station 20, based on the interstation communication speed between mobile station 10 and relay station 30A thus determined and based on the interstation communication speed between relay station 30A and base station 20 included in the request response signal.

Subsequently, the mobile station determines whether the determined communication speed is greater than the communication speed by single hop connection, and determines whether the communication path of mobile station 10—relay station 30A—base station 20 should be selected (S74). When the communication speed is greater than that on the communication path by single hop connection, the communication path of mobile station 10—relay station 30A—base station 20 is selected. When the communication path of mobile station 10—relay station 30A—base station 20 is selected, mobile station 10 transmits a connection notification to the relay station 30 (S76) The relay station 30, receiving the connection notification from mobile station 10, further transmits a connection notification to base station 20 (S78); base station 20, receiving the connection notification, transmits an ACK to the relay station 30A (S80); a communication is established between relay station 30A and base station 20 (S82). Subsequently, after the establishment of the communication with base station 20, the relay station 30A transmits an ACK to mobile station 10 (S84), and a communication is established between mobile station 10 and relay station 30A (S86). A method of realizing the communication at the determined communication speed may be a method of changing a modulation system or a method of changing a spreading system.

Subsequently, mobile station 10 again transmits a request signal (S88). The request signal transmitted on this occasion is a request signal transmitted in order to search for a relay station 30B available for multihop communication. In order to search for a relay station 30B in the neighborhood of mobile station 10, mobile station 10 transmits the request signal by a transmission power necessary for transmission within a predetermined range. Mobile station 10 does not have to acknowledge that relay stations 30A, 30B exist in the neighborhood, before the transmission of the request signal. The mobile station first acknowledges that relay stations 30A, 30B exist, by transmitting a request signal and receiving a request response signal thereto. A relay station 30B, receiving the request signal transmitted from mobile station 10, transmits a request response signal to mobile station 10 in accordance with the same flow as in the case of relay station 30A (S90-S96). Mobile station 10, receiving the request response signal from the relay station 30B, determines the communication speed on the communication path of mobile station 10—relay station 30B—base station 20, based on the received request response signal (S98). Subsequently, mobile station 10 selects a communication path with a larger communication speed out of the communication path with an intermediary of relay station 30A connected before and the communication path with an intermediary of relay station 30B (S100). When the communication path via relay station 30B is selected herein, as shown in FIG. 16, a communication is established on the communication path of mobile station 10—relay station 30B—base station 20. Namely, mobile station 10 transmits a connection notification to the relay station 30B (S102) and the relay station 30B, receiving the connection notification, transmits a connection notification to base station 20 (S104). Base station 20, receiving the connection notification, transmits an ACK to the relay station 30B and a communication is established between relay station 30B and base station 20 (S108). Furthermore, the relay station 30B in establishment of the communication with base station 20, transmits an ACK to mobile station 10 (S110) and a communication is established between mobile station 10 and relay station 30B (S112). In this case, the communication path of mobile station 10—relay station 30A—base station 20 is disconnected. Namely, the communication path via relay station 30A is switched to the communication path via relay station 30B. Conversely, if the communication path via relay station 30A is selected, the communication is not established on the communication path via relay station 30B, but the communication path of mobile station 10—relay station 30A—base station 20 is maintained. The flow shown in FIG. 16 ends here, but the operation for mobile station 10 to transmit the request signal and search for the communication path with the larger communication speed is repeated before the end of the communication with base station 20. The communication path determined by this flow can be applied, not only to the case where packets are transmitted from mobile station 10 to base station 20, but also to the case where packets are transmitted from base station 20 to mobile station 10. Namely, the present embodiment can also adapt to cases where bidirectional communications are carried out through the communication path determined by one station.

Although the present embodiment was configured so that mobile station 10 functioned as a transmitting station and determined the communication path between mobile station 10 and base station 20, it is also possible, for example, to adopt a configuration wherein relay station 30A functions as a transmitting station and determines the communication path with the largest communication speed from relay station 30A to base station 20. By adopting this configuration, the communication path with the largest communication speed between relay station 30A and base station 20 can be determined, after the communication path of mobile station 10—relay station 30A—base station 20 is established.

In the present embodiment, the station having transmitted the request signal (mobile station 10 or relay station 30) determines the interstation communication speed between the station and the station as a source of the request response signal, based on the interference level at the station as a source of the request signal included in the request response signal transmitted in response to the request signal. Another potential configuration is that the station having received the request signal (relay station 30 or base station 20) determines the interstation communication speed between the station and the station as a source of the request signal, based on the interference level at the station itself and the propagation loss of the request signal. When this configuration is adopted, information about the determined interstation communication speed is put into the request response signal and the request response signal is transmitted to the station as a source of the request signal.

In the mobile communication system and communication path determining method according to the second embodiment, first, mobile station 10 establishes the single hop communication with base station 20, thereafter transmits the request signal to search for a multihop communication path, and determines the communication speed on the communication path found by the search, based on the request response signal. In this configuration, while the communication is first established between mobile station 10 and base station 20, the selection of the communication path can be carried out on the basis of the communication speeds to implement changeover to a communication path with a larger communication speed, whereby it is feasible to search for a communication path with higher quality (higher speed) while decreasing the time period before establishment of communication.

Since the first established single hop communication path is always maintained, communication can be continuously carried out on the single hop communication path even with a disconnection of the multihop connection, whereby it is feasible to reduce the risk of disconnection of communication. When the operation of searching for a multihop communication path and determining a communication path is again carried out after the start of the communication on the single hop communication path as described above, it is also feasible to again switch over to a communication path with a larger communication speed.

The above second embodiment described the case wherein mobile station (transmitting station) 10 was provided with communication path determiner 11, determined the communication speed between the transmitting station and the receiving station on the basis of the request response signal transmitted from base station 20 or from relay station 30, and determined the communication path on the basis thereof. It is also possible to adopt a configuration wherein base station (receiving station) 20 has the communication path determiner. Namely, when mobile station 10 or relay station 30 transmits a request signal, base station 20 determines the communication speeds on the respective communication paths, based on the interference levels at the base station itself and the relay information included in the request signal (the interstation communication speed information between each pair of stations constituting the communication path between mobile station 10 and base station 20), and determines the communication path on the basis thereof.

Third Embodiment

The following will describe programs to substantialize the mobile station (transmitting station), relay station, and base station (receiving station) constituting the mobile communication system according to the present invention. A computer to execute the programs according to the present embodiment is a terminal such as a cell phone or the like forming the mobile communication system, and computer with a communication function by mobile communication.

Figure 17A:
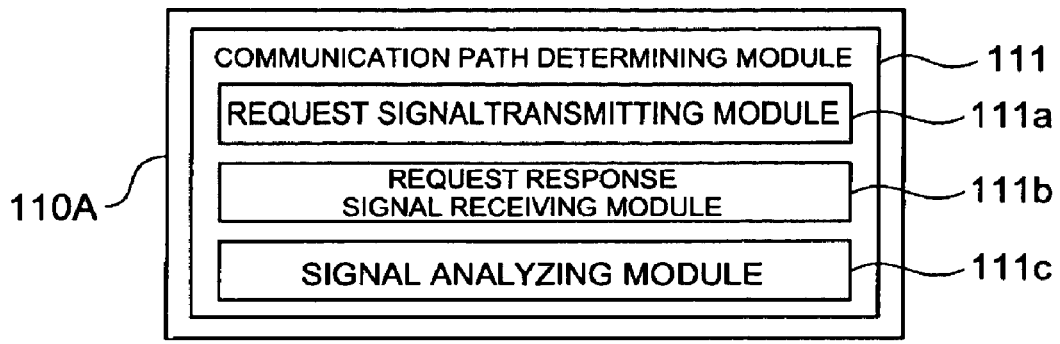
FIG. 17A is an illustration showing a configuration of a computer program for the transmitting station according to an embodiment.
Figure 17B:
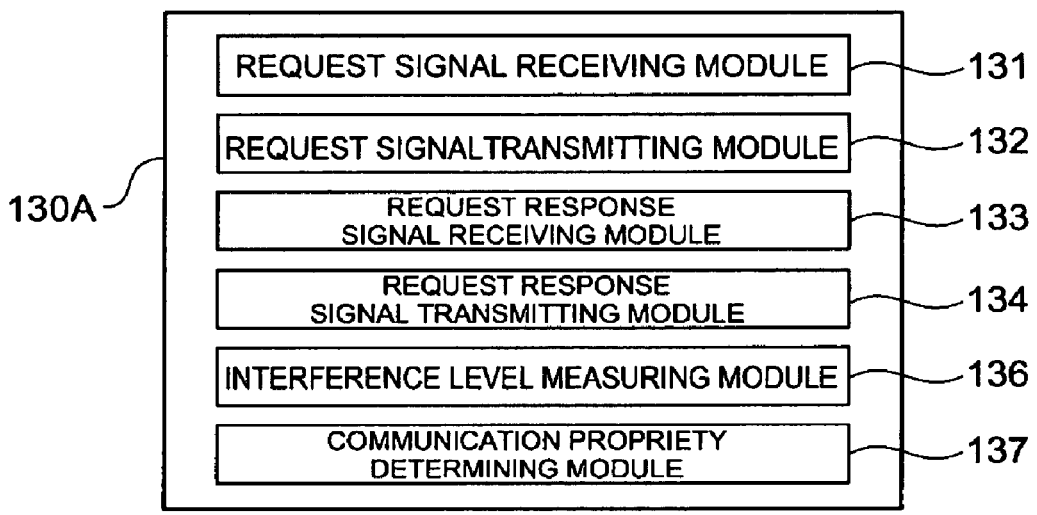
FIG. 17B is an illustration showing a configuration of a computer program for the relay station according to an embodiment.
Figure 17C:
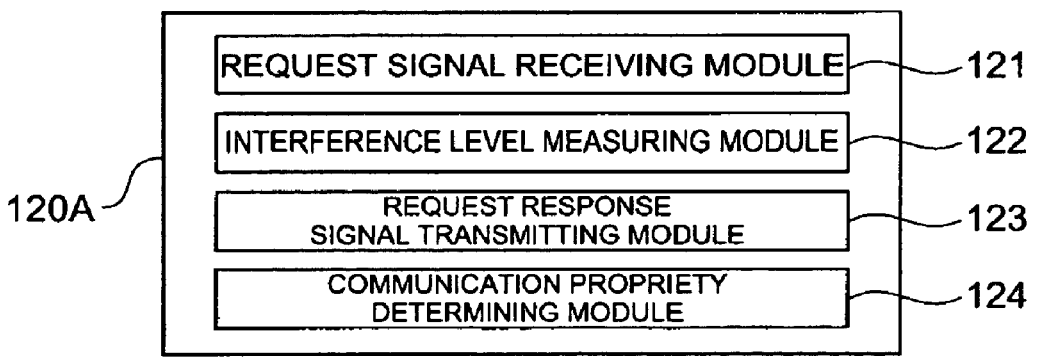
FIG. 17C is an illustration showing a configuration of a computer program for the receiving station according to an embodiment.

FIG. 17 are illustrations showing the configurations of the communication path control programs according to the third embodiment for substantializing the mobile communication system in the first embodiment. When the communication path control programs are applied to the respective stations of the transmitting station, relay station, and receiving station, they serve as a transmitting station program, as a relay station program, and as a receiving station program, respectively. FIG. 17A shows transmitting station program 110A, FIG. 17B relay station program 130A, and FIG. 17C receiving station program 120A.

As shown in FIG. 17A, transmitting station program 110A is comprised of communication path determining module 111 having request signal transmitting module 111a, request response signal receiving module 111b, and signal analyzing module 111c. It is noted that the illustration includes only the components necessary for substantializing the communication path determining method according to the present invention, while omitting the other components. Request signal transmitting module 111a has a function of letting the computer transmit a request signal. Request response signal receiving module 111b has a function of letting the computer receive a request response signal. Signal analyzing module 111c has a function of letting the computer analyze a request response signal and determine whether it is possible to perform communication. The functions substantialized by letting the computer execute the request signal transmitting module 111a, request response signal receiving module 111b, and signal analyzing module 111c are the same as the functions of request signal transmitter 11a, request response signal receiver 11*b*, and signal analyzer 11*c*, respectively, of mobile station 10 in the first embodiment.

As shown in FIG. 17B, relay station program 130A has request signal receiving module 131, request signal transmitting module 132, request response signal receiving module 133, request response signal transmitting module 134, interference level measuring module 136, and communication propriety determining module 137. Request signal receiving module 131 has a function of letting the computer receive a request signal. Request signal transmitting module 132 has a function of letting the computer transmit a request signal. Request response signal receiving module 133 has a function of letting the computer receive a request response signal. Request response signal transmitting module 134 has a function of letting the computer transmit a request response signal. Interference level measuring module 136 has a function of letting the computer measure an interference level. Communication propriety determining module 137 has a function of letting the computer determine the propriety of communication, based on the interference level measured by the interference level measuring module. The functions substantialized by letting the computer execute the request signal receiving module 131, request signal transmitting module 132, request response signal receiving module 133, request response signal transmitting module 134, interference level measuring module 136, and communication propriety determining module 137 are the same as the functions of request signal receiver 31, request signal transmitter 32, request response signal receiver 33, request response signal transmitter 34, interference level measuring part 36, and communication propriety determiner 37, respectively, of relay station 30 in the first embodiment.

As shown in FIG. 17C, receiving station program 120A has request signal receiving module 121, interference level measuring module 122, request response signal transmitting module 123, and communication propriety determining module 124. Request signal receiving module 121 has a function of letting the computer receive a request signal. Interference level measuring module 122 has a function of letting the computer measure an interference level. Request response signal transmitting module 123 has a function of letting the computer transmit a request response signal. Communication propriety determining module 124 has a function of letting the computer determine the propriety of communication on the basis of the interference level measured by interference level measuring module 122. The functions substantialized by letting the computer execute the request signal receiving module 121, interference level measuring module 122, request response signal transmitting module 123, and communication propriety determining module 124 are the same as the functions of request signal receiver 121, interference level measuring part 122, request response signal transmitter 123, and communication propriety determiner 124, respectively, of base station 20 in the first embodiment.

Fourth Embodiment

Communication path control programs according to the fourth embodiment for substantializing the mobile communication system in the second embodiment will be described below with reference to FIG. 18. FIG. 18A is an illustration showing the configuration of transmitting station program 110B, the configuration of relay station program 130B, and the configuration of receiving station program 120B.

As shown in FIG. 18A, transmitting station program 110B according to the fourth embodiment is identical in the basic configuration to the transmitting station program 110A according to the third embodiment, but is different therefrom in that it is provided with communication speed determining module 111*d* in place of signal analyzing module 111*c*. Communication speed determining module 111*d* has interstation communication speed determining module 111*e* for letting the computer determine the interstation communication speed between the transmitting station and a station as a source of a request response signal. Communication speed determining module 111*d* has a function of letting the computer determine the communication speed between the transmitting station and the receiving station, based on the interstation communication speed determined by interstation communication speed determining module 111*e*, and the interstation communication speed between each pair of stations constituting a communication path, included in a request response signal received by the request response signal receiving module. The function substantialized by letting the computer execute the communication speed determining module 111*d* is the same as the function of communication speed determiner 11*d* of mobile station 10 in the second embodiment.

As shown in FIG. 18B, relay station program 130B according to the fourth embodiment is identical in the basic configuration to the relay station program 130A according to the third embodiment, but is different therefrom in that it is provided with interstation communication speed determining module 138 in place of communication propriety determining module 137. Interstation communication speed determining module 138 has a function of letting the computer determine the communication speed to the receiving station, based on the interference level included in the request response signal. The function substantialized by letting the computer execute the interstation communication speed determining module 138 is the same as the function of interstation communication speed determiner 38 of relay station 30 in the second embodiment.

As shown in FIG. 18C, receiving station program 120B according to the fourth embodiment is identical in the basic configuration to the receiving station program 120A according to the third embodiment, but is different therefrom in that it does not have communication propriety determining module 126. The functions substantialized by letting the computer execute the receiving station program 120B according to the fourth embodiment are the same as those of base station 20 according to the second embodiment.

Figure 19:
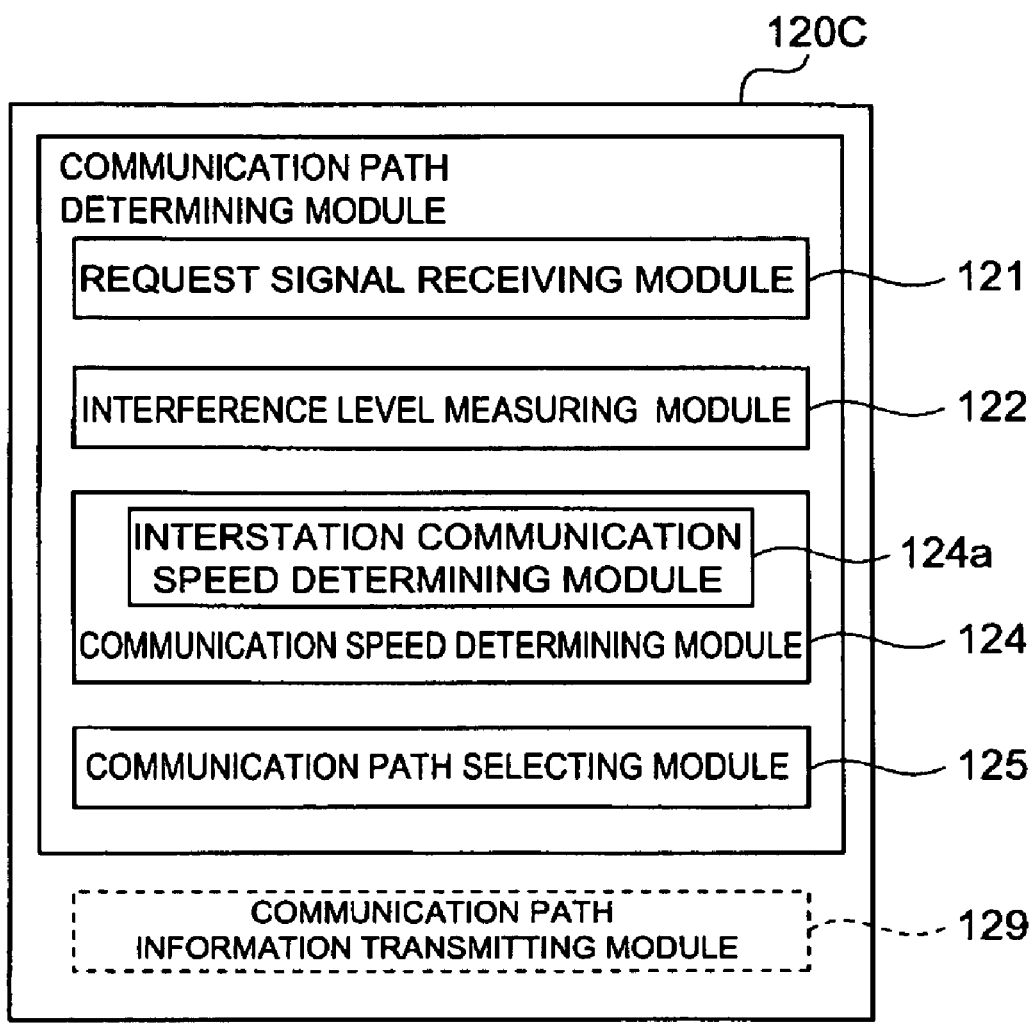
FIG. 19 is an illustration showing another example of a receiving station program.

The following will describe a receiving station program for substantializing the receiving station with the communication path determiner for determining the communication path. FIG. 19 is an illustration showing the configuration of the receiving station program. As shown in FIG. 19, the receiving station program is comprised of a communication path determining module having request signal receiving module 121, interference level measuring module 122, communication speed determining module 123, and communication path selecting module 124. Request signal receiving module 121 has a function of letting the computer receive a request signal. Interference level measuring module 122 has a function of letting the computer measure an interference level of a request signal received by the computer. Communication speed determining module 124 has interstation communication speed determining module 124*a*. Interstation communication speed determining module 124*a* has a function of letting the computer determine the interstation communication speed, based on the interference level, and communication speed determining module 124 has a function of letting the computer determine a communication speed between the transmitting station and the receiving station, based on an interstation communication speed between each pair of stations constituting a communication path. Communication path selecting module 125 has a function of letting the computer select a communication path on the basis of communication speeds on respective communication paths. The receiving station program may also be configured to have communication path information transmitting module 129 for letting the computer transmit the information of the selected communication path, as indicated by a dotted line in FIG. 19. In this configuration, the information of the determined communication path is transmitted to the transmitting station and the transmitting station transmits packets according to the determined communication path.

The above described the mobile communication systems and communication path determining methods according to the present invention with the embodiments thereof, but it is noted that the present invention is by no means intended to be limited to the above embodiments.

For example, the above second embodiment described the configuration wherein each relay station 30 had the interstation communication speed determining means, determined the interstation communication speed on the basis of the interference level, and transmitted the interstation communication speed information to mobile station 10, but another potential configuration is such that each relay station 30 and base station 20 are configured to put the interference level measured by the interference level measuring part, into a request response signal and transmit the request response signal to mobile station 10. In this configuration, mobile station 10 is able to determine the interstation communication speed information between each pair of stations, based on the interference levels at the respective stations, and mobile station 10 is able to determine the communication speed between mobile station 10 and base station 20, based on the determined interstation communication speeds, and to determine the communication path. Conversely, the interference level at each relay station 30 may be put into a request signal to be transmitted to base station 20. This permits base station 20 to determine the interstation communication speed information between each pair of stations, based on the interference levels at the respective stations, and the base station 20 is able to determine the communication speed between the mobile station 10 and base station 20, based on the determined interstation communication speeds, and determine the communication path.

Fifth Embodiment

According to each of the above embodiments, it is feasible to determine the communication path with the largest (highest) communication speed or the communication path satisfying the predetermined line quality (these communication paths will be referred to as "optimal path"), based on the interference levels of the respective signals received at the relay station and at the receiving station. In the present embodiment, the optimal path is determined so as to secure the reception quality from the mobile station to the base station in the following manner.

In the CDMA mobile communication system, a parameter E determined by a ratio of required reception power per bit as a target at the receiving station ($E_b$) to thermal noise ($N_0$) plus interference power ($I_0$), i.e., $E=E_b/(N_0+I_0)$ is a factor to determine the reception quality of signal in control of transmission power. Using this parameter E as a target value of transmission power control, the probability of erroneous reception of signal (error rate) decreases with increase of this target value, but it brings about the disadvantage of decrease in the cell radius and system capacity. For this reason, in the conventional CDMA mobile communication system, the target value is set to the minimum necessary value to control the transmission power, so as to secure the reception quality of signal at the base station.

However, since the multihop connection system involves the communication with the base station through relay stations, in order for the base station to receive correct signals, the base station and all the relay stations have to receive the signals without error. Therefore, in order to realize the error rate in the multihop connection system equivalent to that in the conventional system (single hop system), the target value must be set large, so as to achieve a small error rate at each station. However, the increase of the target value would result in decreasing the cell radius and system capacity.

Taking this point in account, the present embodiment adopts the following configuration to enhance the reception quality, i.e., decrease the error rate, while minimizing the decrease of the cell radius and system capacity. The description hereinafter will be given with focus on differences from each of the above embodiments, with omission and simplification of the description of common portions.

The mobile communication system in the present embodiment is configured to set the target value for transmission power control, and the target value is independently (uniquely) set for each of the case where the base station is a receiving station and the case where the relay station is a receiving station. Namely, a base-station target value is uniquely calculated at the base station in accordance with a condition specific to the base station, and a relay-station target value is uniquely calculated at the relay station in accordance with a condition specific to the relay station. Then the target value at the base station (hereinafter referred to as "base-station target value") is set to the minimum necessary value permitted, while the target value at the relay station (hereinafter referred to as "relay-station target value") is set as a value different from and larger than the base-station target value.

The mobile communication system in the present embodiment will be described below in detail.

Mobile communication system 1 in the present embodiment has the system configuration shown in FIG. 1, similar to that of mobile communication system 1 in the first embodiment. The mobile station has the same configuration shown in FIG. 3, as the mobile station 10. The present embodiment is different in base station 20 and relay station 30 from the first embodiment.

Relay station 30 in the present embodiment has an internal configuration similar to that of relay station 30 in the first embodiment. It is different from relay station 30 in the first embodiment in that communication propriety determiner 37 has a target value storage for storing a preliminarily calculated target value for transmission power control and this target value storage stores the relay-station target value.

The relay-station target value is calculated so as to define the number of relays permitted and make the error rates at base station 20 and at each relay station 30 satisfy Formula 1 below, independently of the after-described base-station target value at base station 20.

The relay-station target value at each relay station 30 may be set independently of the base-station target value at base station 20 and the relay-station target values at respective relay stations 30 may be set in similar fashion. However, the relay-station target values at the respective relay stations 30 may be set to different values according to their respective circumstances, such as installation environments of the respective relay stations 30 or the like, as occasion may demand.

Here the aforementioned parameter E can be used as the relay-station target value, for example. Other potential factors include SIR (Signal to Interference Ratio: ratio of signal power to interference power), CIR (Carrier Interference Ratio: ratio of carrier power to interference power), and a reception level.

$$1-(\text{total error rate}) > (1-(\text{error rate at base station})) \times (1-(\text{error rate at relay station}))^x \quad \text{Formula 1:}$$

x: number of relays

Then communication propriety determiner 37 determines whether it is possible to perform the communication at the communication speed requested by the request signal received by request signal receiver 31, based on the interference level measured by interference level measuring part 36 and the relay-station target value stored. For example, communication propriety determiner 37 determines a maximum communication speed available for communication and compatible with the relay-station target value, based on the interference level measured by interference level measuring part 36, and compares the maximum communication speed with the requested communication speed. Then the result of the determination by communication propriety determiner 37 is fed into request response signal transmitter 34 and the operation thereafter is much the same as in the first embodiment.

Base station 20 in the present embodiment has the internal configuration similar to that of base station 20 in the first embodiment. It is different from base station 20 in the first embodiment in that communication propriety determiner 26 has a target value storage for storing a preliminarily calculated target value for transmission power control and the target value storage stores the base-station target value.

Here the base-station target value is calculated so as to satisfy above Formula 1 in a manner similar to the relay-station target value and independently of the relay-station target value and, for example, it is selected from the aforementioned parameter E, SIR, CIR, and reception level.

Then communication propriety determiner 26 determines whether it is possible to perform the communication with mobile station 10, based on the interference level measured by interference level measuring part 22 and the base-station target value stored. For example, this determination is made as follows: the communication propriety determiner determines a maximum communication speed available for communication and compatible with the base-station target value, based on the interference level measured by interference level measuring part 22 and compares the maximum communication speed with the communication speed requested by the request signal. Then request response signal transmitter 23 transmits a request response signal containing the communication propriety information on propriety based on the determination by communication propriety determiner 26 to relay station 30 or mobile station 10 as a source. The operation thereafter is similar to that in the first embodiment.

The communication path determining methods in the present embodiment include methods of determining the communication path with the largest communication speed (hereinafter referred to as "fastest path determining methods") and methods of determining the communication path satisfying the required line quality (hereinafter referred to as "required quality path determining methods"). These methods will be described with examples where mobile station 10 is a transmitting station, with focus on differences from the communication path determining methods in the first embodiment. Common description will be omitted or simplified.

A fastest path determining method is carried out according to the procedure shown in FIG. 8, as in the case of the first embodiment. The following is the procedure in a case where the search is sequentially conducted staring from the path with the maximum communication speed (hereinafter referred to as "descending sequence search").

First, as in the first embodiment, mobile station 10 attempts to connect by 384 kbps single hop connection (S11) and determines whether it is possible to perform communication by 384 kbps single hop connection. At this time, signal analyzer 11c analyzes the communication propriety information included in the request response signal. When it is impossible to perform the communication by 384 kbps single hop connection, mobile station 10 searches for a relay station 30 capable of communication by 384 kbps multihop connection (S12). At this time, mobile station 10 transmits a request signal to relay station 30. Then a relay station 30 receives the request signal and measures the interference level at the relay station itself. The relay station 30 makes communication propriety determiner 37 determine whether it is possible to perform the communication at the communication speed requested by the request signal (384 kbps herein), based on the measured interference level and the relay-station target value stored.

Then information indicating the result of this determination is transmitted to mobile station 10 or to base station 20 in much the same manner as in the first embodiment.

When communication propriety determiner 37 determines that it is possible to perform the communication, the relay station 30 transmits a request signal to base station 20. Base station 20, receiving the request signal, measures the interference level at the station itself. Base station 20 makes communication propriety determiner 26 determine whether it is possible to perform the communication with mobile station 10 at the requested communication speed, based on the measured interference level and the stored base-station target value. Then base station 20 transmits a request response signal similar to that in the first embodiment, to the relay station 30. When the relay station 30 receives the request response signal, it transmits a request response signal containing the communication propriety information included in the request response signal, and the communication propriety information at the relay station itself ("communicable" herein). Mobile station 10 makes signal analyzer 11c analyze the communication propriety information included in the received request response signal. When the result of the analysis is that it is possible to perform the communication by 384 kbps multihop connection, the mobile station determines the communication path by 384 kbps multihop connection and starts the communication.

On the other hand, when it is impossible to perform the communication by 384 kbps multihop connection, mobile station 10 attempts to connect by 64 kbps single hop connection (S13). This is much the same as the attempt on 384 kbps single hop connection in the present embodiment as described above. When it is possible herein to perform the communication by 64 kbps single hop connection, the mobile station determines the communication path by 64 kbps single hop connection and starts the communication. When it is impossible to perform the communication by 64 kbps single hop connection, mobile station 10 attempts to connect by 64 kbps multihop connection (S14). This is much the same as the attempt on 384 kbps multihop connection in the present embodiment as described above.

In the case of the descending sequence search, as described above, mobile station 10 sequentially attempts to connect from the fastest communication speed and establishes a connection with base station 20 at a communication speed determined as communicable, thereby determining the communication path with the largest communication speed. In addition, in the case of the present embodiment, the communication path with the largest communication speed is determined based on the relay-station target value and the base-station target value calculated independently of each other at relay station 30 and at base station 20, and it is thus feasible to enhance the reception quality while minimizing the decrease of the cell radius and system capacity.

The procedure in a case where the search is sequentially conducted starting from the path with the minimum communication speed (hereinafter referred to as "ascending sequence search") is as shown in FIG. 9. In this case, first, mobile station 10 attempts to connect by 64 kbps multihop connection (S21). At this time, in a manner similar to the aforementioned attempt on 384 kbps multihop connection, relay station 30 and base station 20 each make communication propriety determiner 37 and communication propriety determiner 26 determine whether it is possible to perform the communication at the requested communication speed, based on the interference level at each station and the relay-station target value or the base-station target value.

Then, for example, while maintaining the 64 kbps multihop connection, as in the first embodiment, the mobile station attempts to connect by 64 kbps single hop connection (S22 or S23). Then mobile station 10 attempts to connect by 384 kbps multihop connection (S24). In this case, relay station 30 and base station 20 each also make their respective communication propriety determiner 37 and communication propriety determiner 26 determine whether it is possible to perform the communication at the requested communication speed, based on the interference level and the relay-station target value or the base-station target value stored. Then, for example, while maintaining the 64 kbps multihop connection, as in the first embodiment, the mobile station attempts to connect by 384 kbps single hop connection (S25 or S26).

In the case of the ascending sequence search, as described above, the communication path is first secured to keep the time before the start of communication as short as possible, and the communication path with the largest communication speed is searching for, while stepwise increasing the communication speed. In that case, the communication path is determined on the basis of the interference level at each station and the relay-station target value and the base-station target value calculated independently of each other at relay station 30 and at base station 20, whereby the reception quality can be enhanced, while minimizing the decrease of the cell radius and system capacity.

The required quality path determining methods will be described below. In the present embodiment, the required quality path determining methods also involve applications to both the first multihop system shown in FIG. 10A and the second multihop system shown in FIG. 10B. The required quality path determining method in the former multihop system is carried out according to the procedure shown in FIG. 11, as in the first embodiment.

First, when the required line quality is given by a communication speed (S30), mobile station 10 attempts to make a single hop connection at the communication speed (S31, S33, S35, or S37). At this time, mobile station 10 first transmits a request signal at the given communication speed, as in the first embodiment. Base station 20 receives the request signal transmitted from mobile station 10 and measures the interference level at the base station itself. Then communication propriety determiner 26 determines whether it is possible to perform the communication with mobile station 10 at the communication speed requested by the request signal, based on the measured interference level and the stored base-station target value. Then base station 20 puts the communication propriety information based on the determination into a request response signal and transmits the request response signal to mobile station 10. Mobile station 10, receiving the request response signal, determines whether it is possible to perform the single hop communication at the given communication speed, based on the communication propriety information included therein. When it is possible herein to perform the single hop communication, the mobile station determines the communication path thereof and starts the communication. However, if it is impossible, the mobile station attempts to make a multihop connection at the communication speed of twice the communication speed (double speed) (S32, S34, or S36). At this time, mobile station 10 transmits a request signal containing a communication connection request at the double speed. A relay station 30, receiving the request signal, measures the interference level at the relay station itself. The relay station 30 also makes communication propriety determiner 37 determine whether it is possible to perform the communication at the communication speed requested by the request signal, based on the measured interference level and the stored relay-station target value. When the result of the determination is that it is impossible to perform the communication, the relay station 30 transmits a request response signal containing the communication propriety information to the mobile station; when it is possible to perform the communication, the relay station 30 transmits a request signal containing a communication connection request at the double speed.

When base station 20 receives the request signal, it measures the interference level at the base station itself and makes communication propriety determiner 26 determine whether it is possible to perform the communication with mobile station 10 at the requested communication speed, based on the interference level and the base-station target value. The operation thereafter is similar to that in the first embodiment.

Figure 12:
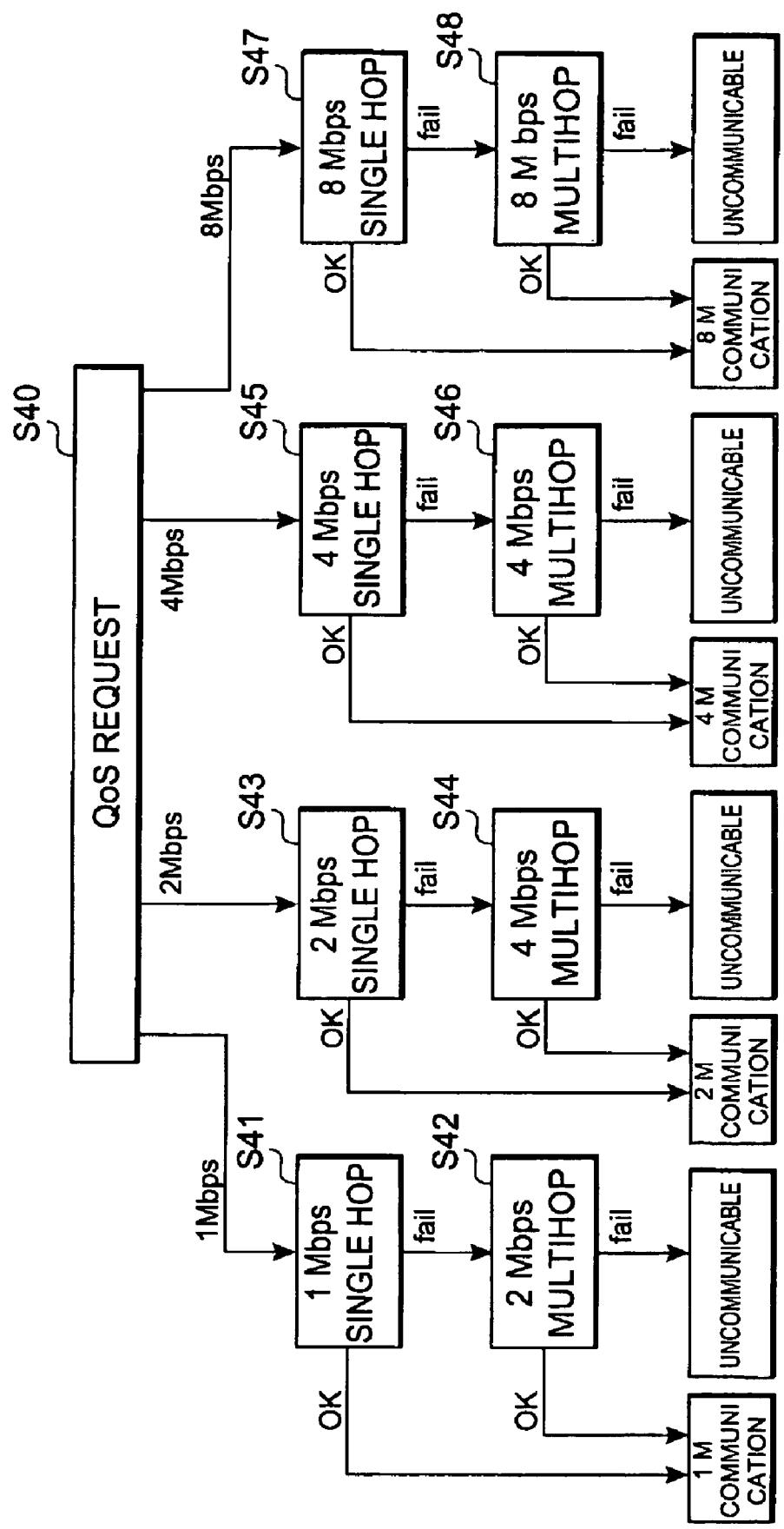
FIG. 12 is a flowchart showing the operation of a communication path determining method according to an embodiment.

The required quality path determining method in the latter multihop system is carried out according to the procedure shown in FIG. 12, as in the first embodiment.

First, when the required line quality is given by a communication speed, mobile station 10 attempts to make a single hop connection at the communication speed (S41, S43, S45, or S47). A specific method of the attempt on connection is just as described above. When it is possible herein to perform the communication at the given communication speed, the mobile station determines the communication path of the single hop connection at the communication speed and starts the communication. However, if it is impossible, the mobile station attempts to make a multihop connection at the communication speed (S42, S44, S46, or S48). In this case, a specific method of the attempt on connection is just as described above.

When it is possible to perform the multihop communication at the communication speed requested by the request signal, the mobile station determines the communication path of the multihop connection at the communication speed and starts the communication.

As described above, the present embodiment is also configured so that with a requested line quality being given, it is feasible to determine the communication path satisfying the line quality and make a connection, and, therefore, it can provide a high-quality communication environment. Since the communication path is determined based on the relay-station target value and the base-station target value calculated independently of each other at relay station 30 and at base station 20, it is feasible to enhance the reception quality while minimizing the decrease of the cell radius and system capacity.

Sixth Embodiment

The present embodiment is configured as described below, in order to determine the optimal communication speed so as to secure the reception quality from the mobile station to the base station in the second embodiment.

In mobile communication system 1 according to the present embodiment, the target values for transmission power control are also independently (individually) set in the case where the base station is a receiving station and in the case where the relay station is a receiving station. The base-station target value is set to the minimum necessary value permitted, and the relay-station target value is set larger than it.

Mobile communication system 1 according to the present embodiment has the system configuration similar to the mobile communication system in the second embodiment. The base station also has the same configuration as the base station 20 shown in FIG. 15. The mobile communication system of the present embodiment is different in mobile station 10 and relay station 30 from the mobile communication system in the second embodiment.

In the present embodiment mobile station 10 has the internal configuration similar to mobile station 10 in the second embodiment. The mobile station 10 in the present embodiment is different from mobile station 10 in the second embodiment in that interstation communication speed determiner 11e has a target value storage for storing preliminarily calculated target values for transmission power control.

The target value storage stores the base-station target value and relay-station target value similar to those in the fifth embodiment. These base-station target value and relay-station target value are independently calculated so as to satisfy aforementioned Formula 1 as in the fifth embodiment. The both target values can be selected from the aforementioned parameter E, SIR, CIR, and reception level.

Then interstation communication speed determiner 11e determines the interstation communication speed between the mobile station and relay station 30 or base station 20 as a source of a request response signal, based on the interference level at the source of the request response signal included in the request response signal and based on the base-station target value and relay-station target value stored.

In the present embodiment relay station 30 has the internal configuration similar to relay station 30 in the second embodiment. The relay station in the present embodiment is different from relay station 30 in the second embodiment in that interstation communication speed determiner 38 has a target value storage for storing a preliminarily calculated target value for transmission power control.

The target value storage stores the relay-station target value. The relay-station target value is calculated independently of the base-station target value stored in mobile station 10, so as to satisfy aforementioned Formula 1. The relay-station target value can be selected from the aforementioned parameter E, SIR, CIR, and reception level.

Interstation communication speed determiner 38 determines the interstation communication speed between the host relay station and relay station 30 or base station 20 as a source of a request response signal, based on the interference level included in the request response signal received by request response signal receiver 33, and based on the relay-station target value stored.

The communication path determining method in mobile communication system 1 according to the present embodiment will be described below. This communication path determining method is carried out according to the flowchart shown in FIG. 16, as in the second embodiment, and the description hereinafter will be given with focus on the differences from the second embodiment, with omission and simplification of common portions.

After the steps S50 and S52 are executed in a manner similar to those in the second embodiment, mobile station 10 receives a request response signal transmitted from base station 20, and then operates as follows. Namely, mobile station 10 determines a communication speed, based on the request response signal received and based on the base-station target value and relay-station target value stored (S54), and transmits a connection notification containing the information of the determined communication speed to base station 20 (S56). When base station 20 receives this connection notification, it sends an ACK to mobile station 10 (S58). Then a single hop communication is established between mobile station 10 and base station 20 (S60). This single hop communication is always maintained before an end of the communication between mobile station 10 and base station 20.

After the steps S62, S64, and S66 are then executed in a manner similar to those in the second embodiment, the relay station 30A receives a request response signal transmitted from base station 20, and then determines the interstation communication speed between the relay station and base station 20, based on the interference level included in the request response signal and based on the relay-station target value stored (S68). The relay station 30A also transmits a request response signal containing information about the interference level at the relay station itself and about the interstation communication speed determined at step 68 to mobile station 10. Mobile station 10 determines the communication speed on the communication path of mobile station 10—relay station 30A—base station 20, based on the request response signal transmitted from the relay station 30A and on the base-station target value and relay-station target value stored (S72). Specifically, the operation is carried out as follows. First, the mobile station determines the interstation communication speed between mobile station 10 and relay station 30A, based on the interference level at relay station 30A included in the request response signal and the relay-station target value stored. Then the mobile station determines the communication speed on the communication path of mobile station 10—relay station 30A—base station 20, based on the interstation communication speed between mobile station 10 and relay station 30A thus determined, the interstation communication speed between relay station 30A and base station 20 included in the request response signal, and the base-station target value.

Subsequently, the steps of S74 to S86 are carried out in similar fashion to those in the second embodiment and thereafter mobile station 10 again transmits a request signal, in order to search for a relay station 30B. Then the relay station 30B transmits a request response signal to mobile station 10 in the same procedure as in the case of relay station 30A (S88-S96). Mobile station 10, receiving the request response signal from relay station 30B, determines the communication speed on the communication path of mobile station 10—relay station 30B—base station 20, based on the received request response signal and the base-station target value and relay-station target value stored (S98). The operation thereafter is carried out by executing the steps similar to those in the second embodiment.

In the present embodiment, as described above, mobile station 10 determines the interstation communication speed on the basis of the interference level and the relay-station target value and base-station target value calculated independently, and relay station 30 determines the interstation communication speed on the basis of the interference level and the relay-station target value. Therefore, the present embodiment permits the optimal path to be determined based on the communication speeds between each pair of stations, and the reception quality can be enhanced while minimizing the decrease of the cell radius and system capacity.

Incidentally, as described above, mobile communication system 1 in each of the fifth and sixth embodiments is configured to set the target values for the error rates at all the stations (base station 20 and each relay station 30) on the communication path, instead of the error rate at base station 20, and to determine the optimal path on the basis of the target values. This makes it feasible to secure the reception quality from the mobile station to the base station even in the multihop connection system.

According to "W-CDMA Mobile Communications System" (published under the general editorship of Keiji Tachikawa by Maruzen Co., Ltd.) and others, the system capacity C and parameter E have the relation of Formula 2 below.

$$C=(pg/E)+1 \text{ pg: spreading gain} \quad \text{Formula 2:}$$

Namely, the value of system capacity C decreases with increase of the parameter E. An increase of parameter E at relay station 30 will result in increase of interference and thus decrease of system capacity, but the effect on the system capacity is less than the effect due to the increase of parameter E at base station 20. Noting this point, mobile communication system 1 in the present embodiment is configured to set the base-station target value to the minimum necessary value permitted and set the relay-station target value larger than it, whereby the decrease of system capacity is suppressed while keeping the error rate small in the entire system.

The following will describe programs to substantialize the mobile station (transmitting station), relay station, and base station (receiving station) constituting the mobile communication systems according to the fifth embodiment and the sixth embodiment. The programs for substantializing the respective stations constituting the mobile communication system in the fifth embodiment have the modules common to the aforementioned programs, and the description hereinafter will be given with focus on different modules, with omission and simplification of the description about the common modules.

The programs for the respective stations constituting mobile communication system 1 in the fifth embodiment have the configurations shown in FIG. 17 as the programs in the third embodiment did. Among the programs, the transmitting station program is similar to the transmitting station program 110A according to the third embodiment shown in FIG. 17A. The relay station program and the receiving station program have the same modules as the relay station program 130A and the receiving station program 120A, respectively, according to the third embodiment as shown in FIGS. 17B and 17C, except for the communication propriety determining modules 137, 124.

Communication propriety determining module 137 has a function of letting the computer determine the propriety of communication, based on the interference level measured by the interference level measuring module and on the relay-station target value. Communication propriety determining module 124 has a function of letting the computer determine the propriety of communication, based on the interference level measured by interference level measuring module 122 and on the base-station target value.

The programs for the respective stations constituting mobile communication system 1 according to the sixth embodiment have the configurations shown in FIG. 18 as the programs according to the fourth embodiment did. Among the programs, the receiving station program is similar to the receiving station program 120B according to the fourth embodiment shown in FIG. 18C. The transmitting station program and the relay station program have the same modules as the transmitting station program 110B and the relay station program 130B, respectively, in the fourth embodiment as shown in FIGS. 18A and 18B, except for the interstation communication speed determining module 111e and the interstation communication speed determining module 138.

Interstation communication speed determining module 111e has a function of letting the computer determine the interstation communication speed between the transmitting station and the station as a source of a request response signal, based on the interference level and on the base-station target value and relay-station target value. Interstation communication speed determining module 138 has a function of letting the computer determine the communication speed to the receiving station, based on the interference level included in a request response signal and on the relay-station target value.

These programs enable the computer to substantialize the functions of base station 20, relay station 30, and mobile station 10 according to each of the fifth and sixth embodiments described above. In that case, the reception quality can be enhanced while minimizing the decrease of the cell radius and system capacity.

Finally, a receiving station program to substantialize the receiving station with the communication path determiner for determining the communication path will be described. This receiving station program has the configuration shown in FIG. 19, as the aforementioned receiving station program 120c did. This receiving station program has the same modules as the receiving station program 120c, except for the interstation communication speed determining module 124a. The interstation communication speed determining module 124a has a function of letting the computer determine the interstation communication speed, based on the interference level and the base-station target value. This receiving station program enables the computer to substantialize the aforementioned functions of base station 20. In that case, the reception quality can be enhanced while minimizing the decrease of the cell radius and system capacity.

The fifth and sixth embodiments were described using the examples of "uplink" to connect mobile station 10 through relay station 30 to base station 20. However, the fifth and sixth embodiments can also be applied to "downlink," by properly modifying the way of setting the system capacity and target values.

INDUSTRIAL APPLICABILITY

As described above, the present invention has realized such determination of multihop or single hop communication path as to determine the communication path with the largest (highest) communication speed or the communication path satisfying the predetermined line quality, based on the interference levels of the respective signals received at the relay station constituting the communication path and at the receiving station, thereby achieving implementation of fast communication.

The invention claimed is:

1. A mobile communication system comprising:
a transmitting station;
at least one relay station;
a receiving station, wherein,
the transmitting station, the at least one relay station, and the receiving station, respectively, are configured to implement packet transmission from the transmitting station to the receiving station through a communication path with an intermediary of at least one relay station or through a communication path without an intermediary of a relay station; and
communication path determining means for determining a communication path with one of a largest available communication bandwidth or a communication path satisfying a required communication bandwidth, the determining being based on interference levels of respective signals received at a relay station constituting a communication path between the transmitting station and the receiving station, and at the receiving station, the communication bandwidth defining a connection speed between the transmitting station and the receiving station.

2. The mobile communication system according to claim 1, wherein the communication path determining means further comprises:
interstation communication bandwidth determining means for determining an interstation communication bandwidth between each pair of stations, based on interference levels at respective stations constituting a communication path; and
communication bandwidth determining means for determining a communication bandwidth on each communication path from the transmitting station to the receiving station on the basis of the interstation communication bandwidth between each pair of stations determined by the interstation communication bandwidth determining means,
wherein the communication path determining means determines a communication path on the basis of communication bandwidths on respective communication paths determined by the communication bandwidth determining means.

3. The mobile communication system according to claim 2, wherein the interstation communication bandwidth determining means memorizes a receiving-station target value and a relay-station target value for control of transmission power independently set at the receiving station and at the relay station and determines the interstation communication bandwidth, based on the interference levels at the respective stations constituting the communication path, the receiving-station target value, and the relay-station target value.

4. The mobile communication system according to claim 1, wherein, where there are a plurality of communication paths satisfying the required communication bandwidth, the communication path determining means determines a path with a smallest hop count between the transmitting station and the receiving station, as a communication path.

5. The mobile communication system according to claim 1, wherein, where there are a plurality of communication paths satisfying the required communication bandwidth, the communication path determining means determines a path with a small total of transmission powers at the transmitting station and at the relay station constituting the communication path, as a communication path.

6. The mobile communication system according to claim 1, wherein, where there are a plurality of communication paths satisfying the required communication bandwidth, the communication path determining means determines a path with a small transmission power at the transmitting station, as a communication path.

7. The mobile communication system according to claim 1, wherein the communication path determining means determines a communication path out of communication paths each having a hop count between the transmitting station and the receiving station of not more than a predetermined threshold.

8. The mobile communication system according to claim 1, wherein the receiving station and relay station comprise:
request signal receiving means for receiving a request signal transmitted from the transmitting station through a communication path with an intermediary of at least one relay station or through a communication path without an intermediary of a relay station;
interference level measuring means for measuring an interference level at the host station when the request signal receiving means receives a request signal; and
communication propriety determining means for memorizing either of a receiving-station target value and a relay-station target value for control of transmission power independently set at the receiving station and at the relay station,
wherein the communication propriety determining means of the receiving station determines whether it is possible to perform communication requested by the request signal, based on the interference level measured by the interference level measuring means and based on the receiving-station target value, and the communication propriety determining means of the relay station determines whether it is possible to perform communication requested by the request signal, based on the interference level and the relay-station target value, and
wherein the communication path determining means determines a communication path on the basis of proprieties of the communications determined by the respective communication propriety determining means.

9. The mobile communication system according to claim 1, wherein the signals are associated with a request to establish a connection between a station transmitting the signals and another station receiving the signals.

10. A transmitting station applied to a mobile communication system, the transmitting station configured to transmit a packet to a receiving station through a communication path with an intermediary of at least one relay station or through a communication path without an intermediary of a relay station,
communication path determining means for determining a communication path with one of a largest available communication bandwidth or a communication path satisfying a required communication bandwidth, the determining being based on interference levels of respective signals received at a relay station constituting a communication path to the receiving station, and at the receiving station, the communication bandwidth defining a connecting speed between the transmitting station and the receiving station.

11. The transmitting station according to claim 10, wherein the communication path determining means memorizes a receiving-station target value and a relay-station target value for control of transmission power independently set at the receiving station and at the relay station, and determines the communication path with the largest available communication bandwidth or the communication path satisfying the required communication bandwidth, based on the interference levels of the respective signals received at the relay station constituting the communication path and at the receiving station, the receiving-station target value, and the relay-station target value.

12. The transmitting station according to claim 10, wherein the communication path determining means comprises:

request signal transmitting means for transmitting a request signal;

request response signal receiving means for receiving a request response signal to the request signal transmitted by the request signal transmitting means;

interstation communication speed determining means for determining an interstation communication speed between the transmitting station and the receiving station or the relay station as a source of the request response signal, based on an interference level at the receiving station or the relay station as a source of the request response signal included in the request response signal;

communication bandwidth determining means for determining a communication bandwidth on the communication path from the transmitting station to the receiving station, based on the interstation communication bandwidth determined by the interstation communication bandwidth determining means and, where the request response signal is one transmitted from the relay station, also based on interstation communication bandwidth information between each pair of stations constituting a communication path from the relay station to the receiving station, included in the request response signal; and communication path selecting means for selecting a communication path on the basis of communication speeds on respective communication paths determined by the communication speed determining means, wherein the interstation communication bandwidth determining means memorizes a receiving-station target value and a relay-station target value for control of transmission power independently set at the receiving station and at the relay station, and determines the interstation communication bandwidth, based on an interference level at the receiving station or the relay station as a source of the request response signal, the receiving-station target value, and the relay-station target value.

13. The transmitting station according to claim 10, wherein the signals are associated with a request to establish a connection between a station transmitting the signals and another station receiving the signals.

14. A communication path determining method applied to a mobile communication system including a transmitting station; at least one relay station; and a receiving station, wherein the transmitting station, the at least one relay station, and the receiving station, respectively, are configured to determine a communication path between the transmitting station and the receiving station, said method comprising:

determining a communication path with one of a largest available communication bandwidth or a communication path satisfying a required communication bandwidth, the determining being based on interference levels of respective signals received at a relay station constituting a communication path between the transmitting station and the receiving station, and at the receiving station, the communication bandwidth defining a connection speed between the transmitting station and the receiving station.

15. The communication path determining method according to claim 14, wherein the communication path determining determines the communication path with the largest available communication bandwidth or the communication path satisfying the required communication bandwidth, based on the interference levels of the respective signals received at the relay station and at the receiving station, and based on a receiving-station target value and a relay-station target value for control of transmission power independently set at the receiving station and at the relay station.

16. The communication path determining method according to claim 14, wherein the signals are associated with a request to establish a connection between a station transmitting the signals and another station receiving the signals.

* * * * *